US011248092B2

(12) United States Patent
Ali et al.

(10) Patent No.: US 11,248,092 B2
(45) Date of Patent: Feb. 15, 2022

(54) METHOD OF PREPARING A POLYROTAXANE AND POLYROTAXANE

(71) Applicant: UNIVERSITAET DES SAARLANDES, Saarbruecken (DE)

(72) Inventors: Budiman Ali, Saarbruecken (DE); Carsten Becker-Willinger, Saarbruecken (DE); Gisela Heppe, Saarbruecken (DE); Nina Mueller, Saarbruecken (DE); Peter-William De Oliveira, Saarbruecken (DE); Gerhard Wenz, St. Ingbert (DE); Gergely Kali, Saarbruecken (DE); Harley Eisenbarth, Saarbruecken-Dudweiler (DE); Devid Hero, Losheim am See (DE); David Hafner, Saarlouis (DE); Jessica Hilschmann, Saarbruecken (DE)

(73) Assignee: UNIVERSITAET DES SAARLANDES, Saarbruecken (DE)

( * ) Notice: Subject to any disclaimer, the term of this patent is extended or adjusted under 35 U.S.C. 154(b) by 0 days.

(21) Appl. No.: 16/472,266

(22) PCT Filed: Dec. 21, 2017

(86) PCT No.: PCT/EP2017/084013
§ 371 (c)(1),
(2) Date: Jun. 21, 2019

(87) PCT Pub. No.: WO2018/115238
PCT Pub. Date: Jun. 28, 2018

(65) Prior Publication Data
US 2019/0322814 A1    Oct. 24, 2019

(30) Foreign Application Priority Data
Dec. 21, 2016  (EP) .................................. 16205619

(51) Int. Cl.
*C08F 2/16*   (2006.01)
*C08F 2/38*   (2006.01)
(Continued)

(52) U.S. Cl.
CPC .............. *C08G 83/007* (2013.01); *C08F 2/16* (2013.01); *C08F 2/38* (2013.01); *C08F 212/08* (2013.01);
(Continued)

(58) Field of Classification Search
None
See application file for complete search history.

(56) References Cited

U.S. PATENT DOCUMENTS 7,943,718 B2   5/2011   Ito et al.

FOREIGN PATENT DOCUMENTS

WO   97/09354 A1   3/1997
WO   01/38408 A2   5/2001
(Continued)

OTHER PUBLICATIONS

Polyethyene glycol methyl ether methacrylate TDS, chemicalbook.com (Year: 2021).*
(Continued)

*Primary Examiner* — Peter A Salamon
(74) *Attorney, Agent, or Firm* — Dilworth IP, LLC

(57) ABSTRACT

In one embodiment the invention relates to a method of preparing a polyrotaxane, said method comprising: performing a radical copolymerization of at least (a) a first polymerizable monomer having a stopper group, and of at least (b) a second polymerizable hydrophobic monomer, wherein said second monomer is complexed by a ring-shaped molecule, and of at least (c) a third polymerizable hydrophilic monomer; wherein during said copolymerization a copoly-
(Continued)

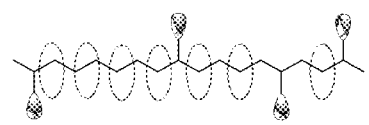

Polyrotaxane

With:

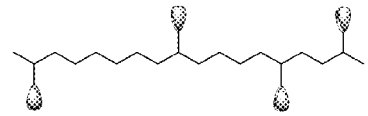

Random copolymer

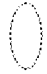

Ring-shaped molecule

Stopper group mer threading said ring-shaped molecule is formed, wherein during said copolymerization said first monomer having a stopper group is incorporated into the chain of said copolymer at least partially between the ends thereof, and wherein said stopper groups prevent said ring-shaped molecule from disassembling from the copolymer; and wherein the amount of said first monomer having a stopper group is of from 0.1 mol % to 20 mol % based on 100 mol % of the total amount of polymerizable monomers. In another embodiment the invention relates to a method of preparing a polyrotaxane, said method comprising: performing a radical copolymerization of at least (a) a first polymerizable monomer having a stopper group, and of at least (b) a second polymerizable partially hydrophilic monomer, wherein said second monomer is complexed by a ring-shaped molecule, and wherein said second monomer has a solubility in water at 20° C. of from 5 g/L to 40 g/L; wherein during said copolymerization a copolymer threading said ring-shaped molecule is formed, wherein during said copolymerization said first monomer having a stopper group is incorporated into the chain of said copolymer at least partially between the ends thereof, and wherein said stopper groups prevent said ring-shaped molecule from disassembling from the copolymer; and wherein the amount of said first monomer having a stopper group is of from 0.1 mol % to 20 mol % based on 100 mol % of the total amount of polymerizable monomers. Furthermore, the present invention relates to methods of preparing cross-linked polyrotaxanes and cross-linked polyrotaxanes which can be prepared using such methods. Thus, the present invention also relates to polyrotaxane and crosslinked polyrotaxanes. The invention also relates to products which contain the polyrotaxanes or cross-linked polyrotaxanes or which can be prepared from the polyrotaxanes or the cross-linked polyrotaxanes. The present invention further relates to the use of polyrotaxanes or cross-linked polyrotaxanes in various applications, such as the use as a self-healing material.

13 Claims, 23 Drawing Sheets

(51) Int. Cl.
  *C08G 83/00* (2006.01)
  *C08F 212/08* (2006.01)
  *C08F 220/44* (2006.01)
  *C08K 5/14* (2006.01)
  *C08K 5/23* (2006.01)
  *C08L 5/16* (2006.01)

(52) U.S. Cl.
  CPC ............. *C08F 220/44* (2013.01); *C08K 5/14* (2013.01); *C08K 5/23* (2013.01); *C08L 5/16* (2013.01); *C08L 2312/00* (2013.01)

(56) References Cited

FOREIGN PATENT DOCUMENTS

WO  2016/202906 A1  12/2016
WO  WO-2016202906 A1 * 12/2016 ............... C08J 3/24

OTHER PUBLICATIONS

PCT International Search Report and Written Opinion dated Apr. 5, 2018 from corresponding Application No. PCT/EP2017/084013, 19 pages.
Gibson et al., Macromol. 2012, 45, 3, 1270-1280.
Semsarzadeh et al., J. Inclusion Phenom. Macrocyclic Chem. 2013, 77, 1-4, 489-499.
Ogawa et al., Polym. J. (Tokyo, Jpn.) 2011, 43, 11, 909-915.
Kali et al., Macromol. Rapid Commun. 2016, 37, 67-72.
Kato et al., Chem. Commun. (Camb)., 2015, 51, 16180-16183.
Okumura et al., Adv. Mater. 2001, 13, 485-487.
Araki et al., Soft Matter 2008, 4, 245-249.
Harada et al., J. Am. Chem. Soc. 1994, 116, 3192-3196.
Zhao et al., Macromolecules 2003, 36, 9859-9865.
Teuchert et al., Macromolecules 2013, 46, 2-7.
Harada et al., Carbohydr. Res. 1998, 305, 127-129.
Brandrup et al., Polymer Handbook, 4th Edition, John Wiley and Sons, Inc., 1999, II/2-II/69.
Sarac, Prog. Polym. Sci. 1999, 24, 1149-1204.
Barner-Kowollik, Handbook of RAFT Polymerization, Wiley-VCH, 2008, 1-543.
Matyjaszewski et al., Chem. Rev. 2001, 101, 2921-2990.
Silva et al., Biomacromolecules 2013, 14, 2703-2712.
Pierce et al., Methods 1999, 19 (2): 213-221.
Wicks, Jr., Prog. Org. Coatings 1999, 36, 148-172.
Ito, Polym. J. (Tokyo, Jpn.) 2007, 39, 489-499.

* cited by examiner

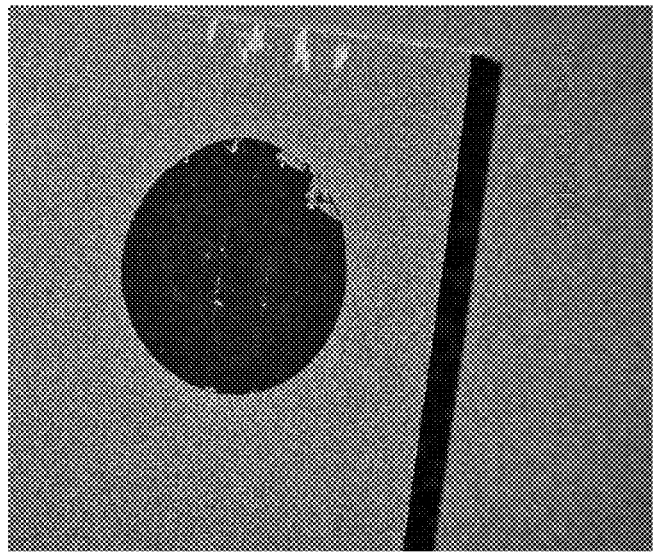
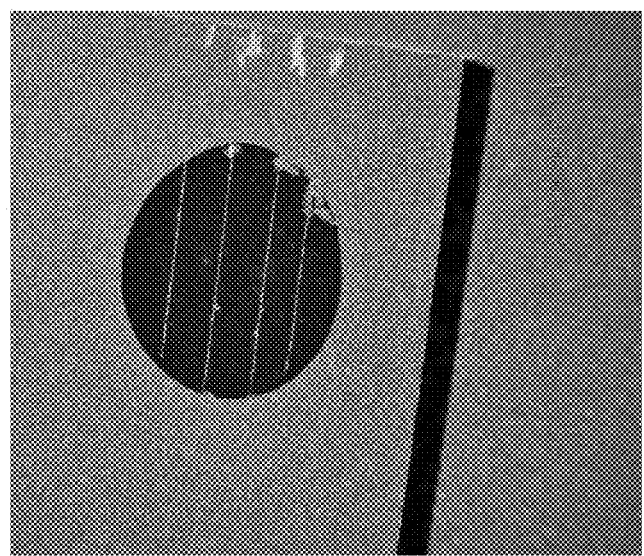
Fig. 13

METHOD OF PREPARING A POLYROTAXANE AND POLYROTAXANE

FIELD OF THE INVENTION

The present invention relates to methods of preparing polyrotaxanes and polyrotaxanes which can be prepared by using such methods. Furthermore, the present invention relates to methods of preparing cross-linked polyrotaxanes and cross-linked polyrotaxanes which can be prepared using such methods. The invention also relates to products which contain the polyrotaxanes or cross-linked polyrotaxanes or which can be prepared from the polyrotaxanes or the cross-linked polyrotaxanes. The present invention further relates to the use of polyrotaxanes or cross-linked polyrotaxanes in various applications, such as the use as a self-healing material.

BACKGROUND OF THE INVENTION

Polyrotaxanes have become interesting materials for industrial applications, such as, for example, as materials for paints and adhesives.

Polyrotaxanes are supramolecular assemblies which comprise a ring-shaped molecule and a polymer. In a polyrotaxane the ring-shaped molecule is threaded by the polymer, wherein the polymer pierces through the opening of the ring-shaped molecule.

A known synthetic approach for obtaining a polyrotaxane comprises at first providing a polymer which has been synthesized before the polyrotaxane is formed. Then the polymer is mixed with the ring-shaped molecule, and the ring-shaped molecule is threaded by the polymer chain. In order to prevent the threaded ring-shaped molecule from leaving the polymer chain, blocking groups need to be placed at the ends of the polymer chain which prevent the ring-shaped molecule from leaving the polymer chain and thus disassembling of the polyrotaxane.

U.S. Pat. No. 7,943,718 B2 discloses a method of forming a polyrotaxane wherein a poly(ethylene glycol) is mixed with a cyclodextrin. The cyclodextrin is then threaded by the poly(ethylene glycol) chain to form an inclusion complex which is recovered from the reaction mixture. In the next step, the inclusion complex is dispersed in a reaction medium, and adamantyl groups are attached to both ends of the poly(ethylene glycol) chain. Since the adamantyl group is a sterically highly encumbering group, these groups prevent the cyclodextrin from leaving the poly(ethylene glycol) chain.

While poly(ethylene glycol) is a hydrophilic polymer, it has been turned out difficult to thread cyclodextrins on hydrophobic polymer chains, such as, for example, polyisoprene or polybutadiene. In addition, the synthesis disclosed in U.S. Pat. No. 7,943,718 B2 requires that the attachment of sterically encumbering groups which prevent the ring-shaped molecule from leaving the polymer chain is performed in a separate step. This makes the synthetic protocol more complex.

Polyrotaxanes are mostly synthesized by multistep procedures. These procedures are long and expensive and require the application of organic solvents that are environmentally disadvantageous.

Besides these disadvantages, a huge drawback of such synthesis methods is the low control over the fraction (coverage) of threaded macrocycles onto the polymer. Polyrotaxanes synthesized according to the mainly applied threading approach, generally show a high coverage (more than 50 wt. %) due to self-organization of the threaded rings via hydrogen bonds. Material properties of polyrotaxanes with high coverage are dominated by the properties of the macrocycles and show poor self-healing properties (Kato, K.; Okabe, Y.; Okazumi, Y.; Ito, K. Chem. Commun. (Camb). 2015, 51, 16180-16183). A recently developed method, rotaxa-polymerization overcomes the complex synthetic problem, and the synthesis of the polyrotaxane is performed in water in one-pot and within one-step using standard technology known for emulsion polymerization (Kali, G.; Eisenbarth, H.; Wenz, G. Macromol. Rapid Commun. 2016, 37, 67-72). The coverage of resulting polyrotaxanes highly depended on the nature of the monomer. For hydrophobic monomers, such as isoprene, or 1,3-dimethylbuthadiene it is unsatisfactory high (67 wt. %), while coverages are too low (<5 wt. %) for hydrophilic or partially hydrophilic monomers (e.g. methyl acrylate). It is still very difficult to thread a small amount of cyclodextrins onto polymers. Pseudo-stoppers had been attached to both ends of polyethylene glycol to kinetically control the number of threaded rings (Kato, K.; Okabe, Y.; Okazumi, Y.; Ito, K. Chem. Commun. (Camb). 2015, 51, 16180-16183).

There are other disadvantages of polyrotaxane based self-healing materials, mostly slide-ring gels. These materials are crosslinked through the threaded rings, without touching the polymeric backbones, resulting in 3D materials with self-healing properties, high degrees of swelling and elongations at break, due to the movable crosslinks. A great drawback is an application of hazardous crosslinking agents (e.g. cyanuric chloride (Okumura, Y.; Ito, K. Adv. Mater. 2001, 13, 485-487); and hexamethylene diisocyanate (Araki, J.; Kataoka, T.; Ito, K. Soft Matter 2008, 4, 245-249)) to crosslink polyrotaxane to slide-ring gels. From the application point of view, the low hardness of most slide ring gels is the main problem, since it does not allow any applications as consumer products like coatings for cars, furniture, etc.

There is hence a need for providing further methods of preparing a polyrotaxane which can be performed easily and which are broadly applicable, and for providing further polyrotaxanes.

SUMMARY OF THE INVENTION

These needs are addressed by the present invention as defined in the claims, described in the description, and illustrated in the Examples and Figures.

The present invention relates to a method of preparing a polyrotaxane, said method comprising: performing a radical copolymerization of at least (a) a first polymerizable monomer having a stopper group, and of at least (b) a second polymerizable hydrophobic monomer, wherein said second hydrophobic monomer is complexed by a ring-shaped molecule, and of at least (c) a third polymerizable hydrophilic monomer;
wherein during said copolymerization a copolymer threading said ring-shaped molecule is formed,
wherein during said copolymerization said first monomer having a stopper group is incorporated into the chain of said copolymer at least partially between the ends thereof, and
wherein said stopper groups prevent said ring-shaped molecule from disassembling from the copolymer; and
wherein the amount of said first monomer having a stopper group is of from 0.1 mol % to 20 mol %, based on 100 mol % of the total amount of polymerizable monomers.

In an embodiment of the method of preparing a polyrotaxane of the present invention, wherein a first monomer having a stopper group, a second hydrophobic monomer, and a third hydrophilic monomer are copolymerized, the method comprises the steps of:
(a) providing a composition comprising a ring-shaped molecule and the first polymerizable monomer having a stopper group;
(b) combining the second polymerizable hydrophobic monomer and the third polymerizable hydrophilic monomer with the composition of step (a) and forming a complex of said ring-shaped molecule with said second hydrophobic monomer; and
(c) performing a radical copolymerization on the composition of step (b) to form a polyrotaxane;
wherein during said copolymerization a random copolymer threading said ring-shaped molecule is formed, wherein during said copolymerization said first monomer having a stopper group is incorporated randomly along the chain of said copolymer.

The present invention also relates to a method of preparing a polyrotaxane, said method comprising: performing a radical copolymerization of at least (a) a first polymerizable monomer having a stopper group, and of at least (b) a second polymerizable partially hydrophilic monomer, wherein said second partially hydrophilic monomer is complexed by a ring-shaped molecule, and wherein said second partially hydrophilic monomer has a solubility in water at 20° C. of from 5 g/L to 40 g/L, preferably of from 10 g/L to 40 g/L, more preferably of from 15 g/L to 40 g/L, even more preferably of from 20 g/L to 30 g/L; wherein during said copolymerization a copolymer threading said ring-shaped molecule is formed, wherein during said copolymerization said first monomer having a stopper group is incorporated into the chain of said copolymer at least partially between the ends thereof, and wherein said stopper groups prevent said ring-shaped molecule from disassembling from the copolymer; and wherein the amount of said first monomer having a stopper group is of from 0.1 mol % to 20 mol %, based on 100 mol % of the total amount of polymerizable monomers.

In an embodiment of the method of preparing a polyrotaxane of the present invention, wherein a first monomer having a stopper group and a second partially hydrophilic monomer are copolymerized, the method comprises the steps of:
(a) providing a composition comprising a ring-shaped molecule, the first polymerizable monomer having a stopper group, and the second polymerizable partially hydrophilic monomer, and forming a complex of said ring-shaped molecule with said second partially hydrophilic monomer; and
(b) performing a radical copolymerization on the composition of step (a) to form a polyrotaxane;
wherein during said copolymerization a random copolymer threading said ring-shaped molecule is formed, wherein during said copolymerization said first monomer having a stopper group is incorporated randomly along the chain of said copolymer.

In an embodiment of the method of preparing a polyrotaxane of the present invention, wherein a first monomer having a stopper group and a second partially hydrophilic monomer are copolymerized, the performing of the radical copolymerization may comprise further copolymerizing at least (c) a third polymerizable hydrophobic monomer.

Accordingly, in an embodiment of the method of preparing a polyrotaxane of the present invention, wherein a first monomer having a stopper group, a second partially hydrophilic monomer, and a third hydrophobic monomer are copolymerized, the method comprises the steps of:
(a) providing a composition comprising a ring-shaped molecule and the first polymerizable monomer having a stopper group;
(b) combining the second polymerizable partially hydrophilic monomer and the third polymerizable hydrophobic monomer with the composition of step (a) and forming a complex of said ring-shaped molecule with said second partially hydrophilic monomer; and
(c) performing a radical copolymerization on the composition of step (b) to form a polyrotaxane;
wherein during said copolymerization a random copolymer threading said ring-shaped molecule is formed, wherein during said copolymerization said first monomer having a stopper group is incorporated randomly along the chain of said copolymer.

The present invention also relates to a polyrotaxane comprising a ring-shaped molecule and a copolymer threading said ring-shaped molecule, wherein said copolymer comprises at least (a) structural units derived from a first polymerizable monomer having a stopper group, at least (b) structural units derived from a second polymerizable hydrophobic monomer and at least (c) structural units derived from a third polymerizable hydrophilic monomer, wherein said structural units derived from the first monomer having a stopper group are incorporated into the chain of said copolymer at least partially between the ends thereof, wherein said stopper groups prevent the ring-shaped compound from disassembling from the copolymer, and wherein the amount of said structural units derived from the first monomer having a stopper group is 0.1 mol % to 20 mol % based on 100 mol % of the total amount of structural units of the copolymer.

The present invention also relates to a polyrotaxane comprising a ring-shaped molecule and a copolymer threading said ring-shaped molecule, wherein said copolymer comprises at least (a) structural units derived from a first polymerizable monomer having a stopper group and at least (b) structural units derived from a second polymerizable partially hydrophilic monomer, wherein said structural units derived from the first monomer having a stopper group are incorporated into the chain of said copolymer at least partially between the ends thereof, wherein said stopper groups prevent the ring-shaped compound from disassembling from the copolymer, and wherein the amount of said structural units derived from the first monomer having a stopper group is 0.1 mol % to 20 mol %, based on 100 mol % of the total amount of structural units of the copolymer, wherein said second partially hydrophilic monomer has a solubility in water at 20° C. of from 5 g/L to 40 g/L, preferably of from 10 g/L to 40 g/L, more preferably of from 15 g/L to 40 g/L, and even more preferably of from 20 g/L to 30 g/L.

In an embodiment of the polyrotaxane of the present invention, wherein a first monomer having a stopper group and a second partially hydrophilic monomer are copolymerized, the polyrotaxane further comprises at least (c) structural units derived from a third polymerizable hydrophobic monomer.

Accordingly, an embodiment of the present invention also relates to a polyrotaxane comprising a ring-shaped molecule and a copolymer threading said ring-shaped molecule, wherein said copolymer comprises at least (a) structural units derived from a first polymerizable monomer having a stopper group, at least (b) structural units derived from a second polymerizable partially hydrophilic monomer and at least (c) structural units derived form a third polymerizable hydrophobic monomer, wherein said structural units derived from the first monomer having a stopper group are incorporated into the chain of said copolymer at least partially between the ends thereof, wherein said stopper groups prevent the ring-shaped compound from disassembling from the copolymer, and wherein the amount of said structural units derived from the first monomer having a stopper group is 0.1 mol % to 20 mol %, based on 100 mol % of the total amount of structural units of the copolymer, wherein said second partially hydrophilic monomer has a solubility in water at 20° C. of from 5 g/L to 40 g/L, preferably of from 10 g/L to 40 g/L, more preferably of from 15 g/L to 40 g/L, and even more preferably of from 20 g/L to 30 g/L.

In one embodiment of any one of the polyrotaxanes of the present invention, the polyrotaxane is obtainable or is obtained by any one of the methods of the present invention described herein.

In one embodiment of any one of the polyrotaxanes of the present invention, said copolymer is a random copolymer, wherein said structural units derived from said first polymerizable monomer having a stopper group are incorporated randomly along the chain of said copolymer at least partially between the ends thereof.

The present invention further relates to a method of preparing a cross-linked polyrotaxane, said method comprising the steps of (a) providing a polyrotaxane as described herein and of (b) chemically or physically cross-linking said polyrotaxane.

Accordingly, the present invention also relates to a cross-linked polyrotaxane, wherein any polyrotaxane described herein is chemically or physically cross-linked.

The present invention also relates to the use of a polyrotaxane or a cross-linked polyrotaxane described herein as a self-healing material.

The present invention further relates to a method of coating of a surface with a polyrotaxane, the method comprising coating a solution or a dispersion containing a polyrotaxane described herein onto the surface.

Also, the present invention relates to the use of a polyrotaxane described herein or a cross-linked polyrotaxane described herein as an adhesive.

The present invention further relates to a dispersion comprising metal and/or metal oxide particles and a polyrotaxane described herein.

The present invention also relates to a composite comprising metal and/or metal oxide particles and a polyrotaxane described herein.

The present invention also relates to a hardened material obtained by heating a polyrotaxane described herein or a dispersion described herein in the absence of any crosslinking agent at temperatures between 80° C. and 150° C., preferably between 100° C. and 130° C., and more preferably at 120° C.

BRIEF DESCRIPTION OF THE DRAWINGS

FIG. 6 shows an FT-IR spectrum of the polyrotaxane in accordance with Example 1a.

FIG. 9 shows the results of a microhardness test at 25° C. of the polyrotaxane in accordance with Example 1a.

FIG. 13 shows photographs of a thin film (thickness 80 µm) obtained through the casting of polyrotaxane according to Example 1a from solution in THF and annealing for 16 h at 120° C. as described in Example 3. Sample according to (a) after application of scratches using a steel brush (b) sample according to (a) after heating at 85° C. for 1 h; Sample diameter 11 mm.

DETAILED DESCRIPTION OF THE INVENTION

It was an object of the present invention to provide further methods of preparing a polyrotaxane which can be performed easily and which are broadly applicable.

Thus, the present invention relates to a method of preparing a polyrotaxane, said method comprising:
performing a radical copolymerization of at least (a) a first polymerizable monomer having a stopper group, and of at least (b) a second polymerizable hydrophobic monomer, wherein said second hydrophobic monomer is complexed by a ring-shaped molecule, and of at least (c) a third polymerizable hydrophilic monomer;

wherein during said copolymerization a copolymer threading said ring-shaped molecule is formed, wherein during said copolymerization said first monomer having a stopper group is incorporated into the chain of said copolymer at least partially between the ends thereof, and wherein said stopper groups prevent said ring-shaped molecule from disassembling from the copolymer; and wherein the amount of said first monomer having a stopper group is of from 0.1 mol % to 20 mol %, based on 100 mol % of the total amount of polymerizable monomers.

The present invention further relates to a method of preparing a polyrotaxane, said method comprising:

performing a radical copolymerization of at least (a) a first polymerizable monomer having a stopper group, and of at least (b) a second polymerizable partially hydrophilic monomer, wherein said second partially hydrophilic monomer is complexed by a ring-shaped molecule, and wherein said second partially hydrophilic monomer has a solubility in water at 20° C. of from 5 g/L to 40 g/L;

wherein during said copolymerization a copolymer threading said ring-shaped molecule is formed, wherein during said copolymerization said first monomer having a stopper group is incorporated into the chain of said copolymer at least partially between the ends thereof, and wherein said stopper groups prevent said ring-shaped molecule from disassembling from the copolymer; and wherein the amount of said first monomer having a stopper group is of from 0.1 mol % to 20 mol %, based on 100 mol % of the total amount of polymerizable monomers.

The solubility of the monomers described herein is either taken from the solubility data according to GESTIS Stoffdatenbank, or—if not available—is determined by dissolving the maximum amount in deionized water at 20° C.

Figure 1:
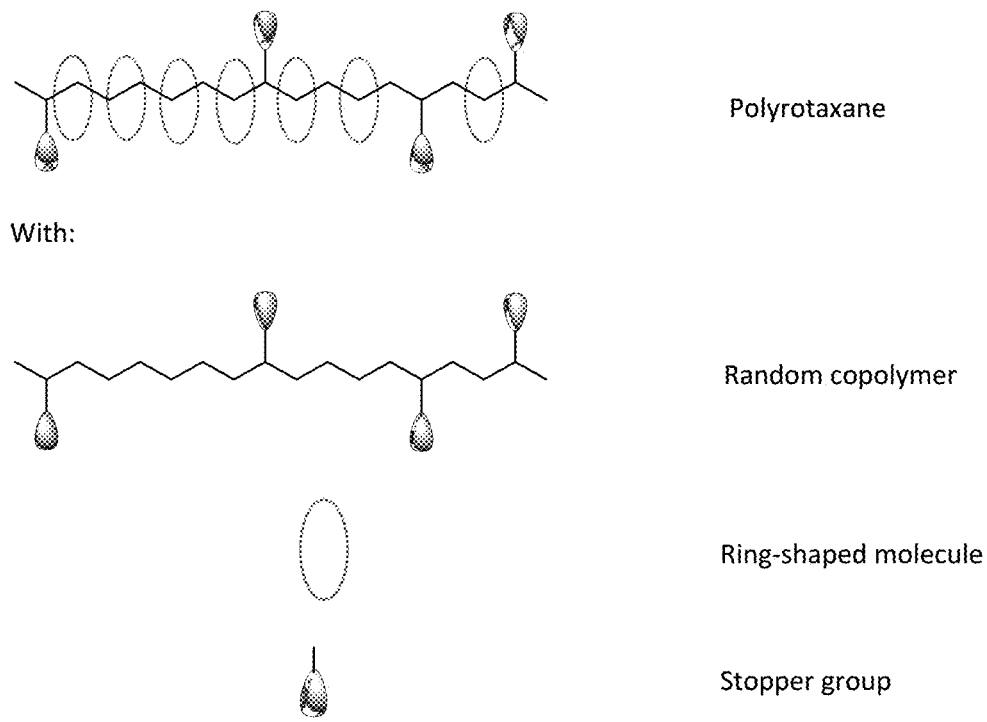
FIG. 1 shows schematic representations of polyrotaxanes in accordance with embodiments of the present invention.
Figure 3:
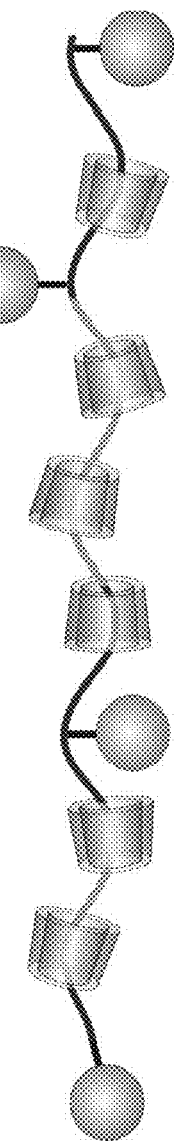
FIG. 3 shows a schematic presentation of polyrotaxanes in accordance with embodiments of the present investigation.

As used herein throughout the description, the term "polyrotaxane" relates to a supramolecular assembly which comprises a ring-shaped molecule and a copolymer. FIG. 1 depicts schematic illustrations of polyrotaxanes in accordance with the present invention. As shown in FIG. 1 the ring-shaped molecule is threaded by the chain of the copolymer. Similarly, FIG. 3 shows a schematic illustration of polyrotaxanes in accordance with the present invention; wherein the polymer chain has bulky groups which have the function of the stopper groups and ring-shaped molecules which are threaded by the polymer chain. With this regard, the term "ring-shaped molecule" refers to any cyclic molecule which has an inner opening, also denoted as cavity, wherein the opening is big enough for being pierced through by the copolymer. In other words, the copolymer threads the ring-shaped molecule by piercing through the opening thereof. However, the ring-shaped molecule is not covalently bonded to the copolymer so that the ring-shaped molecule may rotate around the copolymer which forms an axis. In addition, in the polyrotaxane, the ring-shaped molecule is movable along the copolymer. Such movability along the axis occurs within a section of the copolymer having a substantially linear structure, which section is in general formed from the second and/or third polymerizable monomer. With this regard, the term "substantially linear" does not exclude that such section is branched as far as the section having a substantially linear structure can thread the ring-shaped molecule in such a manner that the ring-shaped molecule is rotatable and exhibits movability along the section. In addition, a first polymerizable monomer having a stopper group is incorporated into the copolymer. Structural units of the copolymer derived from this first monomer having a stopper group prevent the ring-shaped molecule from leaving from the copolymer. In particular, the stopper groups block the movability of the ring-shaped molecule along the copolymer thereby preventing the ring-shaped molecule from disassembling from the copolymer. Hence, these stopper groups provide stability to the supramolecular structure of the polyrotaxane. With this regard, the term "stopper group" as used in the present disclosure, in general, refers to a part of the first monomer having steric bulk which is sufficient to block the movability of the ring-shaped molecule along the copolymer. For example, in order to block the movability of the ring-shaped molecule along the copolymer, the stopper group may be described as having a cross-section greater than the cross-section of the opening of the ring-shaped molecule. In any one of the methods of preparing a polyrotaxane and in any one of the polyrotaxanes described herein, the first monomer having a stopper group is incorporated at least partially between the ends of the copolymer. This means that the copolymer chain exhibits stopper groups at inner portions of the chain which are located between the chain ends. In any one of the polyrotaxanes disclosed herein, it is not even required that stopper groups be located at the ends of the copolymer. However, it is not excluded that in addition to stopper groups between the ends a stopper group is located at one or more ends of the copolymer. With this regard, the term "end of the copolymer" or "end thereof" denotes a terminal position of the copolymer chain. By setting the upper limit of the first molecule having a stopper group to 20 mol % based on 100 mol % of the total amount of polymerizable monomers there are provided sections comprising structural units derived from the second monomer, or derived from the second monomer and the third monomer having sufficient length for allowing movability of the ring-shaped molecule along the copolymer.

The term "at least" as used in connection with the first monomer, the second monomer and the third monomer with regard to any one of the methods of preparing a polyrotaxane and to any one of the polyrotaxanes described herein is to be understood that more than one first monomer having a stopper group and/or more than one second monomer and/or more than one third monomer can be employed. In other words, one, two, three or even more different first monomers having a stopper group may be used. Similarly, one, two, three or even more different second monomers may be employed. Similarly, one, two, three or even more different third monomers may be employed. However, in some embodiments, only one first and only one second monomer is used. However, in some embodiments, only one first monomer, only one second monomer, and only one third monomer are used. In case that more than one first monomer is used, the upper limit of 20 mol % based on 100 mol % of the total amount of polymerizable monomers refers to the combined amounts of the first monomers.

The term "monomer" or "polymerizable monomer" as used herein throughout this description, in general, denotes a reactive molecule which can undergo polymerization thereby contributing many constitutional units, which are denoted as repeating units, to a polymer. Accordingly, the term "polymer" as used herein, in general, refers to a macromolecule which comprises many repeating subunits derived from one or more monomers. As purely illustrative examples, a monomer is a molecule having a carbon-carbon double bond or a molecule having at least two functional groups per molecule. In particular, a monomer may be a molecule having a low molecular weight.

Regarding the methods of preparing a polyrotaxane described herein, the second polymerizable monomer—which is a hydrophobic monomer when a first monomer having a stopper group, a second hydrophobic monomer and a third hydrophilic monomer are copolymerized, or which is a partially hydrophilic monomer when a first monomer having a stopper group, a second partially hydrophilic monomer and optionally a third hydrophobic monomer are polymerized—is complexed by the ring-shaped molecule. Such complexation is typically effected by the inclusion of the second polymerizable monomer in the opening of the ring-shaped molecule. Then the second polymerizable monomer, which is complexed by the ring-shaped molecule, is copolymerized with the first monomer, or with the first and the third monomer. With this regard, complexation of the first monomer having a stopper group and/or the third monomer by a ring-shaped molecule is not necessary for the methods of the present invention. However, complexation of the first monomer and/or the third monomer is also not excluded. In this regard, when a first monomer having a stopper group, a second hydrophobic monomer and a third hydrophilic monomer are copolymerized, also the first monomer and/or the third hydrophilic monomer may be complexed by the ring-shaped molecule. In embodiments where a first monomer having a stopper group, a second partially hydrophilic monomer and a third hydrophobic monomer are copolymerized, also the first monomer and/or the third hydrophobic monomer may be complexed by the ring-shaped molecule. By the methods of the present invention a polyrotaxane wherein the ring-shaped molecule is threaded by the copolymer is formed directly. This means that in contrast to methods of preparing a polyrotaxane known from the prior art, wherein the ring-shaped molecule is threaded on a polymer chain which has been prepared in advance, by performing the methods of the present disclosure no separate threading step is required since the formation of the copolymer and the polyrotaxane take place in one step.

Furthermore, methods of preparing a polyrotaxane known from the prior art such as U.S. Pat. No. 7,943,718 B2, wherein the ring-shaped molecule is threaded on a polymer chain which has been prepared in advance, require that after threading of the ring-shaped molecule the inclusion complex formed is isolated and that afterwards in a further step the ends of the polymer chain are capped with bulky blocking groups which prevent the ring-shaped molecule from leaving the polymer chain. On the other hand, by employing the methods of preparing a polyrotaxane described herein the first monomer having a stopper group which prevents the ring-shaped molecule from disassembling is incorporated into the copolymer during the copolymerization. Therefore, as an additional advantage, a separate step of attaching groups to the polymer chain which prevent the ring-shape molecule from leaving the polymer after polymerization may be omitted when performing the methods of preparing a polyrotaxane as described herein. Consequently, the present methods can save additional steps.

Analytical methods for proving the existence of the polyrotaxane structure are known to the person skilled in the art. For example, the structure of soluble polyrotaxanes can be assessed using (a) Nuclear Overhauser NMR spectroscopy (NOESY) (see, for example, A. Harada, J. Li, M. J. Kamachi, J. Am. Chem. Soc. 1994, 116, 3192-3196), (b) diffusion-ordered NMR spectroscopy (DOSY), (see, for example, T. J. Zhao, H. W. Beckham, Macromolecules 2003, 36, 9859-9865), and (c) $^1$H NMR spectroscopy, wherein a broadening of the signal of a ring-shaped molecule such as a cyclodextrin is indicative of the threaded state (see, for example, C. Teuchert, C. Michel, F. Hausen, D.-Y. Park, H. W. Beckham, G. Wenz, Macromolecules 2013, 46, 2-7, supporting information). From crystalline samples the polyrotaxane structure can be obtained using X-ray scattering (see, for example, A. Harada, J. Li, M. Kamachi, Y. Kitagawa, Y. Katsube, Carbohydr. Res. 1998, 305, 127-129).

It is noted that polymerization of monomers complexed with a cyclodextrin is disclosed in the prior art, see, for example, WO 01/38408 A2 and WO 97/09354 A1. However, these documents describe recovering of the cyclodextrin after polymerization and do not make any reference to a polyrotaxane.

The copolymerization of the methods of preparing a polyrotaxane described herein is preferably performed as random copolymerization.

Accordingly, in one embodiment of the method of preparing a polyrotaxane of the present invention, a random copolymer is formed (see, for example, the exemplary polyrotaxane shown in FIG. 1). This method comprises the steps of:
(a) providing a composition comprising a ring-shaped molecule and the first polymerizable monomer having a stopper group;
(b) combining the second polymerizable hydrophobic monomer and the third polymerizable hydrophilic monomer with the composition of step (a) and forming a complex of said ring-shaped molecule with said second hydrophobic monomer; and
(c) performing a radical copolymerization on the composition of step (b) to form a polyrotaxane;
wherein during said copolymerization a random copolymer threading said ring-shaped molecule is formed, wherein during said copolymerization said first monomer having a stopper group is incorporated randomly along the chain of said copolymer. According to this method the first monomer having a stopper group, the second hydrophobic monomer and the third hydrophilic monomer are combined in step (b). Therefore, the first monomer having a stopper group, the second hydrophobic monomer and the third hydrophilic monomer are present in the reaction mixture during the copolymerization of step (c) at the same time. As a consequence, this method results in the formation of a random copolymer; wherein stopper groups are randomly distributed along the copolymer between the chain ends. The random copolymerization of this embodiment may be, as non-limiting examples, performed as free radical polymerization, as atom transfer radical polymerization (ATRP), or as reversible addition fragmentation chain transfer radical polymerization (RAFT polymerization).

Similarly, in one embodiment of the method of preparing a polyrotaxane of the present invention wherein the second monomer is a partially hydrophilic monomer, a random copolymer is formed (see, for example, the exemplary polyrotaxane shown in FIG. 1). This method comprises the steps of:
(a) providing a composition comprising a ring-shaped molecule, the first polymerizable monomer having a stopper group, and the second polymerizable partially hydrophilic monomer, and forming a complex of said ring-shaped molecule with said second partially hydrophilic monomer; and
(b) performing a radical copolymerization on the composition of step (a) to form a polyrotaxane;
wherein during said copolymerization a random copolymer threading said ring-shaped molecule is formed, wherein during said copolymerization said first monomer having a stopper group is incorporated randomly along the chain of said copolymer. According to this method the first monomer having a stopper group and the second partially hydrophilic monomer are combined in step (a). Therefore, the first monomer having a stopper group and the second partially hydrophilic monomer are present in the reaction mixture during the copolymerization of step (b) at the same time. As a consequence, this method results in the formation of a random copolymer; wherein stopper groups are randomly distributed along the copolymer between the chain ends. The random copolymerization of this embodiment may be, as non-limiting examples, performed as free radical polymerization, as atom transfer radical polymerization (ATRP), or as reversible addition fragmentation chain transfer radical polymerization (RAFT polymerization).

In an embodiment of the method of preparing a polyrotaxane of the present invention, wherein a first monomer having a stopper group and a second partially hydrophilic monomer are copolymerized, the performing of the radical copolymerization may comprise further copolymerizing at least (c) a third polymerizable hydrophobic monomer.

Accordingly, in an embodiment of the method of preparing a polyrotaxane of the present invention, wherein a first monomer having a stopper group, a second partially hydrophilic monomer, and a third hydrophobic monomer are copolymerized, the method comprises the steps of:
(a) providing a composition comprising a ring-shaped molecule and the first polymerizable monomer having a stopper group;
(b) combining the second polymerizable partially hydrophilic monomer and the third polymerizable hydrophobic monomer with the composition of step (a) and forming a complex of said ring-shaped molecule with said second partially hydrophilic monomer and/or with said third hydrophobic monomer; and
(c) performing a radical copolymerization on the composition of step (b) to form a polyrotaxane;
wherein during said copolymerization a random copolymer threading said ring-shaped molecule is formed, wherein during said copolymerization said first monomer having a stopper group is incorporated randomly along the chain of said copolymer. According to this method the first monomer having a stopper group, the second partially hydrophilic monomer and the third hydrophobic monomer are combined in step (b). Therefore, the first monomer having a stopper group, the second partially hydrophilic monomer and the third hydrophobic monomer are present in the reaction mixture during the copolymerization of step (c) at the same time. As a consequence, this method results in the formation of a random copolymer; wherein stopper groups are randomly distributed along the copolymer between the chain ends. The random copolymerization of this embodiment may be, as non-limiting examples, performed as free radical polymerization, as atom transfer radical polymerization (ATRP), or as reversible addition fragmentation chain transfer radical polymerization (RAFT polymerization).

In any one of the methods described herein, in general, the first monomer having a stopper group is used in an amount of from 0.1 mol % to 20 mol % based on 100 mol % of the total amount of polymerizable monomers. Accordingly, in any one of the polyrotaxanes described herein comprising a ring-shaped molecule and a copolymer threading the ring-shaped molecule, in general the amount of structural units derived from the first monomer having a stopper group is of from 0.1 mol % to 20 mol % based on 100 mol % of the total amount of structural units of the copolymer. In case that the amount of the monomer having a stopper group which is incorporated into the copolymer threading the ring-shaped molecule is higher than 20 mol % based on 100 mol % of the total amount of the polymerizable monomers, the amount of bulky stopper groups incorporated into the copolymer further increases, while the amount of the second monomer, or the second and the third monomer, incorporated into the copolymer decreases. The second monomer, or the second and the third monomer, form sections of the copolymer having a substantially linear structure. The ring-shaped molecules are threaded onto these substantially linear sections. These threaded ring-shaped molecules are rotatable as well as movable along such section having a substantially linear structure. In case that the amount of the first monomer having a stopper group exceeds 20 mol % based on 100 mol % of the total amount of the polymerizable monomer, the amount of the second monomer, or the amount of the second and the third monomer, incorporated into the copolymer further decreases. Accordingly, the length of the sections of the copolymer having a substantially linear structure, which is formed by the second monomer, or by the second and the third monomer, decreases. As a consequence, the free moving space of the ring-shaped molecules is reduced. Accordingly, the movability of the ring-shaped molecules along the copolymer chain is restricted. Such restriction of the movability of the ring-shaped molecules along the copolymer chain reduces the ability of the polyrotaxane to form mobile gels and slide ring gels which are useful as self-healing materials, surface coatings, adhesives and paints as described herein. In contrast, polyrotaxanes which are able to form gels and slide ring gels useful as self-healing materials, surface coatings, adhesives and paints, which represent important uses of the polyrotaxanes described herein, are obtained in case that in the methods disclosed herein the amount of the first monomer having a stopper group does not exceed 20 mol % based on 100 mol % of the total amount of polymerizable monomers. Accordingly, it is preferred that in any one of the polyrotaxanes described herein the amount of structural units derived from the first monomer having a stopper group does not exceed 20 mol % based on 100 mol % of the total amount of structural units of the copolymer. On the other hand, it is readily appreciated that a minimum amount of stopper groups in the copolymer is required in order to prevent the ring-shaped compounds from disassembling from the copolymer. Accordingly, in any one of the methods described herein the amount of the first monomer having a stopper group is in general at least 0.1 mol % based on 100 mol % of the total amount of the polymerizable monomer. Likewise, in any one of the polyrotaxanes described herein the amount of the structural units derived from the first monomer having a stopper group is in general at least 0.1 mol % based on 100 mol % of the total amount of structural units of the copolymer.

In some embodiments of any one of the methods of preparing a polyrotaxane of the present invention, the amount of said first monomer having a stopper group is of from 0.3 mol % to 18 mol % based on 100 mol % of the total amount of polymerizable monomers. Preferably, the amount of said first monomer having a stopper group is of from 0.5 mol % to 14 mol % based on 100 mol % of the total amount of polymerizable monomers. More preferably, the amount of said first monomer having a stopper group is of from 0.7 mol % to 10 mol % based on 100 mol % of the total amount of polymerizable monomers. Even more preferably, the amount of said first monomer having a stopper group is of from 0.9 mol % to 5 mol % based on 100 mol % of the total amount of polymerizable monomers. Most preferably, the amount of said first monomer is of from 1 mol % to 2.5 mol % based on 100 mol % of the total amount of polymerizable monomers.

Preferably, in some embodiments of any one of the methods of preparing a polyrotaxane described herein the ring-shaped molecule is threaded on the main chain of the copolymer.

This means that in preferred embodiments of the method a main-chain polyrotaxane is formed.

Preferably, in the embodiments of any one of the methods of preparing a polyrotaxane described herein radical polymerization or copolymerization is performed using a radical initiator. In some embodiments, a radical initiator is comprised in the composition provided in step (a) of any one of the methods described herein. In particular, the term "initiator" or "radical initiator" as used herein denotes a reactive molecule which is capable of starting a polymerization. In general, in a polymerization, the initiator may be used in low amounts compared to the amount of the monomer(s). The initiator may contribute a constitutional unit to the polymer.

It is preferred in the embodiments of any one of the methods of preparing a polyrotaxane of the present invention wherein the first monomer having a stopper group, the second hydrophobic monomer, and the third hydrophilic monomer is copolymerized that prior to step (b) a composition of the second polymerizable hydrophobic monomer and the third polymerizable hydrophilic monomer is provided which is then added to the composition provided in step (a). Herein, it is preferred that the composition of the second polymerizable hydrophobic monomer and the third polymerizable hydrophilic monomer further comprise a radical initiator.

Similarly, it is preferred in the embodiments of any one of the methods of preparing a polyrotaxane of the present invention wherein the first monomer having a stopper group, the second partially hydrophilic monomer, and the third hydrophobic monomer is copolymerized that prior to step (b) a composition of the second polymerizable partially hydrophilic monomer and the third polymerizable hydrophobic monomer is provided which is then added to the composition provided in step (a). Herein, it is preferred that the composition of the second polymerizable partially hydrophilic monomer and the third polymerizable hydrophobic monomer further comprise a radical initiator.

In some embodiments of any one of the methods described herein the composition provided in step (a) is deoxygenated before being subjected to polymerization. By deoxygenation, oxygen is at least partially, preferably substantially completely removed from the composition since otherwise oxygen may promote oxidation of the radical species during the copolymerization and therefore act as an inhibitor.

In some embodiments of any one of the methods of preparing a polyrotaxane the polymerization is initiated thermally and/or photochemically, in particular in case that the radical polymerization is performed using a radical initiator. In one embodiment the polymerization is initiated thermally. In another embodiment, the polymerization is initiated photochemically. In still another embodiment the polymerization is initiated thermally and photochemically. With this regard, the radical initiators used for thermal and/or photochemical initiation are not particularly limited, and the person skilled in the art may appropriately select and use any radical initiator suitable for thermal initiation and/or any radical initiator suitable for thermal initiation. Suitable radical initiators are, for example, selected from the group consisting of a persulfate, hydrogenperoxide, an organic peroxide, an azoinitiator, and any combination thereof.

In the embodiments of any one of the methods of preparing a polyrotaxane described herein, wherein a first monomer having a stopper group, a second hydrophobic monomer, and a third hydrophilic monomer are used, it is preferred that the resulting polyrotaxane is a terpolymer obtained by terpolymerization of said first polymerizable monomer having a stopper group, said second polymerizable hydrophobic monomer, wherein said second monomer is complexed by a ring-shaped molecule, and said third polymerizable hydrophilic monomer.

Similarly, in the embodiments of any one of the methods of preparing a polyrotaxane described herein, wherein a first monomer having a stopper group, a second partially hydrophilic monomer, and a third hydrophobic monomer are used, it is preferred that the resulting polyrotaxane is a terpolymer obtained by terpolymerization of said first polymerizable monomer having a stopper group, said second polymerizable partially hydrophilic monomer, wherein said second monomer is complexed by a ring-shaped molecule, and said third polymerizable hydrophobic monomer.

A variety of ring-shaped molecules used in polyrotaxanes may be employed in any one of the methods of preparing a polyrotaxane disclosed herein. For example, the ring-shaped molecule may be a crown ether, a cucurbit[n]uril, a calixarene, a cyclic amide and/or a transition metal complex. However, in some particularly preferred embodiments of any one of the methods of the present invention, the ring-shaped molecule is selected from the group consisting of a cyclodextrin, a cyclodextrin derivative and any combination thereof. In one embodiment the ring-shaped molecule is a cyclodextrin. In another embodiment, the ring-shaped molecule is a cyclodextrin derivative, preferably a neutral cyclodextrin derivative. In some embodiments of any one of the methods a cyclodextrin and a cyclodextrin derivative are used in combination. As known to a person skilled in the art the term "cyclodextrin" denotes a cyclic oligosaccharide compound. As non-limiting examples, such cyclic oligosaccharide compounds may comprise six saccharide unites (α-cyclodextrin), seven saccharide units (β-cyclodextrin), or eight saccharide units (γ-cyclodextrin).

In some embodiments of any one of the methods of preparing a polyrotaxane, the cyclodextrin or cyclodextrin derivative is selected from the group consisting of a native cyclodextrin, a methylated cyclodextrin, an acetylated cyclodextrin, a hydroxyethylated cyclodextrin, a hydroxypropylated cyclodextrin, a cationic cyclodextrin derivative, an anionic cyclodextrin derivative, a glucosylated cyclodextrin, a chemically reactive cyclodextrin derivative, and any combination thereof. In some embodiments the cyclodextrin or cyclodextrin derivative is selected from the group consisting of α-cyclodextrin, randomly methylated α-cyclodextrin, β-cyclodextrin, randomly methylated β-cyclodextrin (RAMEB), hydroxypropyl β-cyclodextrin, acetyl β-cyclodextrin, heptakis(2,6-di-O-methyl)-β-cyclodextrin, carboxymethyl-β-cyclodextrin, succinyl-β-cyclodextrin, (2-carboxyethyl)-β-cyclodextrin, β-cyclodextrin, sulfobutylated β-cyclodextrin, β-cyclodextrin sulfate, 6-monodeoxy-6monoamino-β-cyclodextrin hydrochloride, heptakis-6-deoxy-6-amino)-β-cyclodextrin, (2-hydroxy-3-N,N,N-trimethylamino)propyl-β-cyclodextrin, heptakis(2,6-tri-O-methyl)-β-cyclodextrin, mono-amino-β-cyclodextrin, sulfobutyl-β-cyclodextrin, γ-cyclodextrin, randomly methylated γ-cyclodextrin, a 2-hydroxy-3-N,N,N-trimethylaminopropyl-β-cyclodextrin halide, any salts thereof, and any combination thereof. In some embodiments said cyclodextrin or cyclodextrin derivative is an ionic cyclodextrin or an ionic cyclodextrin derivative selected from the group consisting of carboxymethyl-α-cyclodextrin sodium salt, carboxymethyl-β-cyclodextrin sodium salt, succinyl-α-cyclodextrin, succinyl-β-cyclodextrin, succinyl-γ-cyclodextrin, (2-carboxyethyl)-α-cyclodextrin, (2-Carboxyethyl)-β-cyclodextrin, α-cyclodextrin phosphate sodium salt, β-cyclodextrin phosphate sodium salt, γ-cyclodextrin phosphate sodium salt, sulfobutylated β-cyclodextrin sodium salt, sulfobutylated β-cyclodextrin sodium salt, sulfobutylated β-cyclodextrin sodium salt, α-cyclodextrin sulfate sodium salt, β-cyclodextrin sulfate sodium salt, γ-cyclodextrin sulfate sodium salt, 6-monodeoxy-6-monoamino-β-cyclodextrin hydrochloride, heptakis(6-deoxy-6-amino)-β-cyclodextrin heptahydrochloride, octakis(6-deoxy-6-amino)-γ-cyclodextrin octahydrochloride, (2-hydroxy-3-N,N,N-trimethylamino)propyl-β-cyclodextrin chloride, and any combination thereof.

In a preferred embodiment of any one of the methods of preparing a polyrotaxane, the cyclodextrin derivative is β-cyclodextrin or randomly methylated β-cyclodextrin (RAMEB), randomly methylated β-cyclodextrin even more preferred. RAMEB, also called methyl-β-cyclodextrin (CAS Number 128446-36-6), is produced in industrial scale from β-cyclodextrin. The methyl substituents are randomly distributed between the hydroxyl groups of positions 2, 3 and 6 at each of the anhydroglucose units.

The average degree of substitution (DS) per anhydroglucose unit depends on the producer and ranges between 1.3 and 2.3, preferably between 1.6 and 2.0. As an advantage, the solubility of RAMEB and its inclusion compounds in water is superior to the solubility of native β-cyclodextrin. β-cyclodextrin, in which all hydroxyl groups are unsubstituted, may be also denoted as "native β-cyclodextrin".

In any one of the methods of preparing a polyrotaxane, the first monomer is not particularly limited as far as the first monomer has a stopper group having sufficient steric bulk in order to block the movability of the ring-shaped molecule along the copolymer and to prevent the ring-shaped molecule from disassembling from the copolymer chain. Preferably, the first monomer having a stopper group is a vinyl monomer. The term "vinyl monomer" as used throughout this whole description in general denotes a monomer having a vinyl group. With this regard, the term "vinyl group" indicates the group —CH=CH$_2$. Optionally, the vinyl group can bear one or more substituent in place of any one of the hydrogen atoms, such as, for example, the methyl group in a poly(ethylene glycol) methacrylate. Preferably, the first monomer has a molecular weight of 70 g/mol or more. Accordingly, in some embodiments of any one of the methods of preparing a polyrotaxane the first monomer having a stopper group may have a molecular weight of from 70 g/mol to 1000 g/mol, preferably of from 100 g/mol to 500 g/mol.

In some embodiments of any one of the methods of preparing a polyrotaxane said first monomer is selected from the group consisting of myrcene, an aromatic vinyl monomer, N-isopropyl (meth)acrylamide, N-vinylcaprolactam, N-vinylcaprolactone, N-vinylimidazole, N-vinylpyrrolidone, a poly(ethylene glycol) (meth)acrylate, an α,ω-bis (meth)acrylate, hydroxyethyl methacrylate, N,N-dimethyl-2-amino-ethylmethacrylate, tetrahydrofurfuryl methacrylate, furfuryl methacrylate, 4-acryloylmorpholine, N-[tris(hydroxymethyl)methyl]acrylamide, maleimide, N-alkyl maleimides and any combination thereof. In some embodiments, wherein the first monomer having a stopper group is an aromatic vinyl monomer, said aromatic vinyl monomer is selected from the group consisting of optionally substituted styrene, optionally substituted styrenesulfonic acid, optionally substituted vinylpyridine, optionally substituted divinyl benzene, and any combination thereof. The term "optionally substituted" as referred to in the context of optionally substituted styrene, optionally substituted styrenesulfonic acid, optionally substituted vinylpyridine and optionally substituted divinyl benzene denotes one or more substituents independently selected from the group consisting of hydrogen, C1-C10 alkyl, C1-C10 heteroalkyl, C1-C10 haloalkyl, C1-C10 alkoxy, CN, nitro, halogen (F, Cl, Br, I), and the like. Preferably, in any one of the methods of preparing a polyrotaxane the first monomer is selected from the group consisting of styrene, N-isopropylacrylamide, N-vinylcaprolactone, N-vinylimidazole, N-vinylpyrrolidone, 2-hydroxyethylmethacrylate, N-[tris(hydroxymethyl)methyl]acrylamide, and any combination thereof. Even more preferred, in any one of the methods disclosed herein the first monomer having a stopper group is styrene or 2-hydroxyethylmethacrylate.

Also, the second monomer-which is a hydrophobic monomer when a first monomer having a stopper group, a second hydrophobic monomer and a third hydrophilic monomer are copolymerized, or which is a partially hydrophilic monomer when a first monomer having a stopper group, a second partially hydrophilic monomer, and optionally a third hydrophobic monomer, are copolymerized—is not particularly limited as far as the second monomer is capable of forming a section of the copolymer having a substantially linear structure. Hence, the second monomer may be a substantially linear monomer. As noted above, the term "substantially linear" does not exclude that such section is branched as far as the section having a substantially linear structure can thread the ring-shaped molecule in such a manner that the ring-shaped molecule is rotatable and exhibits movability along the section. Consequently, the second monomer may be branched, preferably only slightly branched, as far as said branching does not prevent rotatability and movability of the ring-shaped molecule along the copolymer. Preferably, the second monomer is a vinyl monomer. More preferably, both the first monomer having a stopper group and the second monomer are vinyl monomers. Preferably, in any one of the methods disclosed herein, the second monomer—which is a hydrophobic monomer when a first monomer having a stopper group, a second hydrophobic monomer and a third hydrophilic monomer are copolymerized, or which is a partially hydrophilic monomer when a first monomer having a stopper group, a second partially hydrophilic monomer and optionally a third hydrophobic monomer are copolymerized—has a molecular weight of 120 g/mol or less, more preferably of 110 g/mol or less.

In any one of the methods described herein, the second monomer—which is a hydrophobic monomer when a first monomer having a stopper group, a second hydrophobic monomer and a third hydrophilic monomer are copolymerized, or which is a partially hydrophilic monomer when a first monomer having a stopper group, a second partially hydrophilic monomer and optionally a third hydrophobic monomer are copolymerized—may be a non-ionic monomer. Preferably, the term "non-ionic monomer" as used herein with regard to any second or third monomer denotes a monomer having no charged functionalities when being in an aqueous solution having a pH in a range of from 2 to 11, more preferably of from 3 to 10. The term "non-ionic monomer" as used herein encompasses, for example, monomers having only structural units and/or functional groups which are not capable of forming ions, such as, for example, isoprene or methyl methacrylate. In addition, the term non-ionic monomer may also encompass monomers having a functional group which is generally capable of forming ions, such as, for example, a carboxylic add group, but which is in an uncharged state when being in an aqueous solution having a pH in a range of from 2 to 11, more preferably of from 3 to 10. Examples of such non-ionic monomers, which are uncharged within such a range of pH are acrylic acid and derivatives thereof having a carboxylic acid group, such as, for example, methacrylic add.

In the embodiments of the methods of preparing a polyrotaxane, wherein the first monomer having a stopper group, the second hydrophobic monomer and the third hydrophilic monomer are copolymerized, the second monomer is a hydrophobic monomer. As referred to herein in the context of the methods of preparing a polyrotaxane and the polyrotaxane, wherein a first monomer having a stopper group, a second hydrophobic monomer and a third hydrophilic monomer are copolymerized, the term "second hydrophobic monomer" denotes a monomer being insoluble in water or being sparingly soluble in water. For purposes of the methods of preparing a polyrotaxane and the polyrotaxanes described herein, wherein a first monomer having a stopper group, a second hydrophobic monomer and a third hydrophilic monomer are copolymerized, the second hydrophobic monomer preferably has a solubility in water at 20° C. of less than 20 g/L, more preferably of less than 10 g/L, still more preferably of less than 5 g/L and most preferably of less than 2 g/L It has so far been difficult to thread cyclodextrins on hydrophobic polymer chains, such as, for example, polyisoprene or polybutadiene chains, to obtain a polyrotaxane. Applying the methods disclosed herein wherein the second hydrophobic monomer is complexed with a cyclodextrin and then copolymerized, a polyrotaxane comprising a hydrophobic copolymer chain, such as, for example, a polyisoprene- or polybutadiene-containing copolymer chain, is easily obtained. Preferably, in embodiments of the methods of preparing a polyrotaxane wherein a first monomer having a stopper group, a second hydrophobic monomer and a third hydrophilic monomer are copolymerized, the second hydrophobic monomer has a molecular weight of 120 g/mol or less, more preferably of 110 g/mol or less. In some embodiments of the methods wherein a first monomer having a stopper group, a second hydrophobic monomer and a third hydrophilic monomer are copolymerized, the second hydrophobic monomer is selected from the group of vinyl monomers having a molecular weight less than 120 g/mol. Preferably, the second hydrophobic monomer is selected from the group of vinyl monomers having a molecular weight less 110 g/mol. In addition or alternatively, the second hydrophobic monomer may be selected from the group of vinyl monomers consisting of a 1,3-diene, N-alkylacrylamide, an alkylene and any combination thereof. In case that the second hydrophobic monomer is a 1,3-diene, said 1,3 diene is preferably selected from 1,3-butadiene, 2,3-dimethyl-1,3-butadiene, isoprene, chloroprene or any combination thereof. In case that the second hydrophobic monomer is an alkylene, said alkylene is preferably ethylene, propylene, isobutylene, or any combination thereof. In case that the second hydrophobic monomer is N-alkyl-acrylamide, said N-alkyl-acrylamide is preferably N, N-dimethylacrylamide. Hence, in one embodiment 1,3-butadiene is used. In one embodiment isoprene is used.

Also, the third hydrophilic monomer used in any one of the methods of the invention, wherein a first monomer having a stopper group, a second hydrophobic monomer and a third hydrophilic monomer are copolymerized, is not particularly limited as far as the third hydrophilic monomer is capable of forming a section—together with the second hydrophobic monomer—of the copolymer having a substantially linear structure. Hence, the third hydrophilic monomer may be a substantially linear monomer. As noted above, the term "substantially linear" does not exclude that such section is branched as far as the section having a substantially linear structure can thread the ring-shaped molecule in such a manner that the ring-shaped molecule is rotatable and exhibits movability along the section. Consequently, the third hydrophilic monomer may be branched, preferably only slightly branched, as far as said branching does not prevent rotatability and movability of the ring-shaped molecule along the copolymer. Preferably, the third hydrophilic monomer is a vinyl monomer. More preferably, the first monomer having a stopper group, the second hydrophobic monomer, and the third hydrophilic monomer are vinyl monomers. Preferably, in any one of the methods disclosed herein, wherein a first monomer having a stopper group, a second hydrophobic monomer and a third hydrophilic monomer are copolymerized, the third hydrophilic monomer has a molecular weight of 120 g/mol or less, more preferably of 100 g/mol or less. As referred to herein in the context of any one of the methods of preparing a polyrotaxane and any polyrotaxane, wherein a first monomer having a stopper group, a second hydrophobic monomer and a third hydrophilic monomer are copolymerized, the term "hydrophilic monomer" denotes a monomer being soluble in water. For purposes of the methods of preparing a polyrotaxane and the polyrotaxanes described herein, wherein a first monomer having a stopper group, a second hydrophobic monomer and a third hydrophilic monomer are copolymerized, the third hydrophilic monomer preferably has a solubility in water at 20° C. of 45 g/L or more, more preferably of from 45 g/L to 2500 g/L, still more preferably of from 50 g/L to 2100 g/L In addition or alternatively, the third hydrophilic monomer may be selected from the group consisting of methylacrylate, acrylamide, methacrylamide, acrylic acid, methacrylic acid, acrylonitrile, their derivatives, and any combination thereof, methylacrylate being most preferred. The third hydrophilic monomer may be a non-ionic monomer.

In the embodiments of the methods of preparing a polyrotaxane described herein, wherein a first monomer having a stopper group, a second hydrophobic monomer and a third hydrophilic monomer are copolymerized, the molar ratio of said second hydrophobic monomer to said third hydrophilic monomer is preferably in the range of from 1:5 to 5:1, preferably in the range of from 1:3 to 3:1, more preferably in the range of from 1:2 to 2:1, and even more preferred in the range of from 1:1.5 to 1.5:1.

In embodiments of the methods of preparing a polyrotaxane, wherein the first monomer having a stopper group and the second partially hydrophilic monomer are copolymerized, the second monomer is a partially hydrophilic monomer. In these embodiments, it is preferred that the copolymer consists of repeating units derived from the first monomer having a stopper group and the second partially hydrophilic monomer. In some embodiments, when a third hydrophobic monomer is further copolymerized, the copolymer comprises repeating units derived from the first monomer having a stopper group, the second partially hydrophilic monomer and the third hydrophobic monomer. Alternatively, when a third hydrophobic monomer is further copolymerized, the copolymer consists of repeating units derived from the first monomer having a stopper group, the second partially hydrophilic monomer and the third hydrophobic monomer.

As referred to herein in the context of any one of the methods of preparing a polyrotaxane and any polyrotaxane, wherein a first monomer having a stopper group, a second partially hydrophilic monomer, and optionally further a third hydrophobic monomer, are copolymerized, the term "second partially hydrophilic monomer" denotes a monomer being slightly soluble in water. For purposes of the methods of preparing a polyrotaxane and the polyrotaxanes described herein, wherein a first monomer having a stopper group and a second partially hydrophilic monomer, and optionally further a third hydrophobic monomer are copolymerized, the second partially hydrophilic monomer preferably has a solubility in water at 20° C. of from 5 g/L to 40 g/L, preferably of from 10 g/L to 40 g/L, more preferably of from 15 g/L to 40 g/L, even more preferably of from 20 g/L to 30 g/L In preferred embodiments of the methods of preparing a polyrotaxane and any polyrotaxane, wherein a first monomer having a stopper group, a second partially hydrophilic monomer, and optionally a third hydrophobic monomer are copolymerized, the second polymerizable partially hydrophilic monomer has a solubility in water at 20° C. of from 10 g/L to 40 g/L, preferably of from 15 g/L to 40 g/L, even more preferably of from 20 g/L to 30 g/L Preferably, in embodiments of the methods of preparing a polyrotaxane and any polyrotaxane, wherein a first monomer having a stopper group, a second partially hydrophilic monomer, and optionally a third hydrophobic monomer are copolymerized, the second partially hydrophilic monomer has a molecular weight of 120 g/mol or less, more preferably of 110 g/mol or less.

In addition or alternatively, in embodiments of the methods of preparing a polyrotaxane, wherein a first monomer having a stopper group and a second partially hydrophilic monomer, and optionally a third hydrophobic monomer are copolymerized, the second partially hydrophilic monomer may be vinyl acetate or methacrylonitrile, vinyl acetate being more preferred. Preferably, in this embodiment the first monomer having a stopper group is styrene and the second partially hydrophilic monomer is vinyl acetate. In embodiments of the methods of preparing a polyrotaxane, wherein a first monomer having a stopper group and a second partially hydrophilic monomer, and optionally a third hydrophobic monomer are copolymerized, the second partially hydrophilic monomer may be methyl methacrylate. In embodiments of the methods of preparing a polyrotaxane, wherein a first monomer having a stopper group and a second partially hydrophilic monomer, and optionally a third hydrophobic monomer are copolymerized, the second monomer may be N-alkyl-acrylamide, preferably N,N-dimethylacrylamide.

The third hydrophobic monomer used in any one of the methods of the invention, wherein a first monomer having a stopper group, a second partially hydrophilic monomer and a third hydrophobic monomer are copolymerized, is not particularly limited as far as the third hydrophobic monomer is capable of forming a section—together with the second partially hydrophilic monomer—of the copolymer having a substantially linear structure. Hence, the third hydrophobic monomer may be a substantially linear monomer. As noted above, the term "substantially linear" does not exclude that such section is branched as far as the section having a substantially linear structure can thread the ring-shaped molecule in such a manner that the ring-shaped molecule is rotatable and exhibits movability along the section. Consequently, the third hydrophobic monomer may be branched, preferably only slightly branched, as far as said branching does not prevent rotatability and movability of the ring-shaped molecule along the copolymer. Preferably, the third hydrophobic monomer has a molecular weight of 120 g/mol or less, more preferably of 110 g/mol or less.

In embodiments of the methods of preparing a polyrotaxane, wherein a first monomer having a stopper group, a second partially hydrophilic monomer and a third hydrophobic monomer are copolymerized, the third monomer is a hydrophobic monomer. As referred to herein in the context of the methods of preparing a polyrotaxane and the polyrotaxane, wherein a first monomer having a stopper group, a second partially hydrophilic monomer and a third hydrophobic monomer are copolymerized, the term "third hydrophobic monomer" denotes a monomer being insoluble in water or being sparingly soluble in water. For purposes of the methods of preparing a polyrotaxane and the polyrotaxanes described herein, wherein a first monomer having a stopper group, a second partially hydrophilic monomer and a third hydrophobic monomer are copolymerized, the third hydrophobic monomer preferably has a solubility in water at 20° C. of less than 10 g/L, more preferably of less than 5 g/L, even more preferably of less than 2 g/L Further, in preferred embodiments of the methods of preparing a polyrotaxane, wherein a first monomer having a stopper group, a second partially hydrophilic monomer and a third hydrophobic monomer are copolymerized, the second polymerizable partially hydrophilic monomer preferably has a solubility in water at 20° C. of from 10 g/L to 40 g/L, more preferably of from 15 g/L to 40 g/L, even more preferably of from 20 g/L to 30 g/L It has so far been difficult to thread cyclodextrins on hydrophobic polymer chains, such as, for example, polyisoprene or polybutadiene chains, to obtain a polyrotaxane. Applying the methods disclosed herein wherein the second partially hydrophilic monomer is complexed with a cyclodextrin and then copolymerized with a hydrophobic monomer, which may be optionally also complexed with a cyclodextrin, a polyrotaxane comprising a hydrophobic copolymer chain, such as, for example, a polyisoprene- or polybutadiene-containing copolymer chain, is easily obtained. In some embodiments of the methods wherein a first monomer having a stopper group, a second partially hydrophilic monomer and a third hydrophobic monomer are copolymerized, the third hydrophobic monomer is selected from the group of vinyl monomers having a molecular weight less than 120 g/mol. Preferably, the third hydrophobic monomer is selected from the group of vinyl monomers having a molecular weight less 110 g/mol. In addition or alternatively, the third hydrophobic monomer may be selected from the group of vinyl monomers consisting of a 1,3-diene, N-alkyl-acrylamide, an alkylene and any combination thereof. In case that the third hydrophobic monomer is a 1,3-diene, said 1,3 diene is preferably selected from 1,3-butadiene, 2,3-dimethyl-1,3-butadiene, isoprene, chloroprene or any combination thereof. In case that the third hydrophobic monomer is an alkylene, said alkylene is preferably ethylene, propylene, isobutylene, or any combination thereof. In case that the third hydrophobic monomer is N-alkyl-acrylamide, said N-alkyl-acrylamide is preferably N, N-dimethylacrylamide. Hence, in one embodiment 1,3-butadiene is used. In one embodiment isoprene is used. The third hydrophobic monomer may be a non-ionic monomer.

In the embodiments of the methods of preparing a polyrotaxane described herein, wherein a first monomer having a stopper group, a second partially hydrophilic monomer and a third hydrophobic monomer are copolymerized, the molar ratio of said third hydrophobic monomer to said second hydrophilic monomer is preferably in the range of from 1:5 to 5:1, preferably in the range of from 1:3 to 3:1, more preferably in the range of from 1:2 to 2:1, and even more preferred in the range of from 1:1.5 to 1.5:1.

In embodiments of the methods of preparing a polyrotaxane described herein, the use of the second hydrophobic monomer and the third hydrophilic monomer in the polymerization mixture, or the use of a second partially hydrophilic monomer having a solubility in between hydrophilic and hydrophobic monomers, optionally in combination with a third hydrophobic monomer, brings along the advantage that polyrotaxanes can be provided wherein the amount of threaded ring-shaped molecules can be adjusted. In particular, the amount of threaded ring-shaped molecules can be controlled in a relatively small amount of 5 to 50 wt. %, preferably in an amount of 10 to 40 wt. %, based on the whole weight of the polyrotaxane. In case of the use of a (high amount of) hydrophobic monomers the amount of threaded ring-shaped molecules is undesirably high (up to 70 wt. %), while coverages with the ring-shaped molecules are too low in case of the use of a (high amount of) hydrophilic monomer. A relatively low amount of ring-shaped molecule is preferred, since higher amounts of ring-shaped molecules may lead to polyrotaxanes having decreased self-healing properties.

In a preferred embodiment of the method of preparing a polyrotaxane disclosed herein, wherein a first monomer having a stopper group, a second hydrophobic monomer and a third hydrophilic monomer are copolymerized, the first monomer having a stopper group is styrene, the second hydrophobic monomer is 2,3-dimethyl-1,3-butadiene, the third hydrophilic monomer is methyl acrylate and the ring-shaped molecule is selected from a cyclodextrin, a cyclodextrin derivative and any combination thereof. Preferably, in this embodiment, the ring-shaped molecule is randomly methylated β-cyclodextrin (RAMEB). Preferably, when such monomers are used, the radical copolymerization is carried out in an aqueous medium, more preferably in water.

In another preferred embodiment of the method of preparing a polyrotaxane described herein, wherein a first monomer having a stopper group, a second hydrophobic monomer and a third hydrophobic monomer are copolymerized, the first monomer having a stopper group is 2-hydroxyethylmethacrylate, the second hydrophobic monomer is isoprene, the third hydrophobic monomer is methyl acrylate and the ring-shaped molecule is selected from a cyclodextrin, a cyclodextrin derivative and any combination thereof. Preferably, in this embodiment the ring-shaped molecule is β-cyclodextrin. Preferably, when such monomers are used, the radical copolymerization is carried out in an aqueous medium, more preferably in water.

In another preferred embodiment of the method of preparing a polyrotaxane disclosed herein, wherein a first monomer having a stopper group and a second partially hydrophilic monomer are copolymerized, the first monomer having a stopper group is styrene and the second partially hydrophilic monomer is vinyl acetate. In this embodiment, the ring-shaped molecule is preferably selected from a cyclodextrin, a cyclodextrin derivative and any combination thereof. More preferably, in this embodiment, the ring-shaped molecule is randomly methylated β-cyclodextrin (RAMEB). Preferably, when such monomers are used, the radical copolymerization is carried out in an aqueous medium, more preferably in water.

In a preferred embodiment of the method of preparing a polyrotaxane disclosed herein, wherein a first monomer having a stopper group, a second partially hydrophilic monomer and a third hydrophobic monomer are copolymerized, the first monomer having a stopper group is 2-hydroxyethyl methacrylate, the second partially hydrophilic monomer is vinyl acetate, the third hydrophobic monomer is isoprene and the ring-shaped molecule is selected from a cyclodextrin, a cyclodextrin derivative and any combination thereof. Preferably, in this embodiment, the ring-shaped molecule is β-cyclodextrin. Preferably, when such monomers are used, the radical copolymerization is carried out in an aqueous medium, more preferably in water.

According to preferred embodiments of any one of the methods of preparing a polyrotaxane disclosed herein the copolymerization is performed in an aqueous medium. For example, in any one of the methods disclosed herein the aqueous medium is an aqueous solution or suspension. Preferably, in any one of the methods disclosed herein the copolymerization is performed in water. In particular, performing the copolymerization in an aqueous medium is preferred in case that the ring-shaped molecule is selected from the group consisting of a cyclodextrin, a cyclodextrin derivative and any combination thereof. Without wishing to be bound by any theory, it is assumed that water assists in forming a complex of a cyclodextrin or cyclodextrin derivative and the second polymerizable monomer, in particular in case that the second monomer is a hydrophobic or a partially hydrophilic monomer as described herein.

In some embodiments, when the copolymerization of any one of the methods of preparing a polyrotaxane described herein is carried out in an aqueous medium, in particular in water, a solubilizer may be present which may improve the solubility of the organic compounds in the aqueous medium. In particular, the solubilizer may improve solubility of the ring-shaped molecule in the aqueous medium when the ring-shaped molecule is a cyclodextrin or a cyclodextrin derivative. In particular, the solubilizer may be used when the ring-shaped molecule is β-cyclodextrin. As an illustrative example, urea may be used as the solubilizer which improves solubility of a cyclodextrin or cyclodextrin derivative in an aqueous medium, in particular water. Urea may be used when the ring-shaped molecule is β-cyclodextrin. Other suitable solubilizers may be readily selected by a person skilled in the art.

In embodiments of any one of the methods of preparing a polyrotaxane described herein, particularly in the case that the copolymerization is performed in an aqueous medium, said copolymerization is performed using a water-soluble radical initiator. In some embodiments of any one of the methods of preparing a polyrotaxane disclosed herein, said water-soluble radical initiator is selected from the group consisting of a persulfate, hydrogenperoxide, organic peroxides, a hydrophilic azoinitiator, a water-soluble complex of an azoinitiator with a cyclodextrin or cyclodextrin derivative, and any combination thereof. In one embodiment a water-soluble complex of an azoinitiator with a cyclodextrin is used. In one embodiment a water-soluble complex of an azoinitiator with a cyclodextrin derivative is used. In another embodiment, a water-soluble complex of an azoinitiator with a cyclodextrin and a water-soluble complex of an azoinitiator with a cyclodextrin derivative are used in combination. In some embodiments the water-soluble radical initiator is selected from the group consisting of a peroxodisulfate, tert-butyl hydroperoxide, 2,2'-azobis[2-(2-imidazolin-2-yl)propane]dihydrochloride, azobis-isobutyramidine, 4,4'-Bis(dimethylamino)benzophenone, and any combination thereof, 2,2'-azobis[2-(2-imidazolin-2-yl)propane]dihydrochloride being most preferred. The radical initiators which may be used are not limited to initiators explicitly mentioned herein, and the skilled person knows how to select a suitable initiator for performing the methods of preparing a polyrotaxane disclosed herein. Suitable initiators are, for example, disclosed in Polymer Handbook, 4th Edition, by J. Barndrup, E. H. Immergut, E. A. Grulke, John Wiley and Sons, Inc., 1999, pp. II/2-II/69. Combinations of initiators disclosed in this reference can be suitably used as well.

Further to using a radical initiator, in particular in case that a water-soluble radical initiator is used, in some embodiments of any one of the methods of preparing a polyrotaxane disclosed herein an accelerator for radical initiation is used. For example, said accelerator for radical initiation is selected from the group consisting of a thiosulfate, a metabisulfite, N,N,N',N'-tetramethylethylene diamine or a salt thereof, ethylenediaminetetraacetic acid or a salt thereof, a peroxidase enzyme, and any combination thereof. As known to a person skilled in the art an accelerator for radical initiation may, for example, interact with a radical initiator to form a so-called redox-initiator. However, other mechanisms of interaction of an accelerator for radical initiation with a radical initiator may occur as well. Further, the accelerator for radical initiation is not limited to the aforementioned specific examples. With this regard, for example, any accelerator for radical initiation described in A. S. Sarac, Prog. Polym. Sci. 1999, 24, 1149-1204 may be appropriately selected and used by a person skilled in the art.

In some embodiments, the copolymerization of any one of the methods of preparing a polyrotaxane described herein is carried out using a chain transfer agent. Chain transfer agents are in particular used in the case that the copolymerization is carried out employing a RAFT-polymerization technique. In some embodiments, the chain transfer agent is selected from the group consisting of a dithioester, a xanthate, a dithiocarbamate, a trithiocarbonates, a derivative of any one of the aforementioned chain transfer agents, and any combination thereof. Such chain transfer agents have the following general structures

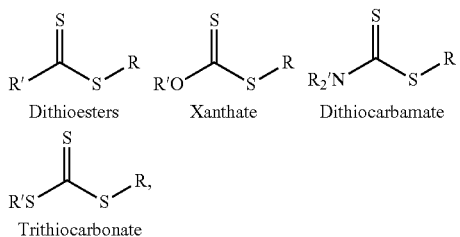

Dithioesters  Xanthate  Dithiocarbamate

Trithiocarbonate wherein the radicals R and R' may be independently selected from alkyl, aryl and the like and are in particular useful in case that the copolymerization of the methods disclosed herein is performed as RAFT polymerization. As an example, S,S'-bis(α,α'-dimethyl-α"-acetic acid)-trithiocarbonate can be used as chain transfer agent in any one of the methods described herein. As known by a skilled person, in case that the copolymerization is performed in an aqueous medium the chain transfer agent should preferably be soluble in water. In case that a cyclodextrin or a cyclodextrin derivative is used as the ring-shaped molecule, good results can also be achieved in case that the chain transfer agent is solubilized by the cyclodextrin or the cyclodextrin derivative. Without wishing to be bound by any theory, solubilization of the chain transfer agent may be achieved by forming a complex of the chain transfer agent with the cyclodextrin or cyclodextrin derivative. The chain transfer agents which can be used in the methods described herein are not limited to the aforementioned specific examples. Other chain transfer agents, such as those described in C. Barner-Kowollik, Handbook of RAFT Polymerization, Wiley-VCH, 2008, pp. 1-543, may be used.

In some embodiments the copolymerization of any one of the methods of preparing a polyrotaxane described herein is carried out using an irreversible chain transfer agent, such as e.g. carbon tetrachloride. Irreversible chain transfer agents are known to a person skilled in the art, and can be appropriately selected by the skilled person.

The technique for performing the radical copolymerization of any one of the methods of preparing a polyrotaxane of the present disclosure is not particularly limited. For example, in some embodiments, the radical copolymerization may be carried out using any free radical polymerization technique known to a person skilled in the art.

In some embodiments of any one of the methods of prearing a polyrotaxane, a controlled radical polymerization technique may be employed. With this regard, in some embodiments, the copolymerization is carried out using reversible addition-fragmentation chain transfer polymerization (RAFT polymerization). The RAFT polymerization applies chain transfer agents to control the molecular weight and polydispersity. After the initiation, the chain transfer agent can reversibly terminate the growing chains, and the fragment of the chain transfer agent starts new chains. The RAFT polymerization technique can depress the free radical concentration at any given time which results in the character of the polymerization as living polymerization. Suitable RAFT polymerization techniques are generally known to a person skilled in the art and can, for example, be found in the Handbook of RAFT Polymerization, C. Barner-Kowollik (Ed.), Wiley-VCH, Weinheim, 2008.

In other embodiments of any one of the methods of preparing a polyrotaxane disclosed herein, the copolymerization is carried out using atom transfer radical polymerization (ATRP). Also, ATRP represents a living polymerization technique. ATRP, also if applied in the methods of preparing a polyrotaxane described herein, uses an organohalide as initiator and a metal-ligand complex as a catalyst. The transfer of the halogen atom between the initiator, the propagating chain, and the catalyst provides a low concentration of the radicals at a given time. ATRP techniques are known to a person skilled in the art and are appropriately selected. For example, suitable ATRP techniques are described in K. Matyjaszewski, J. H. Xia, Chem. Rev. 2001, 101, 2921-2990. In some embodiments, in particular in case that the copolymerization is carried out in an aqueous medium, a combination of an initiator and a catalyst for said atom transfer radical polymerization is selected from the group consisting of a combination of a water-soluble initiator and catalyst, a combination of an initiator and a catalyst solubilized by cyclodextrins, and any combination thereof. In one embodiment the combination of an initiator and a catalyst for ATRP is a combination of a water-soluble initiator and a catalyst. In one embodiment the combination of an initiator and a catalyst for ATRP is a combination of an initiator and a catalyst solubilized by cyclodextrins. In other embodiments a combination of a water-soluble initiator and a catalyst is used in combination with a combination of an initiator and a catalyst solubilized by cyclodextrins. For example, the combination of a water-soluble initiator and a catalyst may be selected from the group consisting of a combination of a hydrophilic 2-halogeno-isobutyrate or a hydrophilic 2-halogenopropionate, a Cu(I) salt and a chelating diamine, a combination of a hydrophilic 2-halogeno-isobutyrate or a hydrophilic 2-halogenopropionate and a redox enzyme, and any combination thereof. In an embodiment, the combination of a water-soluble initiator and a catalyst is a combination of a hydrophilic 2-halogenoisobutyrate a Cu(I) salt and a chelating diamine. In an embodiment, the combination of a water-soluble initiator and a catalyst is a combination of a hydrophilic 2-halogenopropionate, a Cu(I) salt, and a chelating diamine. In an embodiment, the combination of a water-soluble initiator and a catalyst is a combination of a hydrophilic 2-halogenoisobutyrate and a redox enzyme. In an embodiment, the combination of a water-soluble initiator and a catalyst is a combination of a hydrophilic 2-halogenopropionate and a redox enzyme. In other embodiments, combinations of these combinations of a water-soluble initiator and a catalyst are used. In some embodiments the hydrophilic 2-halogenoisobutyrate is hydroxyethyl-2-bromoisobutyrate. In some embodiments the chelating diamine is selected from the group consisting of ethylenediamine, 2,2'-bipyridine (bpy), 4,4'-di(5-nonyl)-2,2'-bipyridine (dNbpy), N,N,N',N'-tetramethylethylenediamine (TMEDA), N-propyl(2-pyridyl)methanimine (NPrPMI), 2,2':6',2"-terpyridine (tpy), 4,4',4"-tris(5-nonyl)-2,2':6',2"-terpyridine (tNtpy), N,N,N',N",N"-pentamethyldiethylenetriamine (PMDETA), N,N-bis(2-pyridylmethyl)octylamine (BPMOA), 1,1,4,7,10,10-hexamethyl-triethylene-tetramine (HMTETA), tris[2-(dimethylamino)ethyl]amine (Me$_6$TREN), tris[(2-pyridyl)methyl]amine (TPMA), 1,4,8,11-tetraaza-1,4,8,11-tetramethylcyclotetradecane (Me4CYCLAM,N,N,N',N'-tetrakis(2-pyridylmethyl)ethylenediamine (TPEN), diethylenetriamine (DETA), triethylenetetramine (TETA), N,N-bis(2-pyridylmethyl)amine (BPMA), tris[2-aminoethyl]amine (TREN) 1,4,8,11-tetraazacyclotetradecane (CYCLAM) N,N,N',N'-tetrakis(2-pyridylmethyl)ethylenediamine (TPEN), N,N,N',N",N"-pentamethyldiethylenetriamine. Any combination of the aforementioned chelating diamines may be used. In some embodiments the redox enzyme is hemoglobin. An ATRP method using hemoglobin and being suitable for the copolymerization described herein is, for example, described in T. B. Silva, M. Spulber, M. K. Kocik, F. Seidi, H. Charan, M. Rother, S. J. Sigg, K. Renggli, G. Kali, N. Bruns, Biomacromolecules 2013, 14, 2703-2712.

The temperature at which the copolymerization of any one of the methods of preparing a polyrotaxane disclosed herein is performed is not particularly limited and can be appropriately selected by the skilled person. For example, in any one of the methods of preparing a polyrotaxane the copolymerization may be performed at a temperature of 80° C. or less. Preferably, the copolymerization is performed at a temperature of 40° C. or less. It is preferred to perform the copolymerization at a temperature of 0'C or more.

In any one of the methods of preparing a polyrotaxane described herein the polyrotaxane may be isolated using filtration. As an example, ultrafiltration may be used. The polyrotaxane may be heated before filtration. After filtration, the polyrotaxane may be dried. Preferably, drying of the polyrotaxane is performed using freeze drying. However, other suitable drying methods may be appropriately selected and applied by a person skilled in the art.

In some embodiments of any one of the methods of preparing a polyrotaxane described herein, the amount of threaded ring-shaped molecule in the polyrotaxane is in the range of from 5 wt. % to 50 wt. %, preferably in the range of from 10 wt. % to 40 wt. %, based on 100 wt. % of the total weight of the polyrotaxane.

The present invention also relates to a polyrotaxane comprising a ring-shaped molecule and a copolymer threading said ring-shaped molecule, wherein said copolymer comprises at least (a) structural units derived from a first polymerizable monomer having a stopper group, at least (b) structural units derived from a second polymerizable hydrophobic monomer and at least (c) structural units derived from a third polymerizable hydrophilic monomer, wherein said structural units derived from the first monomer having a stopper group are incorporated into the chain of said copolymer at least partially between the ends thereof, wherein said stopper groups prevent the ring-shaped compound from disassembling from the copolymer, and wherein the amount of said structural units derived from the first monomer having a stopper group is 0.1 mol % to 20 mol % based on 100 mol % of the total amount of structural units of the copolymer. In one embodiment the polyrotaxane of the invention, wherein a first monomer having a stopper group, a second hydrophobic monomer and a third hydrophilic monomer are copolymerized, may be a terpolymer.

The present invention also relates to a polyrotaxane comprising a ring-shaped molecule and a copolymer threading said ring-shaped molecule, wherein said copolymer comprises at least (a) structural units derived from a first polymerizable monomer having a stopper group and at least (b) structural units derived from a second polymerizable partially hydrophilic monomer, wherein said structural units derived from the first monomer having a stopper group are incorporated into the chain of said copolymer at least partially between the ends thereof, wherein said stopper groups prevent the ring-shaped compound from disassembling from the copolymer, and wherein the amount of said structural units derived from the first monomer having a stopper group is 0.1 mol % to 20 mol %, based on 100 mol % of the total amount of structural units of the copolymer, wherein said second partially hydrophilic monomer has a solubility in water at 20° C. of from 5 g/L to 40 g/L, preferably of from 10 g/L to 40 g/L, more preferably of from 15 g/L to 40 g/L, even more preferably of from 20 g/L to 30 g/L In an embodiment of the polyrotaxane of the present invention, wherein a first monomer having a stopper group and a second partially hydrophilic monomer are copolymerized, said copolymer further comprises at least (c) structural units derived from a third polymerizable hydrophobic monomer. Accordingly, in an embodiment of the polyrotaxane said copolymer comprises at least (a) structural units derived from a first polymerizable monomer having a stopper group, at least (b) structural units derived from a second polymerizable partially hydrophilic monomer, and at least (c) (c) structural units derived from a third polymerizable hydrophobic monomer. In one embodiment the polyrotaxane of the invention, wherein a first monomer having a stopper group, a second partially hydrophilic monomer and a third hydrophobic monomer are copolymerized, may be a terpolymer.

The copolymer threading the ring-shaped molecule of any one of the polyrotaxanes of the present invention is preferably a non-ionic copolymer, and the first, the second monomer (which is a hydrophobic monomer when a first monomer having a stopper group, a second hydrophobic monomer and a third hydrophilic monomer are copolymerized, or which is a partially hydrophilic monomer when a first monomer having a stopper group, a second partially hydrophilic monomer and optionally a third hydrophobic monomer are copolymerized) and—if present—the third monomer (which is a hydrophilic monomer when a first monomer having a stopper group, a second hydrophobic monomer and a third hydrophilic monomer are copolymerized, or which is a hydrophobic monomer when a first monomer having a stopper group, a second partially hydrophilic monomer, and optionally a third hydrophobic monomer are copolymerized) are non-ionic monomers. Preferably, the term "non-ionic monomer" as used herein also with regard to a polyrotaxane denotes a monomer having no charged functionalities when being in an aqueous solution having a pH in a range of from 2 to 11, more preferably of from 3 to 10. The term "non-ionic monomer" as used herein encompasses, for example, monomers having only structural units and/or functional groups which are not capable of forming ions, such as, for example, isoprene or methyl methacrylate. In addition, the term non-ionic monomer may also encompass monomers having a functional group which is generally capable of forming ions, such as, for example, a carboxylic add group, but which is in an uncharged state when being in an aqueous solution having a pH in a range of from 2 to 11, more preferably of from 3 to 10. Examples of such non-ionic monomers, which are uncharged within such a range of pH are acrylic acid and derivatives thereof having a carboxylic acid group, such as, for example, methacrylic acid. Preferably, the term "non-ionic copolymer" refers to a copolymer which has substantially no structural units comprising functionalities which are charged when being in an aqueous solution having a pH range of from 2 to 11, more preferably of from 3 to 10. The term "non-ionic copolymer" as used herein encompasses, for example, copolymers having only structural units and/or functional groups which are not capable of forming ions, such as, for example, structural units derived from isoprene or methyl methacrylate. In addition, the term non-ionic copolymer may also encompass copolymers having structural units and/or functional groups which are generally capable of forming ions, such as, for example, a carboxylic acid group, but which are in an uncharged state when being in an aqueous solution having a pH in a range of from 2 to 11, more preferably of from 3 to 10. Examples of such structural units which are uncharged within such a range of pH are structural units derived from acrylic acid and derivatives thereof having a carboxylic acid group, such as, for example, methacrylic add. With regard to a non-ionic copolymer, "having substantially no structural units comprising functionalities which are charged when being in an aqueous solution in a pH range of from 2 to 11, more preferably of from 3 to 10" preferably means that structural units comprising functionalities which are charged when being in an aqueous solution in a pH range of from 2 to 11, more preferably of from 3 to 10 are only present in the copolymer in minor amounts. For example, such structural units comprising functionalities which are charged when being in an aqueous solution in a pH range of from 2 to 11, more preferably of from 3 to 10 may derive from impurities of the monomers to be copolymerized, or from reactants used in the copolymerization reaction, such as, for example, initiators, catalysts and/or chain transfer agents, or also from ionic monomers that have been intentionally added to the reaction mixture. Preferably, the amount of structural units comprising functionalities which are charged when being in an aqueous solution in a pH range of from 2 to 11, more preferably of from 3 to 10 is less than 5 mol %, more preferably less than 3 mol %, still more preferably less than 2 mol %, most preferably less than 1 mol %, each based on 100 mol % of the structural units of the copolymer.

In preferred embodiments of any one of the polyrotaxanes of the present invention, the polyrotaxane is obtainable or is obtained by any one of the methods of the present invention described herein.

In a preferred embodiment of any one of the polyrotaxanes described herein the copolymer of the polyrotaxane of the present invention is a random copolymer, wherein said structural units derived from said first polymerizable monomer having a stopper group are incorporated randomly along the chain of said copolymer at least partially between the ends thereof.

In some embodiments of any one of the polyrotaxanes of the present invention, the amount of said structural units derived from a first monomer having a stopper group is of from 0.3 mol % to 18 mol % based on 100 mol % of the total amount of structural units of the copolymer. Preferably, the amount of said structural units derived from a first monomer having a stopper group is of from 0.5 mol % to 14 mol % based on 100 mol % of the total amount of structural units of the copolymer. More preferably, the amount of said structural units derived from a first monomer having a stopper group is of from 0.7 mol % to 10 mol % based on 100 mol % of the total amount of structural units of the copolymer. Even more preferably, the amount of structural units derived from said first monomer having a stopper group is of from 0.9 mol % to 5 mol % based on 100 mol % of the total amount of structural units of the copolymer. Most preferably, the amount of said structural units derived from a first monomer is of from 1 mol % to 2.5 mol % based on 100 mol % of the total amount of structural units of the copolymer.

Preferably, in some embodiments of any one of the polyrotaxanes described herein, the ring-shaped molecule is threaded on the main chain of the copolymer. This means that in preferred embodiments the polyrotaxane is a main-chain polyrotaxane.

A variety of ring-shaped molecules generally used in polyrotaxanes may be employed in any one of the polyrotaxanes described herein. For example, the ring-shaped molecule may be a crown ether, a cucurbit[n]uril, a calixarene, a cyclic amide and/or a transition metal complex. However, in some particularly preferred embodiments of any one of the polyrotaxanes of the present invention, the ring-shaped molecule is selected from the group consisting of a cyclodextrin, a cyclodextrin derivative and any combination thereof. In one embodiment the ring-shaped molecule is a cyclodextrin. In another embodiment, the ring-shaped molecule is a cyclodextrin derivative, preferably a neutral cyclodextrin derivative. In some embodiments of the polyrotaxanes a cyclodextrin and a cyclodextrin derivative are used in combination. As known to a person skilled in the art the term "cyclodextrin" denotes a cyclic oligosaccharide compound. As non-limiting examples, such cyclic oligosaccharide compounds may comprise six saccharide unites ($\alpha$-cyclodextrin), seven saccharide units ($\beta$-cyclodextrin), or eight saccharide units ($\gamma$-cyclodextrin).

In some embodiments of any one of the polyrotaxanes disclosed herein, the cyclodextrin or cyclodextrin derivative is selected from the group consisting of a native cyclodextrin, a methylated cyclodextrin, an acetylated cyclodextrin, a hydroxyethylated cyclodextrin, a hydroxypropylated cyclodextrin, a cationic cyclodextrin derivative, an anionic cyclodextrin derivative, a glucosylated cyclodextrin, a chemically reactive cyclodextrin derivative, and any combination thereof. In some embodiments of any one of the polyrotaxanes disclosed herein the cyclodextrin or cyclodextrin derivative is selected from the group consisting of $\alpha$-cyclodextrin, randomly methylated $\alpha$-cyclodextrin, $\beta$-cyclodextrin, randomly methylated $\beta$-cyclodextrin (RAMEB), hydroxypropyl $\beta$-cyclodextrin, acetyl $\beta$-cyclodextrin, heptakis(2,6-di-O-methyl)-$\beta$-cyclodextrin, carboxymethyl-$\beta$-cyclodextrin, succinyl-$\beta$-cyclodextrin, (2-carboxyethyl)-$\beta$-cyclodextrin, $\beta$-cyclodextrin, sulfobutylated $\beta$-cyclodextrin, β-cyclodextrin sulfate, 6-monodeoxy-6monoamino-β-cyclodextrin hydrochloride, heptakis-6-deoxy-6-amino)-β-cyclodextrin, (2-hydroxy-3-N,N,N-trimethylamino)propyl-β-cyclodextrin, heptakis(2,6-tri-O-methyl)-β-cyclodextrin, mono-amino-β-cyclodextrin, sulfobutyl-β-cyclodextrin, γ-cyclodextrin, randomly methylated γ-cyclodextrin, a 2-hydroxy-3-N,N,N-trimethylaminopropyl-β-cyclodextrin halide, any salts thereof, and any combination thereof. In some embodiments of any one of the polyrotaxanes disclosed herein said cyclodextrin or cyclodextrin derivative is an ionic cyclodextrin or an ionic cyclodextrin derivative selected from the group consisting of carboxymethyl-α-cyclodextrin sodium salt, carboxymethyl-β-cyclodextrin sodium salt, succinyl-α-cyclodextrin, succinyl-β-cyclodextrin, succinyl-γ-cyclodextrin, (2-carboxyethyl)-α-cyclodextrin, (2-Carboxyethyl)-β-cyclodextrin, α-cyclodextrin phosphate sodium salt, β-cyclodextrin phosphate sodium salt, γ-cyclodextrin phosphate sodium salt, sulfobutylated β-cyclodextrin sodium salt, sulfobutylated β-cyclodextrin sodium salt, sulfobutylated β-cyclodextrin sodium salt, α-cyclodextrin sulfate sodium salt, β-cyclodextrin sulfate sodium salt, γ-cyclodextrin sulfate sodium salt, 6-monodeoxy-6-monoamino-β-cyclodextrin hydrochloride, heptakis (6-deoxy-6-amino)-β-cyclodextrin heptahydrochloride, octakis(6-deoxy-6-amino)-γ-cyclodextrin octahydrochloride, (2-hydroxy-3-N,N,N-trimethylamino)propyl-β-cyclodextrin chloride, and any combination thereof. In a preferred embodiment of any one of the polyrotaxanes disclosed herein the cyclodextrin derivative is β-cyclodextrin or randomly methylated β-cyclodextrin (RAMEB), randomly methylated β-cyclodextrin even more preferred.

Regarding any one of the polyrotaxanes described herein, the first monomer is not particularly limited as far as the first monomer has a stopper group having sufficient steric bulk in order to block the movability of the ring-shaped molecule along the copolymer and to prevent the ring-shaped molecule from disassembling from the copolymer chain. Preferably, the first monomer having a stopper group is a vinyl monomer. The term "vinyl monomer" as used also with regard to the polyrotaxanes described herein in general denotes a monomer having a vinyl group. With this regard, the term "vinyl group" indicates the group —CH=CH$_2$. Optionally, the vinyl group can bear one or more substituent in place of any one of the hydrogen atoms, such as, for example, the methyl group in a poly(ethylene glycol) methacrylate. Preferably, regarding any one of the polyrotaxanes disclosed herein the first monomer has a molecular weight of 70 g/mol or more. Accordingly, in some embodiments of any one of the methods of preparing a polyrotaxane the first monomer having a stopper group may have a molecular weight of from 70 g/mol to 1000 g/mol, preferably of from 100 g/mol to 500 g/mol.

In some embodiments of any one of the polyrotaxanes disclosed herein said first monomer is selected from the group consisting of myrcene, an aromatic vinyl monomer, N-isopropyl (meth)acrylamide, N-vinylcaprolactam, N-vinylcaprolactone, N-vinylimidazole, N-vinylpyrrolidone, a poly(ethylene glycol) (meth)acrylate, an α,ω-bis(meth)acrylate, hydroxyethyl methacrylate, N,N-dimethyl-2-aminoethylmethacrylate, tetrahydrofurfuryl methacrylate, furfuryl methacrylate, 4-acryloylmorpholine, N-[tris(hydroxymethyl)methyl]acrylamide, maleimide, N-alkyl maleimides and any combination thereof.

In some embodiments, wherein the first monomer having a stopper group is an aromatic vinyl monomer, said aromatic vinyl monomer is selected from the group consisting of optionally substituted styrene, optionally substituted styrenesulfonic acid, optionally substituted vinylpyridine, optionally substituted divinyl benzene, and any combination thereof. The term "optionally substituted" as referred to in the context of optionally substituted styrene, optionally substituted styrenesulfonic acid, optionally substituted vinylpyridine and optionally substituted divinyl benzene denotes one or more substituents independently selected from the group consisting of hydrogen, C1-C10 alkyl, C1-C10 heteroalkyl, C1-C10 haloalkyl, C1-C10 alkoxy, CN, nitro, halogen (F, Cl, Br, I), and the like. Preferably, in any one of the polyrotaxanes disclosed herein the first monomer is selected from the group consisting of styrene, N-isopropylacrylamide, N-vinylcaprolactone, N-vinylimidazole, N-vinylpyrrolidone, 2-hydroxyethylmethacrylate, N-[tris (hydroxymethyl)methyl]acrylamide, and any combination thereof. Even more preferred, in any one of the polyrotaxanes disclosed herein the first monomer having a stopper group is styrene or 2-hydroxyethylmethacrylate.

Regarding the polyrotaxanes described herein, also the second monomer—which is a hydrophobic monomer when a first monomer having a stopper group, a second hydrophobic monomer and a third hydrophilic monomer are copolymerized, or which is a partially hydrophilic monomer when a first monomer having a stopper group, a second partially hydrophilic monomer and a third hydrophobic monomer are copolymerized—is not particularly limited as far as the second monomer is capable of forming a section of the copolymer having a substantially linear structure. Hence, the second monomer may be a substantially linear monomer. As noted above, the term "substantially linear" does not exclude that such section is branched as far as the section having a substantially linear structure can thread the ring-shaped molecule in such a manner that the ring-shaped molecule is rotatable and exhibits movability along the section. Consequently, the second monomer may be branched, preferably only slightly branched, as far as said branching does not prevent rotatability and movability of the ring-shaped molecule along the copolymer. Preferably, the second monomer is a vinyl monomer. More preferably, both the first monomer having a stopper group and the second monomer are vinyl monomers. Preferably, in any one of the polyrotaxanes disclosed herein, the second monomer—which is a hydrophobic monomer when a first monomer having a stopper group, a second hydrophobic monomer and a third hydrophilic monomer are copolymerized, or which is a partially hydrophilic monomer when a first monomer having a stopper group, a second partially hydrophilic monomer and a third hydrophobic monomer are copolymerized—has a molecular weight of 120 g/mol or less, more preferably of 110 g/mol or less.

In any one of the polyrotaxanes described herein, the second monomer—which is a hydrophobic monomer when a first monomer having a stopper group, a second hydrophobic monomer and a third hydrophilic monomer are copolymerized, or which is a partially hydrophilic monomer when a first monomer having a stopper group, a second partially hydrophilic monomer and optionally a third hydrophobic monomer are copolymerized—may be a non-ionic monomer. Preferably, the term "non-ionic monomer" as used herein denotes a monomer having no charged functionalities when being in an aqueous solution having a pH in a range of from 2 to 11, more preferably of from 3 to 10. The term "non-ionic monomer" as used herein encompasses, for example, monomers having only structural units and/or functional groups which are not capable of forming ions, such as, for example, isoprene or methyl methacrylate. In addition, the term non-ionic monomer may also encompass monomers having a functional group which is generally capable of forming ions, such as, for example, a carboxylic acid group, but which is in an uncharged state when being in an aqueous solution having a pH in a range of from 2 to 11, more preferably of from 3 to 10. Examples for such non-ionic monomers, which are uncharged within such a range of pH are acrylic acid and derivatives thereof having a carboxylic acid group, such as, for example, methacrylic acid.

In the embodiments of the polyrotaxanes according to the invention, wherein the first monomer having a stopper group, the second hydrophobic monomer and the third hydrophilic monomer are copolymerized, the second monomer is a hydrophobic monomer. As referred to herein in the context of any one of the polyrotaxanes according to the invention, wherein a first monomer having a stopper group, a second hydrophobic monomer and a third hydrophilic monomer are copolymerized, the term "second hydrophobic monomer" denotes a monomer being insoluble in water or being sparingly soluble in water. For purposes of the polyrotaxanes described herein, wherein a first monomer having a stopper group, a second hydrophobic monomer and a third hydrophilic monomer are copolymerized, the second hydrophobic monomer preferably has a solubility in water at 20° C. of less than 20 g/L, more preferably of less than 10 g/L, still more preferably of less than 5 g/L and most preferably of less than 2 g/L It has so far been difficult to thread cyclodextrins on hydrophobic polymer chains, such as, for example, polyisoprene or polybutadiene chains, to obtain a polyrotaxane. Preferably, in embodiments of the polyrotaxanes described herein wherein a first monomer having a stopper group, a second hydrophobic monomer and a third hydrophilic monomer are copolymerized, the second hydrophobic monomer has a molecular weight of 120 g/mol or less, more preferably of 110 g/mol or less. In some embodiments of the polyrotaxanes described herein, wherein a first monomer having a stopper group, a second hydrophobic monomer and a third hydrophilic monomer are copolymerized, the second hydrophobic monomer is selected from the group of vinyl monomers having a molecular weight less than 120 g/mol. Preferably, the second hydrophobic monomer is selected from the group of vinyl monomers having a molecular weight less 110 g/mol. In addition or alternatively, the second hydrophobic monomer may be selected from the group of vinyl monomers consisting of a 1,3-diene, N-alkyl-acrylamide, an alkylene and any combination thereof. In case that the second hydrophobic monomer is a 1,3-diene, said 1,3 diene is preferably selected from 1,3-butadiene, 2,3-dimethyl-1,3-butadiene, isoprene, chloroprene or any combination thereof. In case that the second hydrophobic monomer is an alkylene, said alkylene is preferably ethylene, propylene, isobutylene, or any combination thereof. In case that the second hydrophobic monomer is N-alkyl-acrylamide, said N-alkyl-acrylamide is preferably N,N-dimethylacrylamide. Hence, in one embodiment 1,3-butadiene is used. In one embodiment isoprene is used. It is preferred that the copolymer of the polyrotaxanes described herein, when a first monomer having a stopper group, a second hydrophobic monomer and a third hydrophilic monomer are copolymerized, be a copolymer having hydrophobic sections derived from the hydrophobicity of the second hydrophobic monomer in case that a cyclodextrin and/or cyclodextrin derivative is used. Cyclodextrins and cyclodextrin derivatives have a hydrophobic cavity, and therefore threading of cyclodextrins and/or cyclodextrin derivatives on hydrophobic sections of the copolymers results only in minor interactions between the copolymer and the ring-shaped molecule. Due to such minor interactions the rotatability and movability along the copolymer chain of the ring-shaped molecule are not significantly hindered.

Regarding the polyrotaxanes described herein, wherein a first monomer having a stopper group, a second hydrophobic monomer and a third hydrophilic monomer are copolymerized, also the third hydrophilic monomer is not particularly limited as far as the third hydrophilic monomer is capable of forming a section—together with the second hydrophobic monomer—of the copolymer having a substantially linear structure. Hence, the third hydrophilic monomer may be a substantially linear monomer. As noted above, the term "substantially linear" does not exclude that such section is branched as far as the section having a substantially linear structure can thread the ring-shaped molecule in such a manner that the ring-shaped molecule is rotatable and exhibits movability along the section. Consequently, the third hydrophilic monomer may be branched, preferably only slightly branched, as far as said branching does not prevent rotatability and movability of the ring-shaped molecule along the copolymer. Preferably, the third hydrophilic monomer is a vinyl monomer. More preferably, the first monomer having a stopper group, the second hydrophobic monomer, and the third hydrophilic monomer are vinyl monomers. Preferably, in any one of the polyrotaxanes disclosed herein, wherein a first monomer having a stopper group, a second hydrophobic monomer and a third hydrophilic monomer are copolymerized, the third hydrophilic monomer has a molecular weight of 120 g/mol or less, more preferably of 100 g/mol or less. As referred to herein in the context of any polyrotaxane according to the invention, wherein a first monomer having a stopper group, a second hydrophobic monomer and a third hydrophilic monomer are copolymerized, the term "third hydrophilic monomer" denotes a monomer being soluble in water. For purposes of the methods of preparing a polyrotaxane and the polyrotaxanes described herein, wherein a first monomer having a stopper group, a second hydrophobic monomer and a third hydrophilic monomer are copolymerized, the third hydrophilic monomer preferably has a solubility in water at 20° C. of 45 g/L or more, more preferably of from 45 g/L to 2500 g/L, still more preferably of from 50 g/L to 2100 g/L In addition or alternatively, the third hydrophilic monomer may be selected from the group consisting of methylacrylate, acrylamide, methacrylamide, acrylic acid, methacrylic add, acrylonitrile, their derivatives, and any combination thereof, methylacrylate being most preferred. The third hydrophilic monomer may be a non-ionic monomer.

In the embodiments of the polyrotaxanes described herein, wherein a first monomer having a stopper group, a second hydrophobic monomer and a third hydrophilic monomer are copolymerized, the molar ratio of said second hydrophobic monomer to said third hydrophilic monomer is preferably in the range of from 1:5 to 5:1, preferably in the range of from 1:3 to 3:1, more preferably in the range of from 1:2 to 2:1, and even more preferred in the range of from 1:1.5 to 1.5:1.

In the embodiments of the polyrotaxanes according to the invention, wherein the first monomer having a stopper group and the second partially hydrophilic monomer are copolymerized, the second monomer is a partially hydrophilic monomer. In these embodiments, it is preferred that the copolymer consists of repeating units derived from the first monomer having a stopper group and the second partially hydrophilic monomer. In some embodiments, when a third hydrophobic monomer is further copolymerized, the copolymer comprises repeating units derived from the first monomer having a stopper group, the second partially hydrophilic monomer and the third hydrophobic monomer. Alternatively, when a third hydrophobic monomer is further copolymerized, the copolymer consists of repeating units derived from the first monomer having a stopper group, the second partially hydrophilic monomer and the third hydrophobic monomer.

As referred to herein in the context of any polyrotaxane, wherein a first monomer having a stopper group and a second partially hydrophilic monomer, and optionally a third hydrophobic monomer are copolymerized, the term "second partially hydrophilic monomer" denotes a monomer being slightly soluble in water. For purposes of the polyrotaxanes described herein, wherein a first monomer having a stopper group and a second partially hydrophilic monomer, and optionally further a third hydrophobic monomer are copolymerized, the second partially hydrophilic monomer preferably has a solubility in water at 20° C. of from 5 g/L to 40 g/L, preferably of from 10 g/L to 40 g/L, more preferably of from 15 g/L to 40 g/L, even more preferably of from 20 g/L to 30 g/L In preferred embodiments of any polyrotaxane of the invention, wherein a first monomer having a stopper group, a second partially hydrophilic monomer, and optionally a third hydrophobic monomer are copolymerized, the second partially hydrophilic monomer has a solubility in water at 20° C. of from 10 g/L to 40 g/L, preferably of from 15 g/L to 40 g/L, even more preferably of from 20 g/L to 30 g/L Preferably, in embodiments of any polyrotaxane, wherein a first monomer having a stopper group, a second partially hydrophilic monomer, and optionally a third hydrophobic monomer are copolymerized, the second partially hydrophilic monomer has a molecular weight of 120 g/mol or less, more preferably of 110 g/mol or less.

In addition or alternatively, in embodiments of the polyrotaxane wherein a first monomer having a stopper group and a second partially hydrophilic monomer, and optionally a third hydrophobic monomer are copolymerized, the second partially hydrophilic monomer may be vinyl acetate or methacrylonitrile, vinyl acetate being more preferred. Preferably, in this embodiment the first monomer having a stopper group is styrene and the second partially hydrophilic monomer is vinyl acetate. In embodiments of the polyrotaxane, wherein a first monomer having a stopper group and a second partially hydrophilic monomer, and optionally a third hydrophobic monomer are copolymerized, the second partially hydrophilic monomer may be methyl methacrylate. In embodiments of the polyrotaxane, wherein a first monomer having a stopper group and a second partially hydrophilic monomer, and optionally a third hydrophobic monomer are copolymerized, the second monomer may be N-alkyl-acrylamide, preferably N,N-dimethylacrylamide.

The third hydrophobic monomer present in any one of the polyrotaxanes of the invention, wherein a first monomer having a stopper group, a second partially hydrophilic monomer and a third hydrophobic monomer are copolymerized, is not particularly limited as far as the third hydrophobic monomer is capable of forming a section—together with the second partially hydrophilic monomer—of the copolymer having a substantially linear structure. Hence, the third hydrophobic monomer may be a substantially linear monomer. As noted above, the term "substantially linear" does not exclude that such section is branched as far as the section having a substantially linear structure can thread the ring-shaped molecule in such a manner that the ring-shaped molecule is rotatable and exhibits movability along the section. Consequently, the third hydrophobic monomer may be branched, preferably only slightly branched, as far as said branching does not prevent rotatability and movability of the ring-shaped molecule along the copolymer. Preferably, the third hydrophobic monomer has a molecular weight of 120 g/mol or less, more preferably of 110 g/mol or less.

In embodiments of any polyrotaxane of the invention, wherein a first monomer having a stopper group, a second partially hydrophilic monomer and a third hydrophobic monomer are copolymerized, the third monomer is a hydrophobic monomer. As referred to herein in the context of any polyrotaxane of the invention, wherein a first monomer having a stopper group, a second partially hydrophilic monomer and a third hydrophobic monomer are copolymerized, the term "third hydrophobic monomer" denotes a monomer being insoluble in water or being sparingly soluble in water. For purposes of the polyrotaxanes described herein, wherein a first monomer having a stopper group, a second partially hydrophilic monomer and a third hydrophobic monomer are copolymerized, the third hydrophobic monomer preferably has a solubility in water at 20° C. of less than 10 g/L, more preferably of less than 5 g/L, even more preferably of less than 2 g/L Further, in preferred embodiments of the polyrotaxane, wherein a first monomer having a stopper group, a second partially hydrophilic monomer and a third hydrophobic monomer are copolymerized, the second polymerizable partially hydrophilic monomer preferably has a solubility in water at 20° C. of from 10 g/L to 40 g/L, more preferably of from 15 g/L to 40 g/L, even more preferably of from 20 g/L to 30 g/L It has so far been difficult to thread cyclodextrins on hydrophobic polymer chains, such as, for example, polyisoprene or polybutadiene chains, to obtain a polyrotaxane. In some embodiments of the polyrotaxanes wherein a first monomer having a stopper group, a second partially hydrophilic monomer and a third hydrophobic monomer are copolymerized, the third hydrophobic monomer is selected from the group of vinyl monomers having a molecular weight less than 120 g/mol. Preferably, the third hydrophobic monomer is selected from the group of vinyl monomers having a molecular weight less than 110 g/mol. In addition or alternatively, the third hydrophobic monomer may be selected from the group of vinyl monomers consisting of a 1,3-diene, N-alkyl-acrylamide, an alkylene and any combination thereof. In case that the third hydrophobic monomer is a 1,3-diene, said 1,3 diene is preferably selected from 1,3-butadiene, 2,3-dimethyl-1,3-butadiene, isoprene, chloroprene or any combination thereof. In case that the third hydrophobic monomer is an alkylene, said alkylene is preferably ethylene, propylene, isobutylene, or any combination thereof. In case that the third hydrophobic monomer is N-alkyl-acrylamide, said N-alkyl-acrylamide is preferably N, N-dimethylacrylamide. Hence, in one embodiment 1,3-butadiene is used. In one embodiment isoprene is used. The third hydrophobic monomer may be a non-ionic monomer.

In the embodiments of the polyrotaxanes described herein, wherein a first monomer having a stopper group, a second partially hydrophilic monomer and a third hydrophobic monomer are copolymerized, the molar ratio of said third hydrophobic monomer to said second hydrophilic monomer is preferably in the range of from 1:5 to 5:1, preferably in the range of from 1:3 to 3:1, more preferably in the range of from 1:2 to 2:1, and even more preferred in the range of from 1:1.5 to 1.5:1.

In embodiments of the polyrotaxanes described herein, the presence of sections in the copolymer derived from the second hydrophobic monomer and the third hydrophilic monomer, or the presence of sections in the copolymer derived from the second partially hydrophilic monomer having a solubility in between hydrophilic and hydrophobic monomers, optionally in combination with a third hydrophobic monomer, brings along the advantage that polyrotaxanes can be provided wherein the amount of threaded ring-shaped molecules can be adjusted. In particular, the amount of threaded ring-shaped molecule can be controlled in a relatively small amount of 5 to 50 wt. %, preferably in an amount of 10 to 40 wt. %, based on the whole weight of the polyrotaxane. In case of the use of a (high amount of) hydrophobic monomers the amount of threaded ring-shaped molecules is undesirably high (up to 70 wt. %), while coverages with the ring-shaped molecules are too low in case of the use of a (high amount of) hydrophilic monomer. A relatively low amount of ring-shaped molecule is preferred, since higher amounts of ring-shaped molecules may lead to polyrotaxanes having decreased self-healing properties.

In a preferred embodiment of any one of the polyrotaxanes disclosed herein, wherein a first monomer having a stopper group, a second hydrophobic monomer and a third hydrophilic monomer are copolymerized, the first monomer having a stopper group is styrene, the second hydrophobic monomer is 2,3-dimethyl-1,3-butadiene, the third hydrophilic monomer is methyl acrylate, and the ring-shaped molecule is selected from a cyclodextrin, a cyclodextrin derivative and any combination thereof. Preferably, in this embodiment, the ring-shaped molecule is randomly methylated β-cyclodextrin (RAMEB). It has been found that polyrotaxanes having this combination of monomers and ring-shaped molecules are soluble in water and soluble or dispersible in organic solvents, such as, for example, tetrahydrofuran, dimethylsulfoxide, or chloroform, preferably tetrahydrofuran.

In another preferred embodiment of any one of the polyrotaxanes as described herein, wherein a first monomer having a stopper group, a second hydrophobic monomer and a third hydrophilic monomer are copolymerized, the first monomer having a stopper group is 2-hydroxyethylmethacrylate, the second hydrophobic monomer is isoprene, the third hydrophilic monomer is methyl acrylate, and the ring-shaped molecule is selected from a cyclodextrin, a cyclodextrin derivative and any combination thereof. Preferably, in this embodiment the ring-shaped molecule is β-cyclodextrin. It has been found that polyrotaxanes having this combination of monomers, and ring-shaped molecules are soluble in organic solvents, such as, for example, tetrahydrofuran or chloroform, preferably tetrahydrofuran.

In another preferred embodiment of any one of the polyrotaxanes disclosed herein, wherein a first monomer having a stopper group and a second partially hydrophilic monomer are copolymerized, the first monomer having a stopper group is styrene and the second partially hydrophilic monomer is vinyl acetate. The ring-shaped molecule may be selected from a cyclodextrin, a cyclodextrin derivative and any combination thereof. Preferably, in this embodiment, the ring-shaped molecule is randomly methylated β-cyclodextrin (RAMEB). It has been found that polyrotaxanes having this combination of monomers, and ring-shaped molecules are soluble in organic solvents, such as, for example, tetrahydrofuran or chloroform, preferably tetrahydrofuran.

In a preferred embodiment of any one of the polyrotaxane disclosed herein, wherein a first monomer having a stopper group, a second partially hydrophilic monomer and a third hydrophobic monomer are copolymerized, the first monomer having a stopper group is 2-hydroxyethyl methacrylate, the second partially hydrophilic monomer is vinyl acetate, the third hydrophobic monomer is isoprene and the ring-shaped molecule is selected from a cyclodextrin, a cyclodextrin derivative and any combination thereof. Preferably, in this embodiment, the ring-shaped molecule is β-cyclodextrin. Preferably, when such monomers are used, the radical copolymerization is carried out in an aqueous medium, more preferably in water.

In some embodiments of any one of the polyrotaxanes described herein, the amount of threaded ring-shaped molecule in the polyrotaxane is in the range of from 5 wt. % to 50 wt. %, preferably in the range of from 10 wt. % to 40 wt. %, based on 100 wt. % of the total weight of the polyrotaxane.

The amount of threaded ring-shaped molecule in any one of the polyrotaxanes can be calculated from the total mass of a sample of the polyrotaxane, the total mass of the ring-shaped molecule threaded on the copolymer and the ring-shaped molecule not threaded on the copolymer, i.e. the sum of the mass of the threaded ring-shaped molecule and the free ring-shaped molecule present in the sample, and the mass of the free ring-shaped molecule present in the sample. A method of determining the amount of threaded ring-shaped molecule in the polyrotaxane is described, for example, in G. Kali, H. Eisenbarth, G. Wenz, "*One Pot Synthesis of a Polyisoprene Polyrotaxane and Conversion to a Slide-Ring Gel*", Macromol. Rapid. Commun. 2016, 37, 67-72 and Supporting Information to this publication.

The mass of the sample of the polyrotaxane is obtained simply by weighing.

The total mass of the ring-shaped molecule threaded on the copolymer and the ring-shaped molecule not threaded on the copolymer can be determined by polarimetry, i.e. by measuring the optical rotation α of a sample of the polyrotaxane in a suitable solvent, wherein the mass of said sample has been determined by weighing prior to dissolving. The total concentration c of the ring-shaped molecule is calculated using the following formula from the measured optical rotation α and the specific rotation [α] of the ring-shaped molecule which is either known from literature or can be easily determined by the skilled person using known methods:

$$c = \frac{\alpha}{[\alpha] \times l}$$

wherein:
c means the total concentration of ring-shaped molecule threaded on the copolymer and ring-shaped molecule not threaded on the copolymer;
α means the measured optical rotation of the sample;
[α] means the specific rotation of the ring-shaped molecule; and
l means the length of the cuvette.

From the concentration the total mass of the ring-shaped molecule threaded on the copolymer and ring-shaped molecule not threaded on the copolymer can be easily calculated by the following formula:

$$m = c \times V$$

wherein:
m means the total mass of the ring-shaped molecule threaded on the copolymer and ring-shaped molecule not threaded on the copolymer;
c means the total concentration of the ring-shaped molecule threaded on the copolymer and ring-shaped molecule not threaded on the copolymer; and V means the volume of the sample solution used for the measurement of the optical rotation.

The mass of the free-ring shaped molecule, i.e. the mass of the ring-shaped molecule not threaded on the copolymer, can be determined using, for example, isothermal titration calorimetric (ITC) measurement of a sample of the polyrotaxane the mass of which has been determined by weighing (see Example 1a and 2). The method of isothermal titration calorimetry is in general known to the skilled person and disclosed, for example, in Pierce, Michael M., Raman, C. S., Nall, Barry T. (1999), "*Isothermal Titration Calorimetry of Protein-Protein Interactions*", Methods 19 (2): 213-221, doi: 10.1006/meth.1999.0852; and O'Brien, R., Ladbury, J. E., and Chowdry, B. (2000), Isothermal titration calorimetry of biomolecules, Chapter 10 in Protein-Ligand interactions: hydrodynamics and calorimetry, Ed. Harding, S. E. and Chowdry, B1, Oxford University Press. In case the ring-shaped molecule is a cyclodextrin or cyclodextrin derivative, such as, for example, randomly methylated β-cyclodextrin (RAMEB), the isothermal titration calorimetry can be carried out using adamantane-1-carboxylate sodium salt for the titration, which forms a host-guest complex with the cyclodextrin or cyclodextrin derivative, wherein the cyclodextrin or cyclodextrin derivative is the host and the adamantane-1-carboxylate sodium salt is the guest. As an alternative to isothermal titration calorimetry, the mass of the free ring-shaped molecule can be determined by dissolving a sample of the polyrotaxane, wherein the mass of said sample has been determined by weighing prior to dissolving, in a solvent, precipitating the polyrotaxane, i.e. the copolymer and the ring-shaped molecules threaded thereon, from the solution using a suitable solvent in which the polyrotaxane is not soluble, separating the precipitated polyrotaxane by filtration, and measuring the optical rotation of the filtrated solution using polarimetry, wherein the filtrated solution contains the free ring-shaped molecule (see Example 1b).

The amount A of threaded ring-shaped molecule in the polyrotaxane in weight % (wt. %) based on 100 wt. % of the total weight of the polyrotaxane is then calculated using the following equation:

$$A = \frac{m(\text{total ring-shaped molecule}) - m(\text{free ring-shaped molecule})}{m(\text{sample of polyrotaxane}) - m(\text{free ring-shaped molecule})} \times 100 \text{ wt. \%}$$

wherein:
m(total ring-shaped molecule) means the total mass of ring-shaped molecule threaded on the copolymer and ring-shaped molecule not threaded on the copolymer, i.e. the total mass of threaded ring-shaped molecule and free ring-shaped molecule, which can be determined by polarimetry as set out above;
m(free ring-shaped molecule) means the mass of the free ring-shaped molecule, i.e. the mass of the ring-shaped molecule not threaded on the copolymer, which can be determined by isothermal titration calorimetric measurement (ITC) or by precipitation of the polyrotaxane followed by polarimetry of the filtrate containing the free ring-shaped molecule as set out above; and
m (sample of polyrotaxane) means the mass of the sample of the polyrotaxane of which the amount of threaded ring-shaped molecule is to be determined.

Before performing the calculation of the amount A the masses m(total ring-shaped molecule) and m(free ring-shaped molecule) need to be normalized to the mass m(sample of polyrotaxane) in case the mass of the sample of the polyrotaxane used for the determination of the total mass of ring-shaped molecule threaded on the copolymer and free ring-shaped molecule, and the mass of the sample of the polyrotaxane used for the determination of the mass of free ring-shaped molecule are not the same. For the purpose of the present disclosure "100 wt. % of the total weight of the polyrotaxane" means the sum of the mass of the copolymer and the mass of the ring-shaped molecule threaded thereon. Accordingly, the term "100 wt. % of the total weight of the polyrotaxane" includes the copolymer and the threaded ring-shaped molecule, while the free ring-shaped molecule is not considered.

The methods of determining the amount of the threaded ring-shaped molecule described herein are in particular suitable in case the ring-shaped molecule is selected from the group consisting of a cyclodextrin, a cyclodextrin derivative and any combination thereof. For example, the methods of determining the amount of the threaded ting-shaped molecules may be used in case the ring shaped molecule is randomly methylated β-cyclodextrin (RAMEB) or β-cyclodextrin, in particular randomly methylated β-cyclodextrin (RAMEB).

Any embodiment, feature, definition, or the like described herein with reference to any method of preparing a polyrotaxane also applies to any polyrotaxane described herein mutatis mutandis. In the same manner, any embodiment, feature, definition or the like described herein with reference to any polyrotaxane applies to any method of preparing a polyrotaxane described herein mutatis mutandis.

As an advantage, the polyrotaxanes of the present invention are soluble or dispersible in water or organic solvents which are used in industry, such as tetrahydrofuran, dichloromethane, chloroform, ethyl acetate and acetone. Therefore, processing of the polyrotaxanes for various applications can be easily achieved.

In some embodiments, the polyrotaxane is dispersed in water to form an aqueous dispersion. Accordingly, the present invention also relates to an aqueous dispersion comprising a polyrotaxane of the present invention dispersed in water. In an embodiment the particle size of the dispersed polyrotaxane is 5 μm or less.

In some embodiments, the polyrotaxane is dissolved in water to form an aqueous solution. Accordingly, the present invention also relates to an aqueous solution comprising a polyrotaxane of the present invention dissolved in water.

The present invention also relates to a method of preparing a cross-linked polyrotaxane, said method comprising the steps of (a) providing a polyrotaxane of the present invention and (b) chemically or physically cross-linking said polyrotaxane. Any one of the polyrotaxanes of the invention described herein may be used for preparing a cross-linked polyrotaxane.

In some embodiments of the method of preparing a cross-linked polyrotaxane said cross-linking comprises intermolecular cross-linking of polyrotaxanes by cross-linking of ring-shaped molecules using a cross-linking agent having at least two functional groups being capable of forming a bond to said ring-shaped molecules. In a particularly preferred embodiment, such intermolecular cross-linking of polyrotaxanes comprises forming a covalent linkage between a first ring-shaped molecule threaded on a first copolymer chain and a second ring-shaped molecule threaded on another, second copolymer chain. In any one of the methods of preparing a cross-linked polyrotaxane described herein the cross-linking may be performed under heating. In preferred embodiments of the method of preparing a cross-linked polyrotaxane said ring-shaped molecule is a cyclodextrin or cyclodextrin derivative and said cross-linking agent has at least two functional groups being capable of forming a bond with functional groups of said cyclodextrin or cyclodextrin derivative. In a preferred embodiment said functional groups of the cyclodextrin or cyclodextrin derivative reacting with the cross-linking agent are hydroxyl groups. In some embodiments, the cross-linking agent is selected from the group consisting of a diisocyanate, a blocked diisocyanate, a diisothiocyanate, a bisepoxide, cyanuric chloride, divinylsulfone, and any combination thereof. A blocked diisocyanate can be described as a reaction product formed from a diisocyanate which is stable at room temperature but dissociates to regenerate the isocyanate functionalities under the influence of heat. In case that the cross-linking agent is a blocked diisocyanate, a blocked diisocyanate may be used which is described in D. A. Wicks, Z. W. Wicks Jr, Prog. Org. Coatings 1999, 36, 148-172. Preferred blocked diisocyanates are blocked hexamethylene diisocyanate, preferably ethyl malonate blocked hexamethylene diisocyanate, or N-benzyl-tert-butylamine blocked hexamethylene diisocyanate. By using a blocked diisocyanate as cross-linking agent an advantageous method of manufacturing emerges, wherein volatile and toxic diisocyanate cross-linking agents can be avoided. In case that the cross-linking agent is a bisepoxide, said bisepoxide may be bisphenol-A diglycidyl ether. However, the cross-linking agent is not particularly limited, and other suitable cross-linking agents may be appropriately selected by a person skilled in the art. In embodiments, the method of preparing a cross-linked polyrotaxane provides a gel. In particularly preferred embodiments the gel is a slide-ring gel.

In some embodiments of the method of preparing a cross-linked polyrotaxane step (b) comprises modifying said polyrotaxane with a group having a cross-linkable moiety, and cross-linking the modified polyrotaxane via the cross-linkable moieties. In some embodiments said modifying of the polyrotaxane comprises modifying the ring-shaped molecules with the group having a cross-linkable moiety, wherein the group having a cross-linkable moiety has a functional group being capable of forming a bond to said ring-shaped molecules, and wherein said cross-linking comprises intermolecular cross-linking by cross-linking of the ring-shaped molecules. In a particularly preferred embodiment, such intermolecular cross-linking of polyrotaxanes comprises forming a covalent linkage between a first ring-shaped molecule threaded on a first copolymer chain and a second ring-shaped molecule threaded on another, second copolymer chain. In some embodiments the cross-linking may be performed under heating and/or photochemically. In preferred embodiments said ring-shaped molecule is a cyclodextrin or cyclodextrin derivative and said group having a crosslinkable moiety has a functional group being capable of forming a bond with functional groups of said cyclodextrin or cyclodextrin derivative. In a preferred embodiment said functional groups of the cyclodextrin or cyclodextrin derivative reacting with the cross-linking agent are hydroxyl groups. In preferred embodiments the group having a cross-linkable moiety has a carbon-carbon double bond. As readily appreciated by a person skilled in the art, carbon-carbon double bonds can be cross-linked thermally and/or photochemically. In some embodiments, the group having a cross-linkable moiety is an acryloyl or methacryloyl group. However, the group having a cross-linkable moiety is not particularly limited, and other suitable groups having a cross-linkable moiety may be appropriately selected by a person skilled in the art. In embodiments, the method provides a gel. In particularly preferred embodiments the gel is a slide-ring gel.

The present invention also relates to a cross-linked polyrotaxane, wherein a polyrotaxane of the present invention is chemically or physically cross-linked.

In preferred embodiments, the cross-linked polyrotaxane is obtainable or is obtained by any method of preparing a cross-linked polyrotaxane described herein in accordance with the present invention.

In some embodiments of the cross-linked polyrotaxane, the polyrotaxanes are cross-linked intermolecularly via ring-shaped molecules and a cross-linking agent. In a particularly preferred embodiment, such intermolecular cross-linking of polyrotaxanes is provided by a covalent linkage between a first ring-shaped molecule threaded on a first copolymer chain and a second ring-shaped molecule threaded on another, second copolymer chain. In some embodiments, the ring-shaped molecule is a cyclodextrin or cyclodextrin derivative and said cross-linking agent is bonded to functional groups of said cyclodextrin or cyclodextrin derivative. In a preferred embodiment, the functional groups of the cyclodextrin or cyclodextrin derivative reacting with the cross-linking agent are hydroxyl groups. In some embodiments, the cross-linking agent is selected from the group consisting of a diisocyanate, a blocked diisocyanate, a diisothiocyanate, a bisepoxide, cyanuric chloride, divinylsulfone, and any combination thereof. In case that the cross-linking agent is a blocked diisocyanate, a blocked diisocyanate may be used which is described in D. A. Wicks, Z. W. Wicks Jr, Prog. Org. Coatings 1999, 36, 148-172. Preferred blocked diisocyanates are blocked hexamethylene diisocyanate, preferably ethyl malonate blocked hexamethylene diisocyanate, or N-benzyl-tert-butylamine blocked hexamethylene diisocyanate. In case that the cross-linking agent is a bisepoxide, said bisepoxide may be bisphenol-A diglycidyl ether. However, the cross-linking agent is not particularly limited, and other suitable cross-linking agents may be appropriately selected by a person skilled in the art.

In some embodiments of the cross-linked polyrotaxane, the polyrotaxanes are cross-linked intermolecularly via ring-shaped molecules modified with a group having a cross-linkable moiety. In a particularly preferred embodiment, such intermolecular cross-linking of polyrotaxanes is provided by a covalent linkage between a first ring-shaped molecule threaded on a first copolymer chain and a second ring-shaped molecule threaded on another, second copolymer chain. In some embodiments, the ring-shaped molecule is a cyclodextrin or cyclodextrin derivative and said group having a cross-linkable moiety is bonded to functional groups of said cyclodextrin or cyclodextrin derivative. In a preferred embodiment, the functional groups of the cyclodextrin or cyclodextrin derivative, to which the group having a cross-linkable moiety is bonded, are hydroxyl groups. In some embodiments, the group having a cross-linkable moiety has a carbon-carbon double bond. In some embodiments, the group having a crosslinkable moiety is an acryloyl or methacryloyl group. However, the group having a crosslinkable moiety is not particularly limited, and other suitable groups having a crosslinkable moiety may be appropriately selected by a person skilled in the art.

In some embodiments, the cross-linked polyrotaxane is a gel. With this regard, the cross-linked polyrotaxane may form a physical gel or a chemical gel. As known to a person skilled in the art a physical gel has non-covalent crosslinking junctions which may arise due to physical attraction action between polymers, such as, for example, ionic interaction, hydrophobic interaction, hydrogen bonding, microcrystal formation, helix formation and the like. On the other hand, in a chemical gel cross-linking is provided through covalent bonding.

Figure 2:
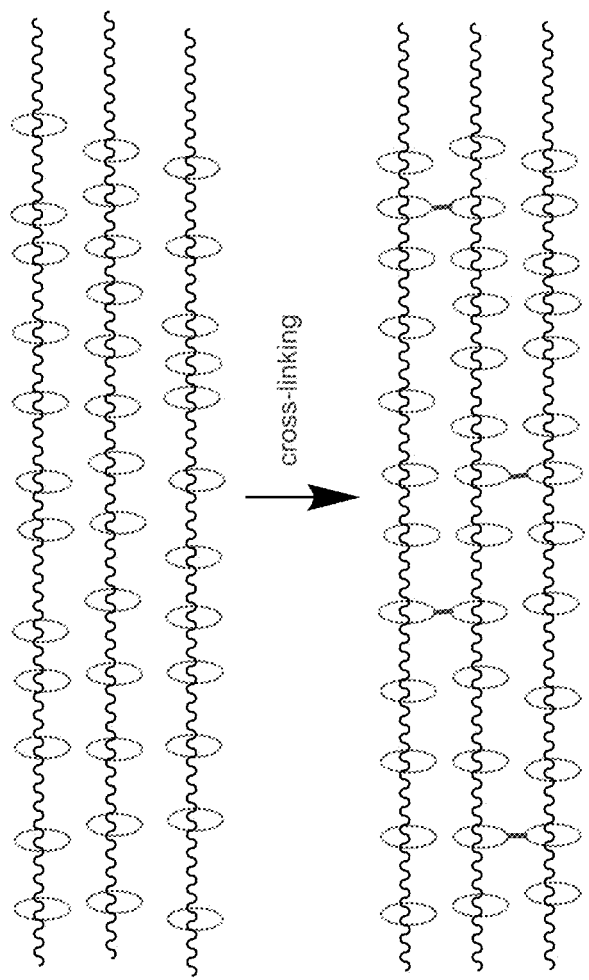
FIG. 2 shows a schematic representation of the formation of a slide-ring gel and a slide-ring gel in accordance with embodiments of the present invention.

In particularly preferred embodiments the cross-linked polyrotaxane is a slide-ring gel. A slide-ring gel is different from physical and chemical gels as in a slide-ring gel polymer chains are topologically interlocked. In a slide-ring gel nearly only the ring-shaped molecules are cross-linked while the copolymer chains are not cross-linked or cross-linked to a small extent only. More specifically, as can be seen from FIG. 2, which schematically depicts formation of a slide-ring gel and a slide-ring gel in accordance with embodiments of the present invention, a slide-ring gel exhibits an architecture, wherein a first ring-shaped molecule threaded on a first copolymer chain is covalently linked to a second ring-shaped molecule threaded on another, second copolymer chain. By such cross-linking two ring-shaped molecules covalently linked with each other exhibit a shape similar to the figure eight. Since only the ring-shaped molecules are cross-linked, the cross-links are freely movable along the copolymer chains and can, therefore, move freely in the polymer network. As a consequence, tension of the copolymer chains which thread the ring-shaped molecules is equalized in a manner similar to pulleys. This effect disperses the tension in the copolymer chains automatically on tensile deformation, and therefore it is difficult to cause crack or flaw. The concept of a slide-ring gel is described, for example, in K. Ito, Polym. J. (Tokyo, Jpn.) 2007, 39, 489-499.

Any embodiment, feature, definition, or the like described herein with reference to any method of preparing a cross-linked polyrotaxane also applies to any cross-linked polyrotaxane described herein mutatis mutandis. In the same manner, any embodiment, feature, definition or the like described herein with reference to any cross-linked polyrotaxane applies to any method of preparing a cross-linked polyrotaxane described herein mutatis mutandis.

The polyrotaxanes and cross-linked polyrotaxanes disclosed herein may be used as self-healing materials, for encapsulation, for drug delivery, for the preparation of solutions, dispersions or composite materials, as adhesives, and as surface coatings.

Accordingly, also encompassed by the present invention is the use of a polyrotaxane as disclosed herein as a self-healing material. In addition, the present invention also relates to the use of a cross-linked polyrotaxane as disclosed herein as a self-healing material. Accordingly, the present invention also relates to a method of providing a surface having a self-healing surface coating, the method comprising the steps of (a) providing a surface and (b) coating onto the surface a polyrotaxane and/or a cross-linked polyrotaxane disclosed herein to provide a surface having a self-healing surface coating. It is particularly preferred that for applications as a self-healing material the polyrotaxane is a slide-ring gel. The surface is not particularly limited, and, for example, the surface may be a metal surface, a glass surface, a ceramic surface, a wood surface, or the like. With this regard, the term "self-healing" refers to the ability of a material to repair damage caused by mechanical impact without human intervention. Self-healing properties are, for example, useful in paints and adhesives. Such paints and adhesives may, for example, be used for automotive vehicles which require a car-washing resistance, a chipping resistance, an impact resistance and weather resistance, but also for paint, resin base material and the like for home-electric appliances.

The present invention also relates to a method of coating of a surface with a polyrotaxane, the method comprising coating a solution or a dispersion containing a polyrotaxane as described herein onto the surface. In some embodiments the coating is performed using dipping, spin coating, spraying, spray coating, and/or electrodeposition. Preferably, the coating is performed using a dispersion or a solution of the polyrotaxane in water or an organic solvent. The surface to be coated is not particularly limited. For example, the surface to be coated may be a metal surface, a glass surface, a ceramic surface, a wood surface, or the like. Such method can be used, for example, for applying a self-healing coating of a polyrotaxane on a surface. Coatings comprising polyrotaxanes described herein are, for example, useful as a corrosion inhibitor, for controlling adhesion and friction and for providing scratch resistance.

Also encompassed by the present invention is the use of a polyrotaxane or a cross-linked polyrotaxane as described herein as an adhesive. Preferably, in case that the cross-linked polyrotaxane is used as an adhesive, the cross-linked polyrotaxane is a gel.

The present invention further relates to a dispersion comprising metal particles and/or metal oxide particles and a polyrotaxane as herein described. In some embodiments the metal particles and/or metal oxide particles are nanoparticles.

Also, the present invention relates to a composite comprising a metal and/or metal oxide particles and a polyrotaxane as herein described. In some embodiments the metal and/or metal oxide particles are nanoparticles.

The materials described herein should in general reach excellent high values for the Martens hardness. The materials may be self-curable, for example by annealing at elevated temperatures.

The present invention also refers to a hardened material obtained by heating a polyrotaxane described herein in absence of any crosslinking agent at temperatures between 80° C. and 150° C., preferably between 100° C. and 130° C., and more preferably at 120° C. The heating is preferably performed for 5 min to 24 h, preferably 1 h to 10 h.

The present invention also refers to a hardened material obtained by heating a dispersion comprising metal particles and/or metal oxide particles and a polyrotaxane described herein in absence of any crosslinking agent at temperatures between 80° C. and 150° C., preferably between 100'C and 130° C., and more preferably at 120° C. The heating is preferably performed for 5 min to 24 h, preferably 1 h to 10 h.

It must be noted that as used herein, the singular forms "a", "an", and "the", include plural references unless the context clearly indicates otherwise. Thus, for example, reference to "a reagent" includes one or more of such different reagents and reference to "the method" includes reference to equivalent steps and methods known to those of ordinary skill in the art that could be modified or substituted for the methods described herein.

All publications and patents cited in this disclosure are incorporated by reference in their entirety. To the extent the material incorporated by reference contradicts or is inconsistent with this specification, the specification will supersede any such material.

Unless otherwise indicated, the term "at least" preceding a series of elements is to be understood to refer to every element in the series. Those skilled in the art will recognize, or be able to ascertain using no more than routine experimentation, many equivalents to the specific embodiments of the invention described herein. Such equivalents are intended to be encompassed by the present invention.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step. When used herein the term "comprising" can be substituted with the term "containing" or sometimes when used herein with the term "having".

When used herein "consisting of" excludes any element, step, or ingredient not specified in the claim element. When used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

Several documents are cited throughout the text of this specification. Each of the documents cited herein (including all patents, patent applications, scientific publications, manufacturer's specifications, instructions, etc.), whether supra or infra, are hereby incorporated by reference in their entirety. Nothing herein is to be construed as an admission that the invention is not entitled to antedate such disclosure by virtue of prior invention.

EXAMPLES

The following examples further illustrate the invention. These examples should however not be construed as to limit the scope of this invention. The examples are included for purposes of illustration, and the present invention is limited only by the claims.
Measuring Devices and Methods:
Optical rotation: at λ=589 nm, Perkin Elmer Model 241
Polarimetry: Perkin Elmer Model 241
Isothermal titration calorimetry (ITC): Nano ITC$^{2G}$ (TA Instruments)
$^1$H NMR: Bruker AVANCE Ultrashield 400,400 MHz
$^{13}$C NMR: Bruker AVANCE Ultrashield 400, 100 MHz
FT-IR: Tensor 27 (Bruker Optic GmbH)
Thermogravimetric analysis: STA Jupiter 449 F 3 with auto sample changer coupled with QMS 403 C and Bruker FT-IR Tensor 27
Differential scanning calorimetry: Mettler Toledo DSC3
Glass transition temperature: Determined from the inflection point of DSC curves
Microscratch measurements: SURFCOM 1500SD3
Tensile testing: Allroundline Typ 1446 from Zwick
Haze measurements: Hazemeter haze-gard plus (Byk-Gardner)
Adhesion and resistance measurements: Microscratcher (CSM)
Tear-off force: Allroundline Type 1446 from Zwick
Nanoindentation testing (microhardness): FischerScope® HM2000

Microhardness measurements: The microhardness is measured using a FISCHERSCOPE® HM2000. An indenter method is used by means of a Vickers diamond as a pyramidal indenter. Force/distance curves are measured at loading and unloading the surface. The following parameter can be determined from these measurements:

Martens hardness: Hardness of the surface determined by indenter method, dimension [N/mm$^2$];
Universal hardness: plastic hardness: resistance against plastic deformation, dimension [N/mm$^2$] or MPa; high significance for self-healing properties;
Vickers hardness: microscopic analysis of the remaining deformation area according to Vickers-hardness-test;
Haze measurements: Determination of the loss of diffused light by transmission through a transparent sample (best correlated with the visual impression of scratches; at 1% diffused light the samples have a visual impression of being slightly dull). The advantage of this method is that all angles can be detected, not only the 90° C. angle as is for photographic methods. Hazemeter haze-gard plus (Byk-Gardner) was used.

Example 1a: Polyrotaxane Prepared Via Free Radical Polymerization: poly(2,3-Dimethyl-1,3-butadiene-co-methyl acrylate-co-styrene)-randomly methylated β-cyclodextrin polyrotaxane 0.34 mL styrene (first monomer having a stopper group), dissolved in 5 mL methanol was added to 94.43 g (w=50%, 36 mmol) aqueous randomly methylated β-cyclodextrin (RAMEB, ring-shaped molecule) solution. The system was bubbled through with nitrogen gas for 1 hour under stirring. After that, 7.2 mL (4.90 g, 72 mmol) 2,3-Dimethyl-1,3-butadiene (second monomer, hydrophobic), 6.2 mL (6.20 g 72 mmol) methyl acrylate (third monomer, hydrophilic or partly hydrophilic), and 0.140 g (0.43 mmol) 2,2'-azobis[2-(2-imidazolin-2-yl)propane] dihydrochloride (radical initiator VA-044), dissolved in 1 mL of water, were added to the reaction mixture. The reactor was heated to 38° C. to start the reaction and was stirred for 48 hours. After the reaction, 300 mL of water was added to the reaction mixture and heated up to 80° C. for 20 mins. The suspended product was filtered off using a thermostated Büchner funnel, and the procedure repeated two times. The product was dried overnight at 80° C. in vacuo. The solid was dissolved in 300 mL of chloroform, and the non-soluble part was removed by filtration. The solvent was removed by rotary evaporator, and the product was dried under vacuum, overnight.

$^1$H NMR (CDCl$_3$, 400 MHz) δ in ppm: 7.12 (phenyl), 5.02-4.69 (RAMEB), 4.07-3.18 (RAMEB, CH—CO), 3.40 (OCH$_3$), 2.46-1.45 (polymer backbone);
$^{13}$C NMR (CDCl$_3$, 100 MHz) δ in ppm: 176.5 (C=O), 130.1-125.8 (phenyl), 101.1 (RAMEB), 83.7 (RAMEB), 81.9 (RAMEB), 74.2-70.3 (RAMEB), 59.7 (OCH$_3$), 51.3 (CH—CO), 44.5-30.3 (polymer backbone)
ITC: 0 wt. % free RAMEB;

The total weight fraction of randomly methylated β-cyclodextrin (sum of RAMEB threaded on the terpolymer and free RAMEB) of said polyrotaxane sample was determined from the optical rotation α=0.026 deg of a polyrotaxane solution (concentration 13.4 mg/mL in CHCl$_3$) measured by polarimetry in an 1 cm cuvette at a wavelength of λ=589 nm, making use of the specific rotation of randomly methylated β-cyclodextrin (RAMEB) [α]=+130 deg mL dm$^{-1}$ g$^{-1}$. The composition of Example 1a (15 wt. % threaded RAMEB and 85 wt. % terpolymer) was calculated from the difference of the total RAMEB content, which was determined by polarimetry, and the free RAMEB content, which was determined by isothermal titration calorimetric (ITC) measurements.

For the isothermal titration calorimetry (ITC) measurement (using Nano ITC$^{2G}$ from TA Instruments) a sample of the polyrotaxane was weighed and dissolved in 0.1 M phosphate buffer. The obtained polyrotaxane solution was titrated with a 8 mM solution of adamantane-1-carboxylate sodium salt. The evolved heats were corrected by the corresponding heats of dilution and fitted by the program NanoAnalyze from TA Instruments using the algorithm for interactions with 1:1 stoichiometry. The found stoichiometry number n=0.0 means that 0.0 mol % of RAMEB was free.

From the RAMEB content obtained by the isothermal titration calorimetry, the number of unmethylated hydroxyl groups of RAMEB, which has 10 unmethylated hydroxyl groups, and the molar mass of RAMEB, which is 1311 g/mol, a hydroxyl content of the polyrotaxane of 1.1 mmol/g was calculated.

The molar composition (X=styrene, Y=methyl acrylate, Z=2,3-dimethyl-1,3-butadiene, CD=RAMEB) of the polyrotaxane was also determined based on the NMR integral values of the areas A=2.46-1.45 ppm, B=4.07-3.18 ppm, C=6.90-7.12 ppm, and D=4.50-5.20 ppm, according to the following equations normalized to RAMEB (14 protons in region D and 74 protons in region B):

$$X = \frac{C}{5}$$
$$Y = \frac{B-74}{3}$$
$$Z = \frac{A-3X-3Y}{10}$$
$$CD = \frac{D}{14}$$

The molar composition of Example 1a was X/Y/Z/CD=0.94/26/39.2/1, that is 1.5 mol % styrene, 39 mol % methyl acrylate 58 mol % 2,3-dimethyl-1,3-butadiene and 1.5 mol % RAMEB. The calculated composition of the said polyrotaxane in weight percentages was: 1.4 wt. % styrene, 32.6 wt % methyl acrylate 47 wt. % 2,3-dimethyl-1,3-butadiene and 19 wt. % RAMEB in accordance with the value obtained through polarimetry and isothermal titration calorimetry (ITC) within experimental error.

Figure 4:
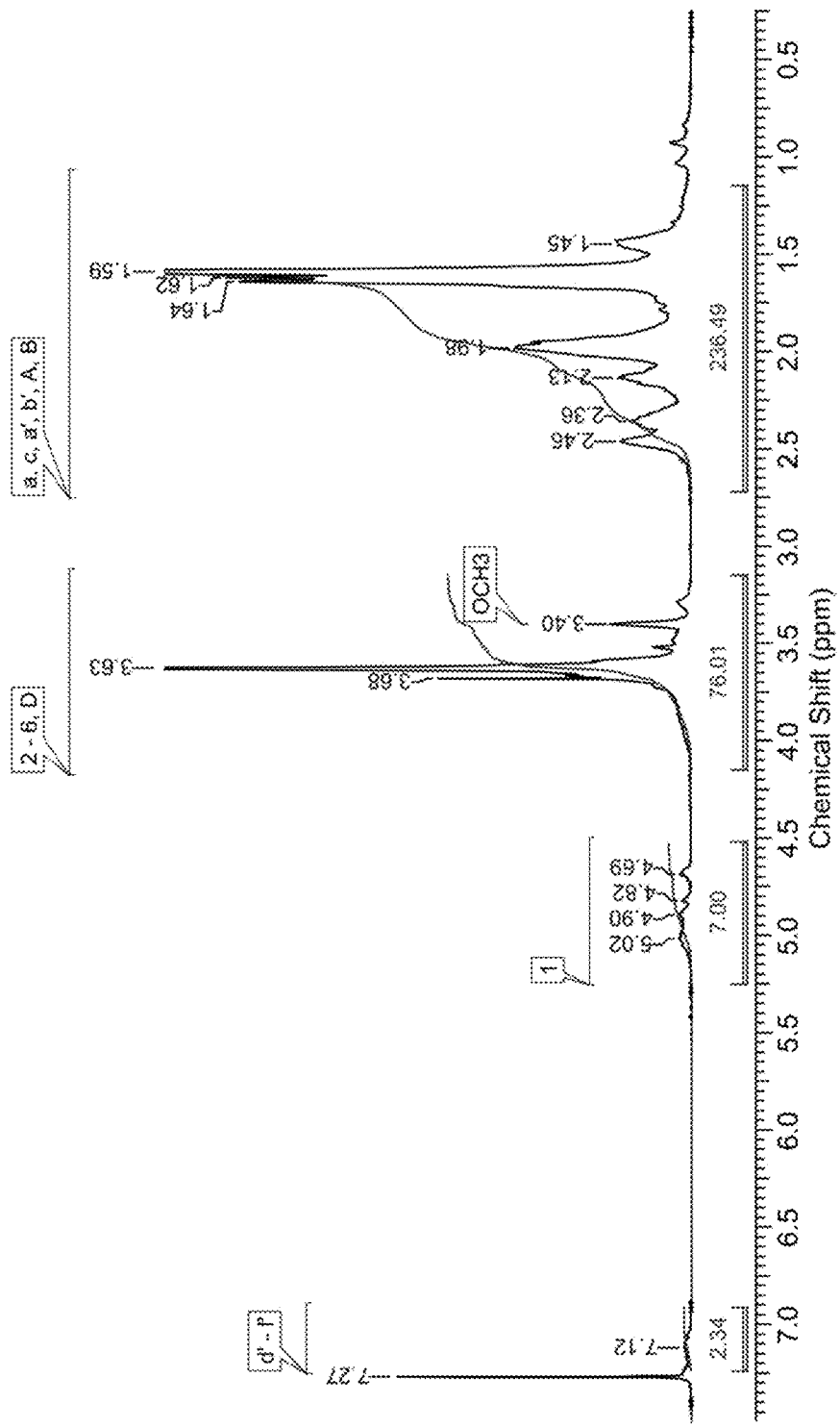
FIG. 4 shows a $^1$H NMR spectrum of the polyrotaxane in accordance with Example 1a in CDCl$_3$.
Figure 5:
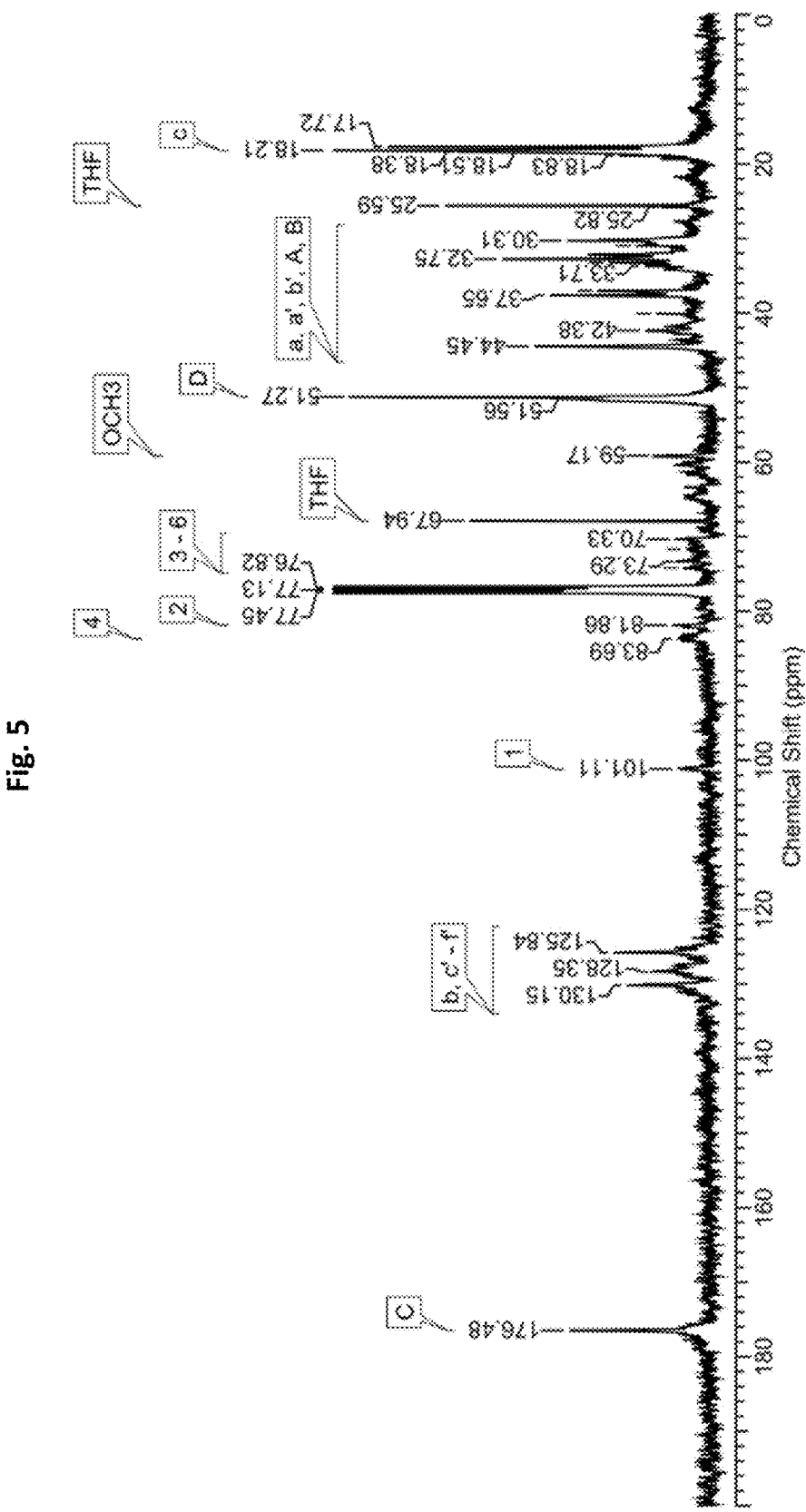
FIG. 5 shows a $^{13}$C NMR spectrum of the polyrotaxane in accordance with Example 1a in CDCl$_3$.
Figure 6:
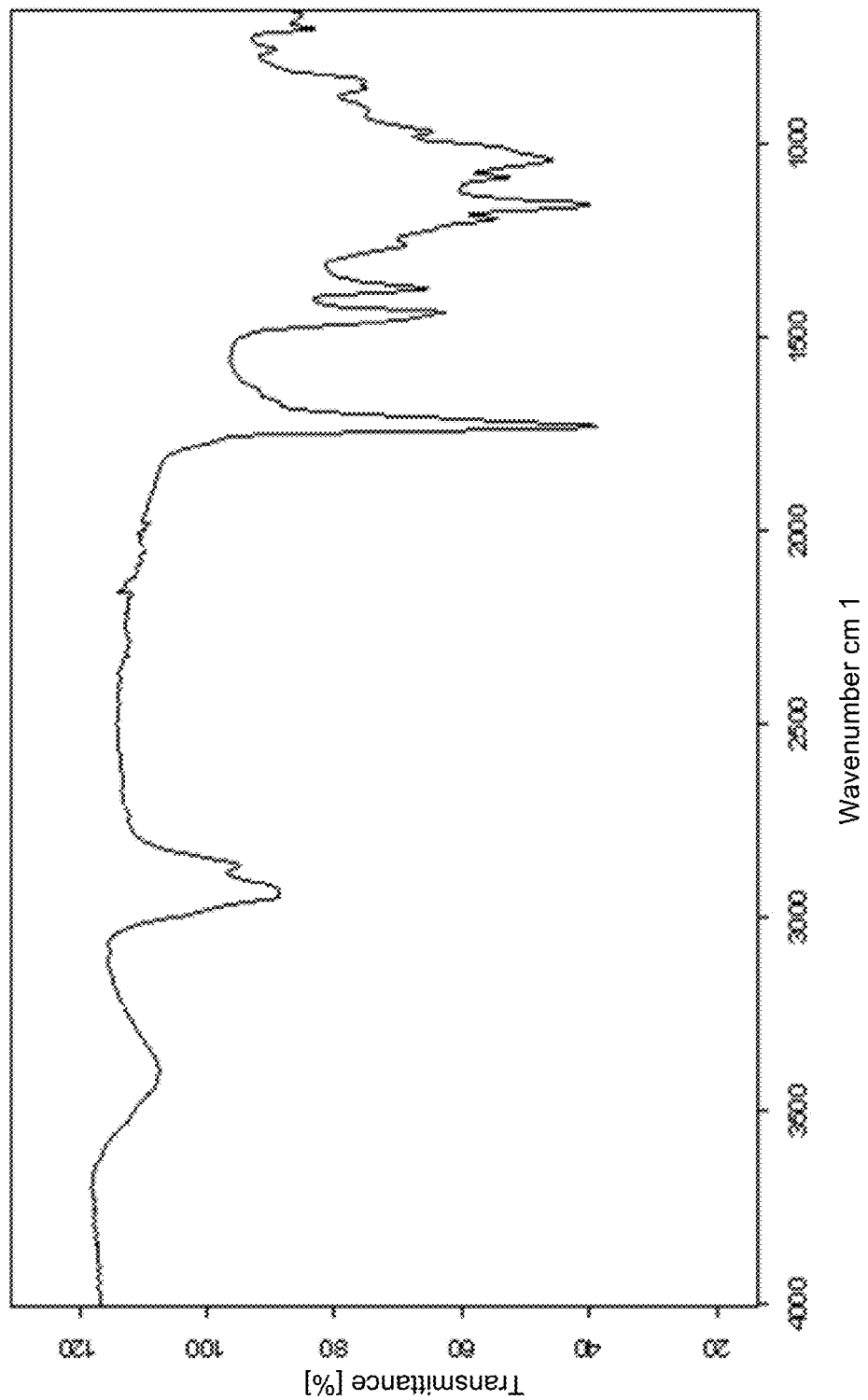
Figure 7:
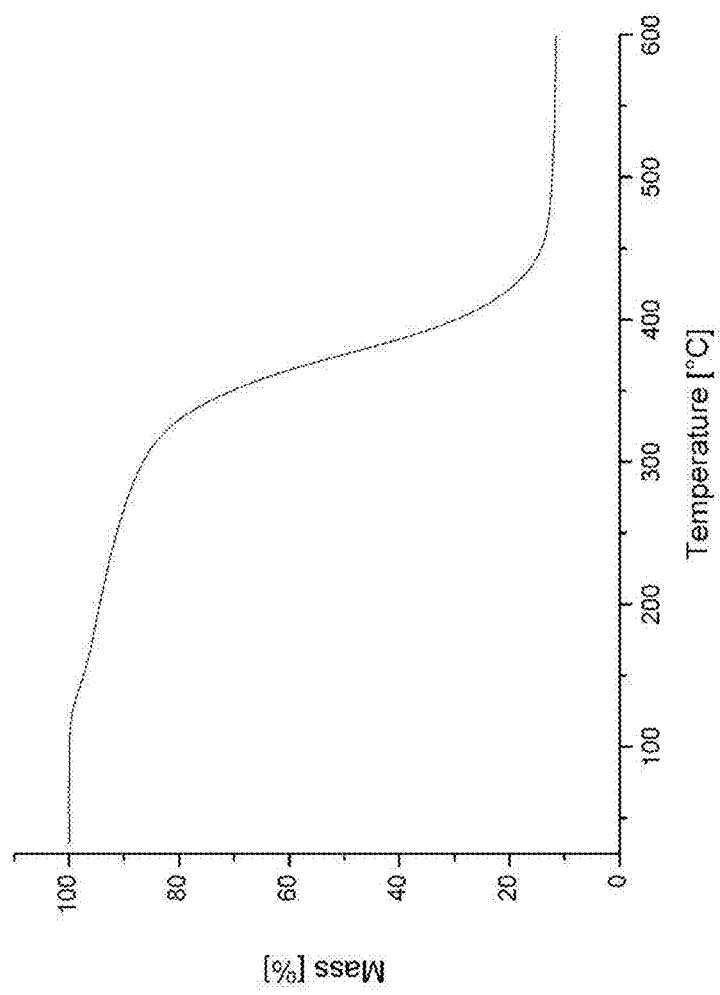
FIG. 7 shows a thermogravimetric analysis (TGA) of the polyrotaxane according to Example 1a, under Ar, heating rate 10K/min.

FIGS. 4 and 5 show the $^1$H NMR and $^{13}$C NMR spectra of Example 1a, respectively. FIG. 6 shows the FT-IR spectrum with the characteristic OH vibration of RAMEB at around 3500 cm$^{-1}$ and of the vibrations of the carbonyl groups of poly(methyl acrylate) at 1735 cm$^{-1}$. According to thermogravimetric analysis shown in FIG. 7 polyrotaxane according to Example 1a starts losing weight at temperatures above 110° C. which was mainly due to evaporation of water as shown by mass spectrometry.

Annealing is performed with polyrotaxanes prepared according to Example 1a for 0 h, 1 h and 16, and the Martens hardness HM, plastic universal hardness HUpl, Vickers hardness HV and depth of indentation hmax were measured with a FISCHERSCOPE® HM2000. The results are shown in Table 1.

TABLE 1

Martens hardness HM, plastic universal hardness HUpl, Vickers hardness HV and depth of indentation for polyrotaxane according to Example 1a for various annealing times at 120° C., Instrument: FISCHERSCOPE ® HM2000

| Sample | HM [N/mm$^2$] | HUpl [N/mm$^2$] | HV | hmax [μm] |
|---|---|---|---|---|
| 0 h | 1.75 | / | / | 19.26 |
| 1 h | 140 | 171 | 17 | 2.11 |
| 16 h | 190 | 269 | 26 | 1.76 |

Figure 9:
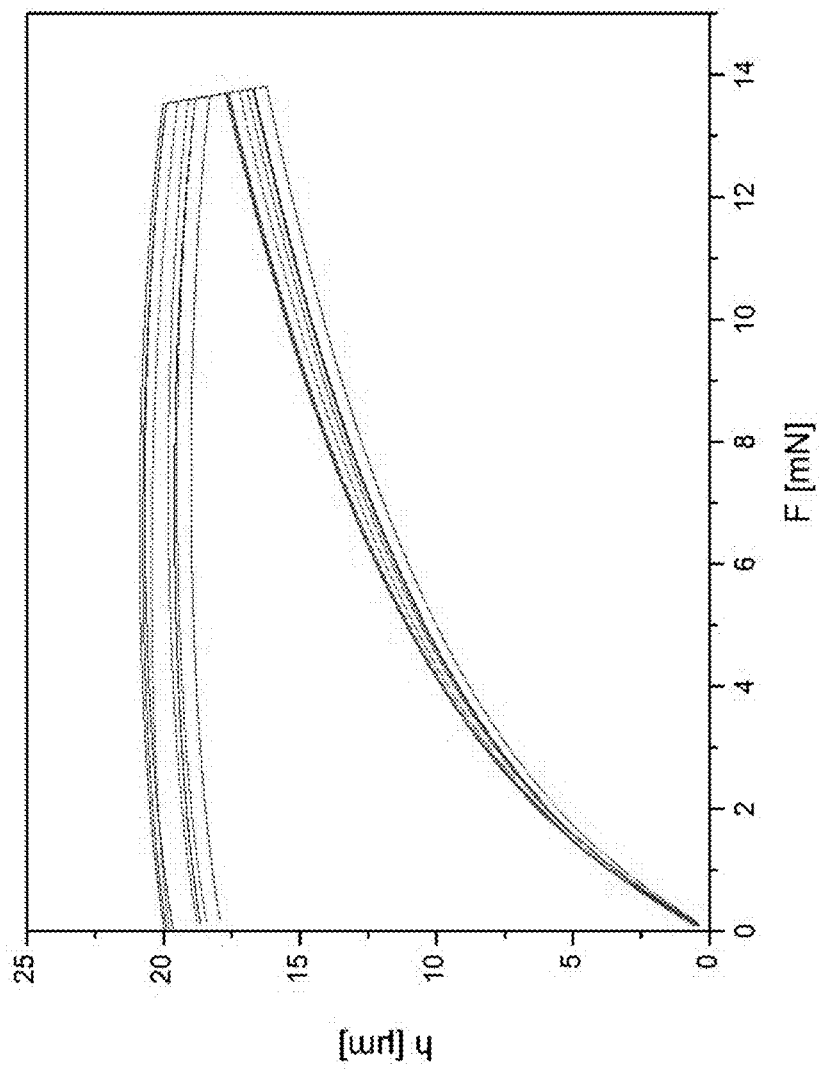
Figure 10:
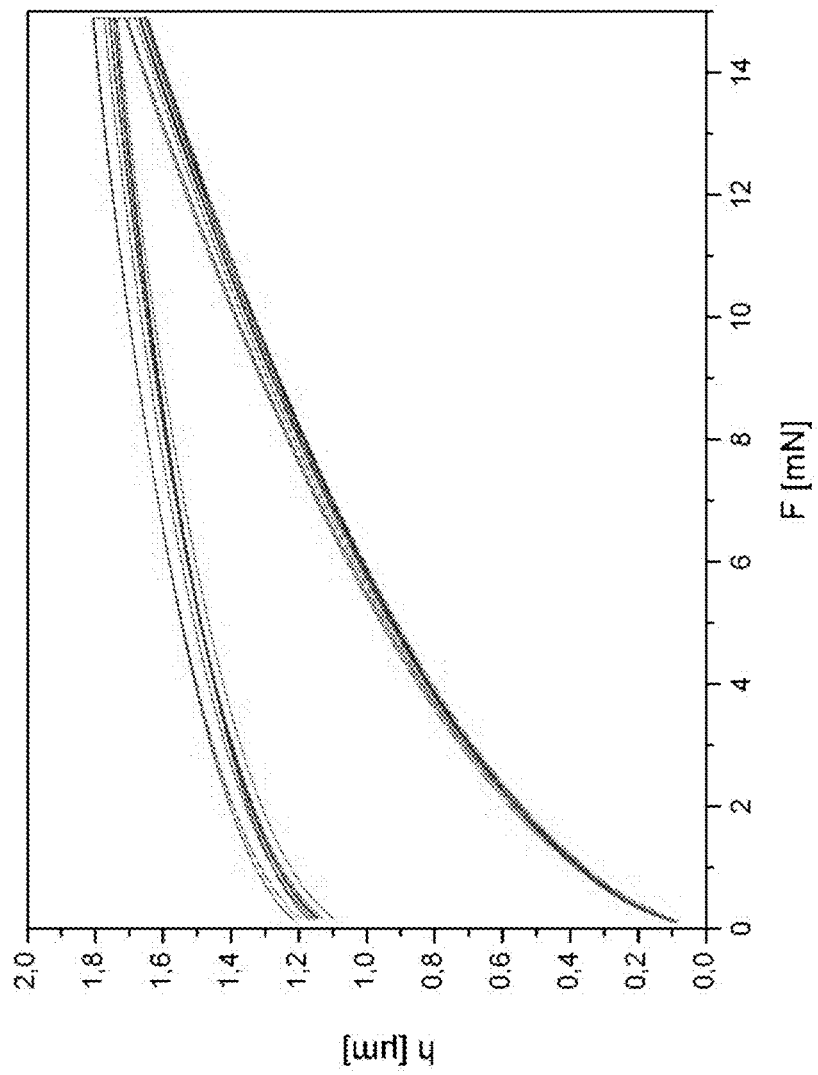
FIG. 10 shows the results of a microhardness test at 25° C. of the polyrotaxane in accordance with Example 1a after annealing at 120° C. for 16 h.

In FIG. 9 the results of a microhardness test at 25° C. of the polyrotaxane in accordance with Example 1a are shown. FIG. 10 shows the results of a microhardness test at 25° C. of the polyrotaxane in accordance with Example 1a after annealing at 120° C. for 16 h. The curves show how a pyramidal nanoindenter penetrates into the sample with increasing load force.

Example 1b: Polyrotaxane Prepared Via Free Radical Polymerization: poly(isoprene-co-methyl acrylate-co-hydroxyethyl methacrylate)-β-cyclodextrin polyrotaxane 9.20 mg (0.03 mmol) 2,2'-azobis[2-(2-imidazolin-2-yl) propane] dihydrochloride (radical initiator VA-044), 5.1 g (4.5 mmol) β-cyclodextrin and 0.055 mL (0.45 mmol) of 2-hydroxyethyl methacrylate (first monomer having a stopper group) were dissolved in 25 mL aqueous 8 M urea solution. The system was bubbled through with nitrogen gas for 1 hour under stirring. After addition of 0.45 mL (0.31 g, 4.50 mmol) freshly distilled isoprene (second monomer, hydrophobic) and 0.41 mL (0.39 g, 4.50 mmol) methyl acrylate (third monomer, hydrophilic or partly hydrophilic) the nitrogen flow was stopped and the system was stirred to form a homogeneous solution due to β-cyclodextrin/isoprene complex formation. The reaction was placed in a 35° C. oil bath to start the reaction and was stirred for three days. After the reaction, the product was heated up to 90° C., filtered off, dissolved in 100 mL water and filtered once more. The remaining solid was freeze-dried. The product (1.21 g) was obtained after precipitation of its DMSO solution into water, as a white solid. Free β-cyclodextrin (2.3 wt. %) was determined by precipitation of the DMSO solution of the product into water and determination of dissolved β-cyclodextrin in the water phase.

$^1$H-NMR (DMSO-d$_6$, 400 MHz) δ/ppm=5.85 (OH-2, OH-3 of β-cyclodextrin), 5.15-4.84 (H-1 of β-cyclodextrin, =CH of polyisoprene), 4.37-4.53 (OH-6 of β-cyclodextrin), 4.2-3.7 ppm (methylene groups of poly-2-hydroxyethyl methacrylate), 3.65-3.43 (H-3, H-5, H-6 of β-cyclodextrin), 3.38-3.22 (H-2, H-4 of β-cyclodextrin); 2.05-1.85 (methylene groups of polymer backbone) and 1.75-1.45 (methyl groups of polyisoprene and poly-2-hydroxyethyl methacrylate);

Polarimetry (DMSO): c=5.502 mg/mL, α=0.055 deg;

Free β-cyclodextrin (water): c=5,617 mg/mL, α=0.002 deg;

The total weight fraction of β-cyclodextrin (63.5 wt. %) of said polyrotaxane was determined from the optical rotation α=0.055 deg of a solution (5.5 mg/mL in DMSO (DMSO=dimethylsulfoxide)) in an 1 cm cuvette at a wavelength of λ=589 nm, applying the specific rotation of β-cyclodextrin [α]=+157.4 deg mL dm$^{-1}$ g$^{-1}$. The amount of free β-cyclodextrin (2.5 wt. %) was determined by precipitating 1 mL of DMSO polyrotaxane solution into 9 mL of water, thereby precipitating the polyrotaxane, i.e. the terpolymer and the β-cyclodextrin threaded thereon, and measuring the optical rotation α=0.002 deg of the filtrated solution, which contains the free β-cyclodextrin in a 10 cm cuvette. The composition of Example 1b (61 wt. % cyclodextrin) was calculated from the difference of the total and the free cyclodextrin contents, respectively.

Acetylation of the cyclodextrin-OH-groups of Example 1b: poly(isoprene-co-methyl acrylate-co-hydroxyethyl methacrylate)-β-cyclodextrin polyrotaxane 150.2 mg of the polyrotaxane of Example 1b (1.76 mmol OH-groups, 1 eq.) were suspended under stirring in 7.5 mL of pyridine in a 10 mL glass vial with a septum. Acetic anhydride (2.46 g, 24.1 mmol, 14 eq) was added by a syringe to the mixture and stirred for 2 d at ambient temperature until clear solution. The modified polyrotaxane was precipitated into 100 mL methanol, separated by centrifugation and dried in vacuum. The resulting solid was dissolved in tetrahydrofuran and concentrated to obtain 176.9 mg of a transparent film. The degree of substitution per AGU (DS) was determined by infrared spectroscopy comparing the integrals of the cyclodextrin-OH-groups of the modified and the unmodified polyrotaxane resulting in a DS of 2.34.
FT-IR: 3700-3000 (—O—H), 1750 (C=O) cm$^{-1}$;

Example 2

9.20 mg (0.03 mmol) 2,2'-azobis[2-(2-imidazolin-2-yl) propane] dihydrochloride (radical initiator, VA-044), 5.90 g (4.50 mmol) randomly methylated β-cyclodextrin (RAMEB, ring-shaped molecule), 0.051 mL (0.45 mmol) styrene (first monomer having a stopper group) and 0.41 mL (4.50 mmol) vinyl acetate (second monomer, partially hydrophilic) were dissolved in 10 mL deionized water and the system was bubbled through with nitrogen gas under stirring, until the solution becomes homogenous, that is 1 h. The reaction was placed in a 38° C. oil bath to start the reaction and was stirred for 48 hours. After the reaction, the product was heated up to 90° C., separated by centrifugation, then suspended in 100 mL water and extracted by three times 20 mL chloroform. The combined organic phase was evaporated, and the solid was freeze-dried. The product (300 mg) was obtained as white powder.
$^1$H NMR (CDCl$_3$, 400 MHz) δ/ppm=5.10-5.00 ppm, (methine group), 2.10 ppm (methyl group) of poly(vinyl acetate), 2.05-1.25 backbone protons for poly(vinyl acetate) and polystyrene, 5.00 (s, 1H, H-1), 3.65 (s, 3H, H-7), 3.40 (s, 3H, H-8), 3.95-3.25 (m, 5H, H-2, H-3, H-4, H-5, H-6) ppm for RAMEB and 7.10-7.50 ppm for aromatic protons of styrene.
Polarimetry: c=19.5 mg/mL α=0.087 deg
ITC: 5.8 wt % free RAMEB
The composition of Example 2 (27.5 wt. % RAMEB and 72.5 wt. % copolymer) was calculated from the difference of the total RAMEB content, determined by polarimetry, and the free RAMEB content, from isothermal titration calorimetric (ITC) measurements, analogously to the procedure described under above Example 1b.

Example 3

Figure 14:
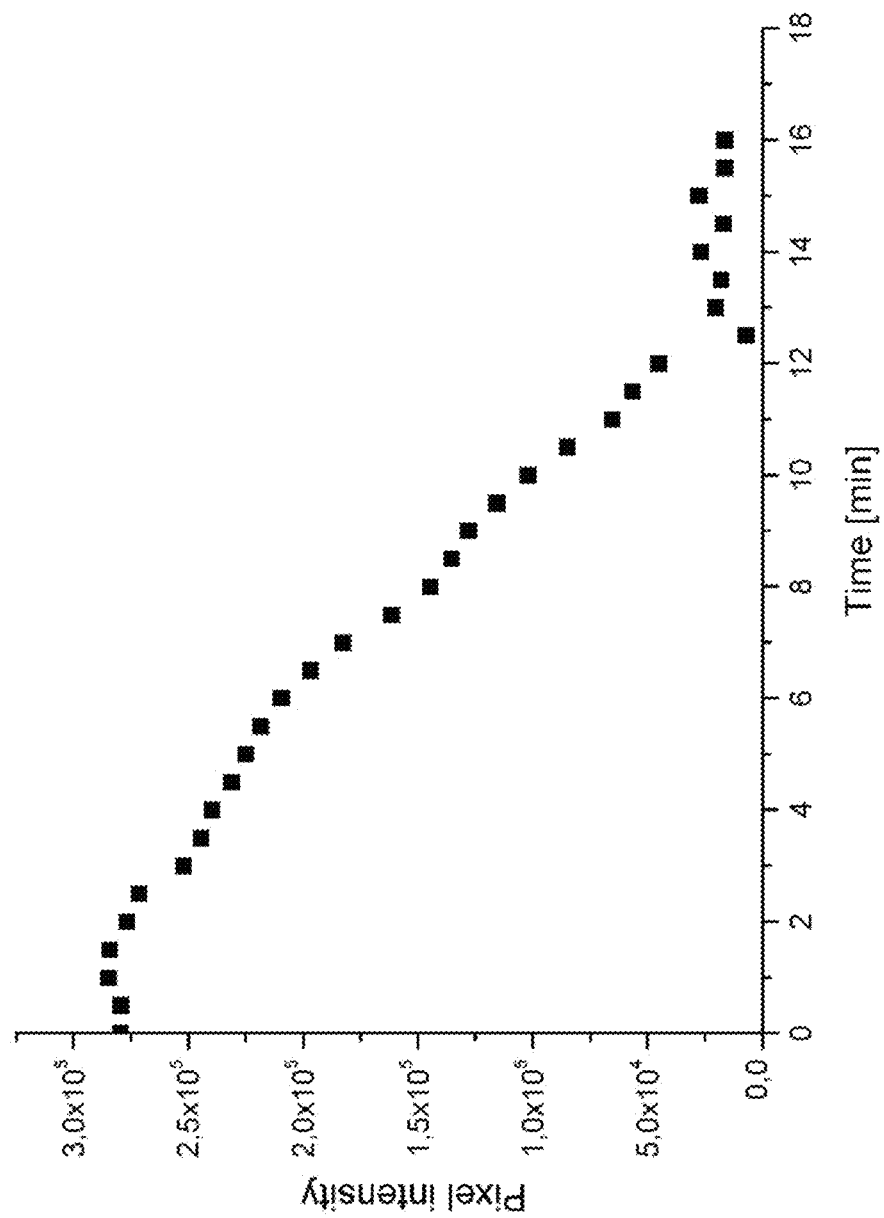
FIG. 14 shows the pixel intensity of a scratch as a function of the curing time at 85° C. for a polyrotaxane according to Example 1a casted from solution in THF and annealing for 16 h at 120° C. as described in Example 3.
Figure 19:
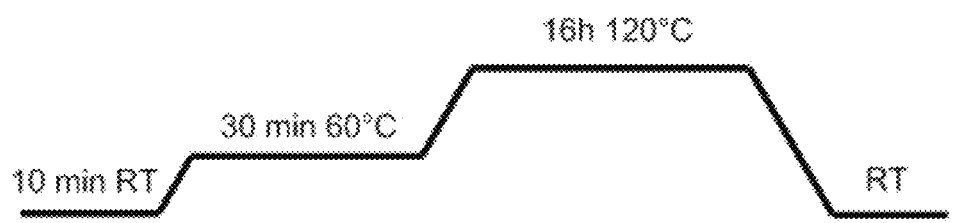
FIG. 19 shows the temperature profile used in Examples 3 and 4.
Figure 20:
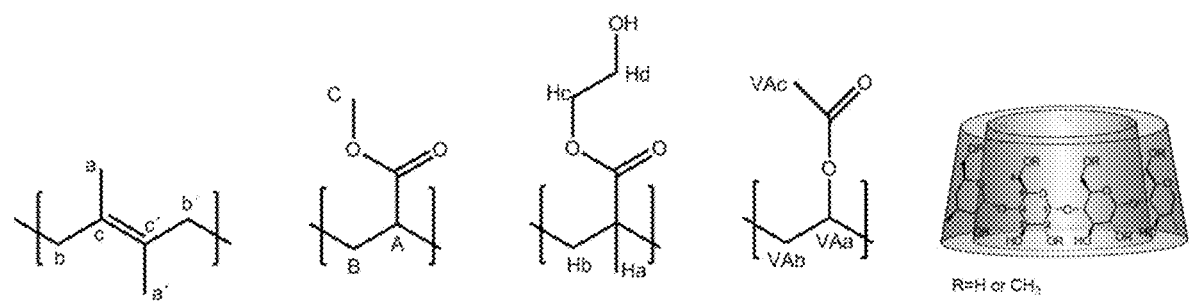
FIG. 20 shows the NMR assignments of the applied monomers and RAMEB.

70 mg of Example 1a was dissolved in 0.5 mL of THF. 50 μL of this solution was coated on microscope slides or anodized aluminum. The samples were heated according to the temperature program shown in FIG. 19. FIG. 13 shows photographs of a thin film (thickness 80 μm) obtained through the casting of polyrotaxane according to Example 1a from solution in THF and annealing for 16 h at 120° C. as described in Example 3; sample according to (a) after application of scratches using a steel brush (b) sample according to (a) after heating at 85° C. for 1 h; Sample diameter 1.1 cm.
FIG. 14 shows the pixel intensity of a scratch as a function of the curing time at 85° C. for a polyrotaxane according to Example 1a casted from solution in THF and annealing for 16 h at 120° C. as described in Example 3.

Example 4

70 mg of Example 1a and the corresponding amount of N-Benzyl-tert-butylamine blocked hexamethylene diisocyanate were dissolved in 0.5 mL of THF. 50 μL of this solution was coated on microscope slides or anodized aluminum. The samples were heated according to the temperature program shown in FIG. 19. The isocyanate to hydroxyl ratio was varied from 0:3, 1:3, 1:2.5, 1:2, 1:1.5 to 1:1.

Annealing is performed with polyrotaxanes prepared according to Example 4 with the before-mentioned ratios of isocyanate to hydroxyl, and the Martens hardness, universal hardness, Vickers hardness and depth of indentation were measured with a FISCHERSCOPE® HM2000. The results are shown in Table 2.

TABLE 2

Depth of indentation (Hmax) at load of 15 N/mm, universal hardness (HUpl), Vickers hardness (HV) and Martens hardness (HM) for the cross-linked polyrotaxane in accordance with Example 1a, after annealing it for 1 h at 120° C. Instrument: FISCHERSCOPE ® HM2000

| Equiv. NCO/OH | Hmax [μm] | HUpl [N/mm$^2$] | HV | HM [N/mm$^2$] |
|---|---|---|---|---|
| 0:3 (0 mol %) | 2.11 | 172 | 17 | 140 |
| 1:3 (34 mol %) | 3.51 | 60 | 6 | 53 |
| 1:2.5 (40 mol %) | 3.44 | 62 | 6 | 55 |
| 1:2 (50 mol %) | 3.50 | 61 | 6 | 53 |
| 1:1.5 (67 mol %) | 3.03 | 87 | 8 | 69 |
| 1:1 (100 mol %) | 3.68 | 53 | 5 | 53 |

The percentage in parenthesis is the amount of non-methylated hydroxyl groups of the RAMEB which are not used for cross-linking, based on 100 mol % of non-methylated hydroxyl groups.

Figure 11:
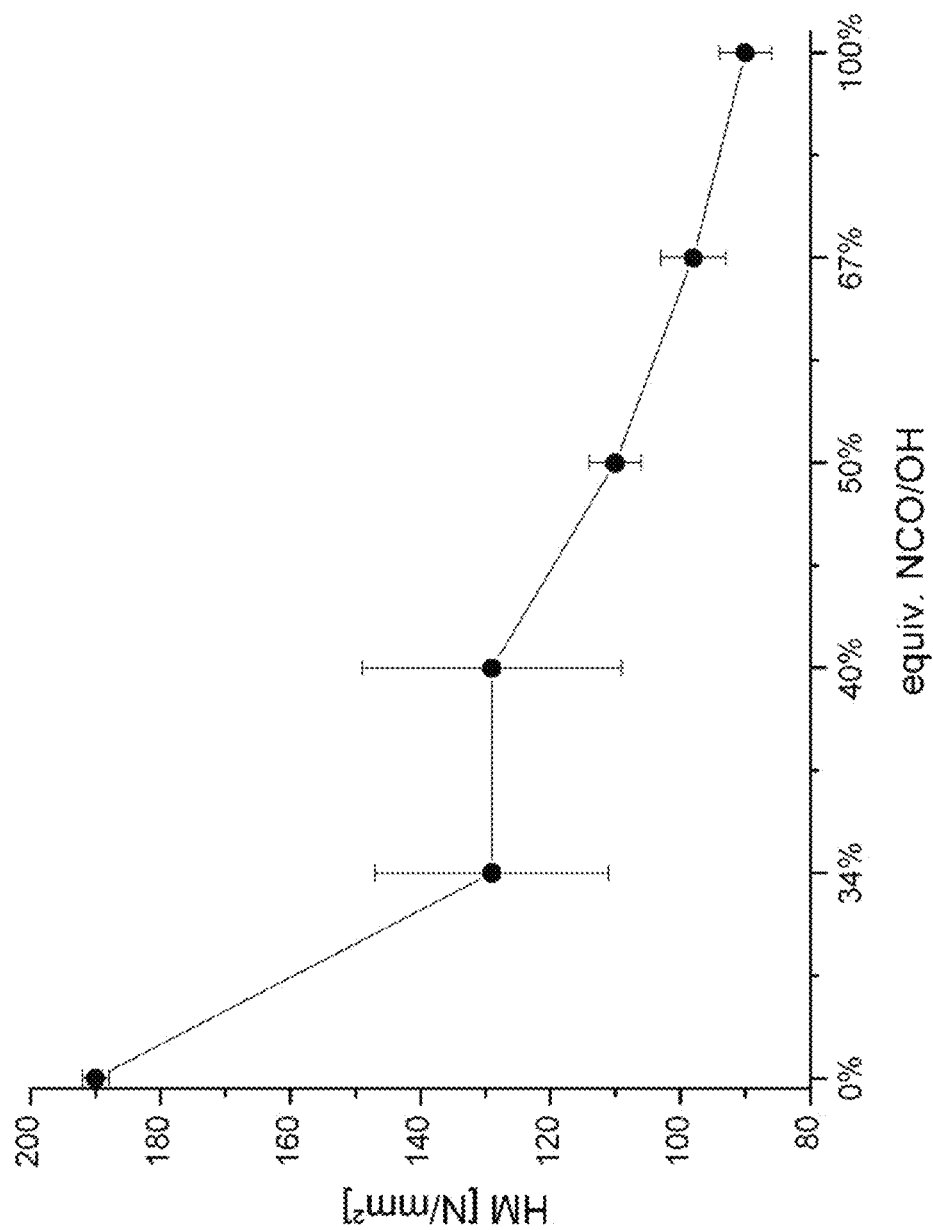
FIG. 11 shows the measured Martens hardness at 25° C. of crosslinked polyrotaxanes in accordance with Example 4 as a function of the utilized molar ratio of blocked isocyanate over hydroxyl groups.

FIG. 11 shoes the measured Martens hardness at 25° C. of the cross-linked polyrotaxanes in accordance with Example 4 as a function of the employed molar ration of blocked isocyanate over hydroxyl groups.

Example 5

Example 1a was dissolved in tetrahydrofuran to reach 20 wt. % solid content of the solution. (Example 5a)
To crosslink the polyrotaxane according to Example 1, the components were mixed and stirred for 30 minutes at room temperature. Two crosslinkers, namely Desmodur BL3370 and N-Benzyl-tert-butylamine blocked hexamethylene diisocyanate (BEBAblHMDI) were utilized. BEBAblHMDI was synthesized according to the method described in EP 0 668 304 B1.
The feed composition of the samples were the followings: Example 1a and Desmodur BL3370 with hydroxyl to isocyanate (OH/NCO) ratio of 5:1 for Example 5b, Example 1a and Desmodur BL3370 with OH/NCO=2:1 for Example 5c, Example 1a and Desmodur BL3370 with OH/NCO=1:1 for Example 5d, Example 1a and Desmodur BL3370 with OH/NCO=1:2 for Example 5e and Example 1a and BEBAblHMDI with OH/NCO=2:1 for Example 5f. Examples 5b-5e were dissolved in 1-Methoxy-2-propanyl acetate (MPA), while Example 5f was dissolved in tetrahydrofuran. The solid content of all the mixtures was 20 wt. %.

Differential Scanning Calorimetry (DSC)

Differential Scanning Calorimetry was performed with the calorimeter DSC 3 from Mettler-Toledo. The samples were measured after drying at 40° C. and after being heated at 120° C. for two hours. Three DSC runs were performed with each sample. The temperature goes from −60° C. to +120° C. with a ramp of 10K/min.

1. Before heating at 120° C.:

The material was filled in crucibles of 40° C. volume. Volatile solvents were removed by treatment at 40° C. for 2 days in a convection oven. Subsequently, the crucibles were closed with a lid. After this pretreatment, three DSC runs were performed with each sample. The temperature goes from −60° C. to +120° C. with a ramp of 10K/min. In the first run reaction or evaporation takes place which in most cases overlaps with the glass transition of the starting material. In the second or third run the glass transition can be evaluated. In most cases the tg-value increases from the $2^{nd}$ to the $3^{rd}$ run because the reaction is not yet complete.

2. After heating at 120° C.:

The same samples were heated at 120° C. for 2 hours in order to complete possible reactions. The samples were measured twice as described before. The temperature went from −60° C. to +120° C. with a ramp of 10K/min. The glass transition temperature of the samples before and after heating are shown in Tables 3 and 4. The samples show significant annealing effects. Annealing at temperatures above 110° C. gives rise to a significant increase of the glass transition temperature Tg. Also, the DSC measurement by itself had some annealing effect so that Tg at the $3^{rd}$ run was higher than for the $2^{nd}$ run and the Tg for the 2nd run being higher than for the 1st run.

TABLE 3

Glass transition values before heating at 120° C.

| samples | Tg [° C.] 2nd run | Tg [° C.] 3rd run |
|---|---|---|
| 5a | −2.4 | 9.1 |
| 5b | −4.6 | 1.9 |
| 5c | 5.1 | 6.6 |
| 5d | 6.6 | 8.7 |
| 5e | 9.5 | — |
| 5f | 1.7 | 4.6 |

TABLE 4

Glass transition values after heating at 120° C.

| Sample | Tg [° C.] 1st run | Tg [° C.] 2nd run |
|---|---|---|
| 5a | 7.5/38.7 | 9.6/37.1 |
|  | −33.6** | −31.3 |
| 5b | 11.9 | 12.5 |
| 5c | 12.6 | 12.6 |
| 5d | 11.7/(38.4)* | 12.8 |
| 5e | 7.2/40.7 | 10.7/39.5 |
| 5f | 9.2 | 9.4 |

*weak signal
**during cooling step (Segment 3)

Figure 8:
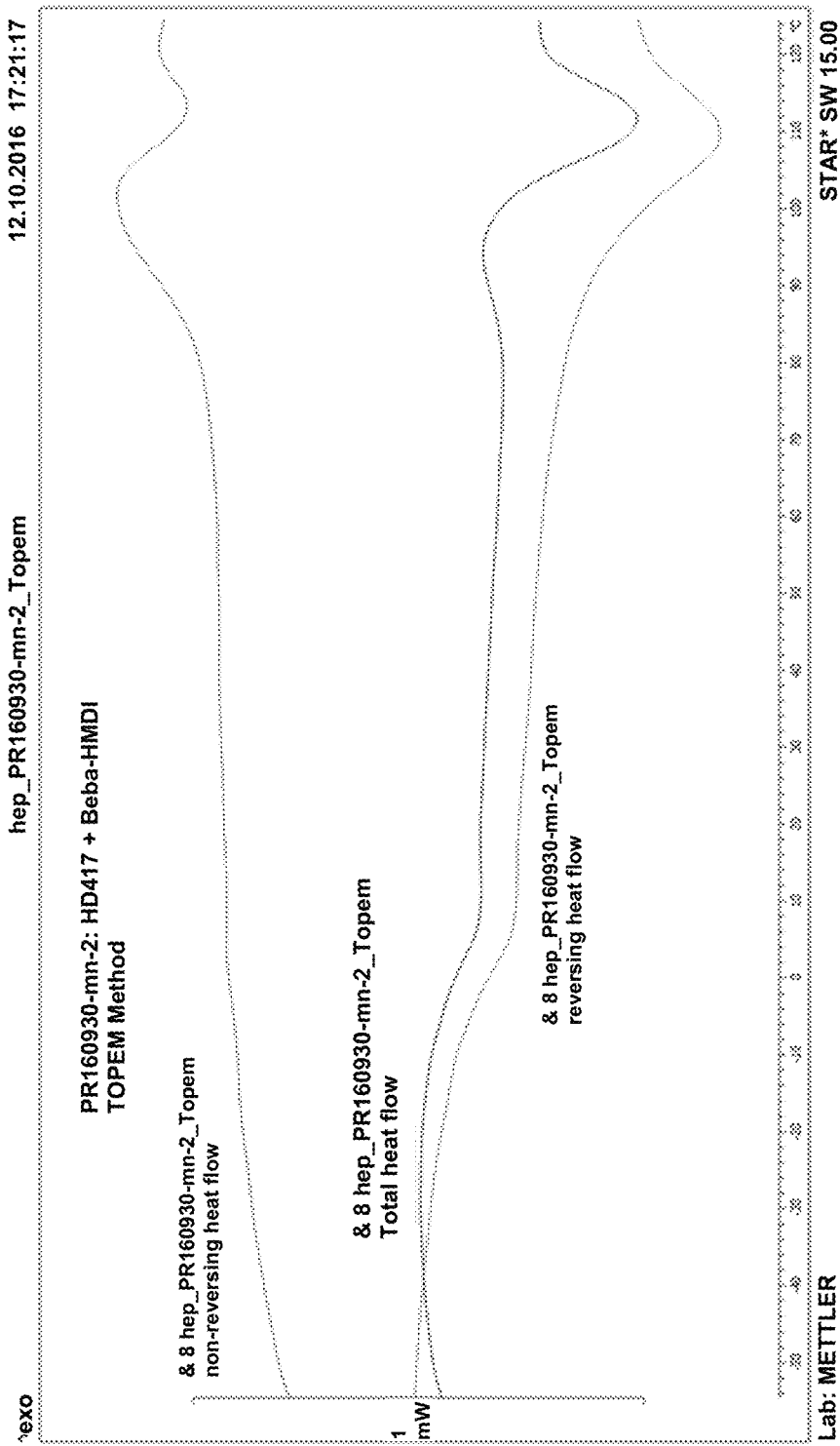
FIG. 8 shows a differential scanning calorimetric thermogram of the crosslinked polyrotaxane according to Example 5f, dried at 40° C. for 16 h.

FIG. 8 shows the differential scanning calorimetric thermogram of the crosslinked polyrotaxane according to Example 5f, dried at 40° C. for 16 h, measured by Mettler Toledo DSC3.

Tear-Off Force

Thin layers (size 20 mm×20 mm, thickness 70-120 μm) of crosslinked polyrotaxane according to Examples 5c-5e are formed by curing the materials at 120° C. for 18 h between 2 planar stainless steel plates (size 20 mm×50 mm). Table 5 shows the tear-off forces of the so-obtained thin layers. Based on the glued surface, this results in a maximum tension of 1-2 MPa.

TABLE 5

| Sample | Speed [mm/min] | Force max. [N] |
|---|---|---|
| 5a | 1 | 679 |
| 5c | 1 | 492 |
| 5d | 1 | 442 |
| 5e | 1 | 388 |

Example 6

The polyrotaxane solutions in accordance with Example 5 a-f are used for coating on different substrates for various characterizations. In details Aluminum-foil for FT-IR, glass surface for Haze-measurements and on stainless steel for microhardness and microscratch measurements and tensile testing. The materials were cured at 120° C. for 18 hours. The thicknesses of the coatings are shown in Table 6, as measured with Profilometer SURFCOM 1500SD3.

TABLE 6

| Sample | Thickness [μm] |
|---|---|
| 5a | 78 |
| 5b | 80 |
| 5c | 82 |
| 5d | 55 |
| 5e | 60 |
| 5f | 45 |

Microscratch

Microscratcher (CSM) was used to measure the adhesion of the coating and resistance of the coating and the surface against scratches. A diamond point (Rockwell-Diamond) was moved with continuously increasing and constant load on the sample. This method could also be used to make a pre-defined scratch for the self-healing experiment.

Profilometer

SURFCOM 1500SD3 (Accretech) was used to determine coating thickness and scratch profile during the self-healing experiment.

Example 7

The dissolved samples according to Examples 5a, 5c, 5d and 5e were coated on 2 stainless steel plates (20 mm×50 mm), with the proviso that the glued surface should be 20 mm×20 mm. The solvent was evaporated in 5 minutes. Subsequently, the two plates were put together and cured at 120° C. for 18 hours. Allroundline Type 1446 (Zwick; max test load 10 kN) was used for tensile testing experiment on the glued stainless steel plate. 2 samples (20 mm×50 mm) were coated and pressed together on the marked area (20 mm×20 mm).

Example 8

The polyrotaxane samples according to Examples 5a, 5b, and 5f were applied on a glass plate (25×25 mm) and cured at 120° C. for 18 hours. After curing the samples were scratched with a brass brush and put in the oven for 1 h, 2 h at 80° C. and 90'C. The samples 5c, 5d, 5e cannot be analyzed because of the sample turbidity before scratch applied on the surface.

Hazemeter haze-gard plus (Byk-Gardner) was used to measure haze of the coating on the glass plate before scratched, before and after the self-healing experiment.

Example 10

Figure 16:
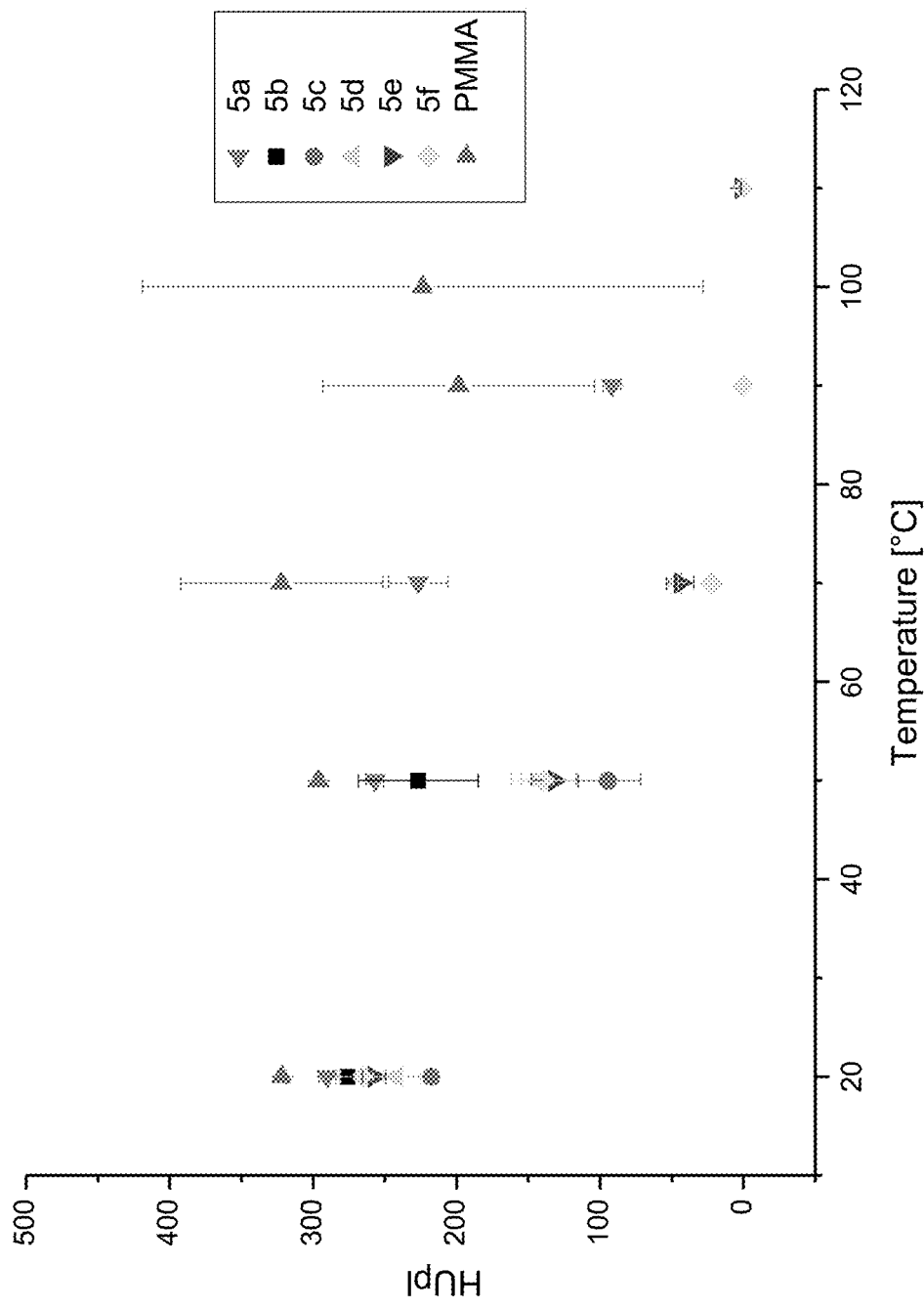
FIG. 16 shows the universal hardness of plastic part (HUpl) of samples 5a-5f, and PMMA.
Figure 17:
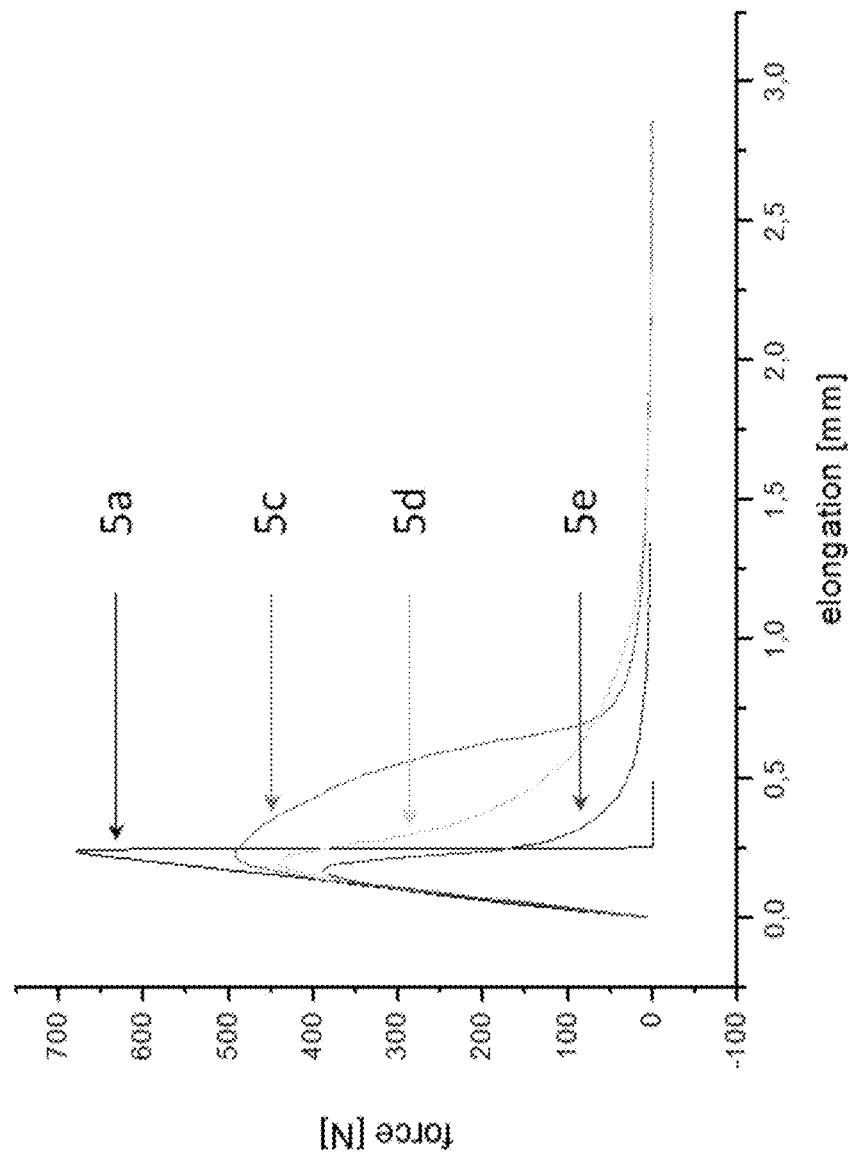
FIG. 17 shows the tensile testing experiment on the glued stainless steel plate of sample 5a, 5c, 5d and 5e.

Example 5a-f were applied on a stainless steel plate and cured at 120° C. for 18 hours. After curing, the microhardness of the samples were tested at room temperature, 50° C., 70° C., 90° C. and 110° C. A diamond pyramid was used as indentor. The force was increased up to 20 mN during 20 s, then kept on this value for 5 s and reduced during 20 s. Table 7 and FIG. 16 show the Universal hardness (HUpl) of plastic parts of Examples 5a-5f and of commercial poly(methyl methacrylate) (PMMA), annealed for 18 h at 120° C. before measured at various temperatures, for comparison. Instrument: FISCHERSCOPE® HM2000.

TABLE 7

Universal hardness of plastic part (HUpl)

| Sample | 25° C. | 50° C. | 70° C. | 90° C. | 110° C. |
|---|---|---|---|---|---|
| 5a | 290 | 257 | 227 | 92 | |
| 5b | 276 | 227 | | | |
| 5c | 218 | 94 | | | |
| 5d | 242 | 144 | 47 | | |
| 5e | 258 | 132 | 44 | | 2 |
| 5f | 266 | 140 | 22 | 1 | 0.5 |
| PMMA | 322 | 296 | 322 | 198 | 224 (at 100° C.) |

Figure 12:
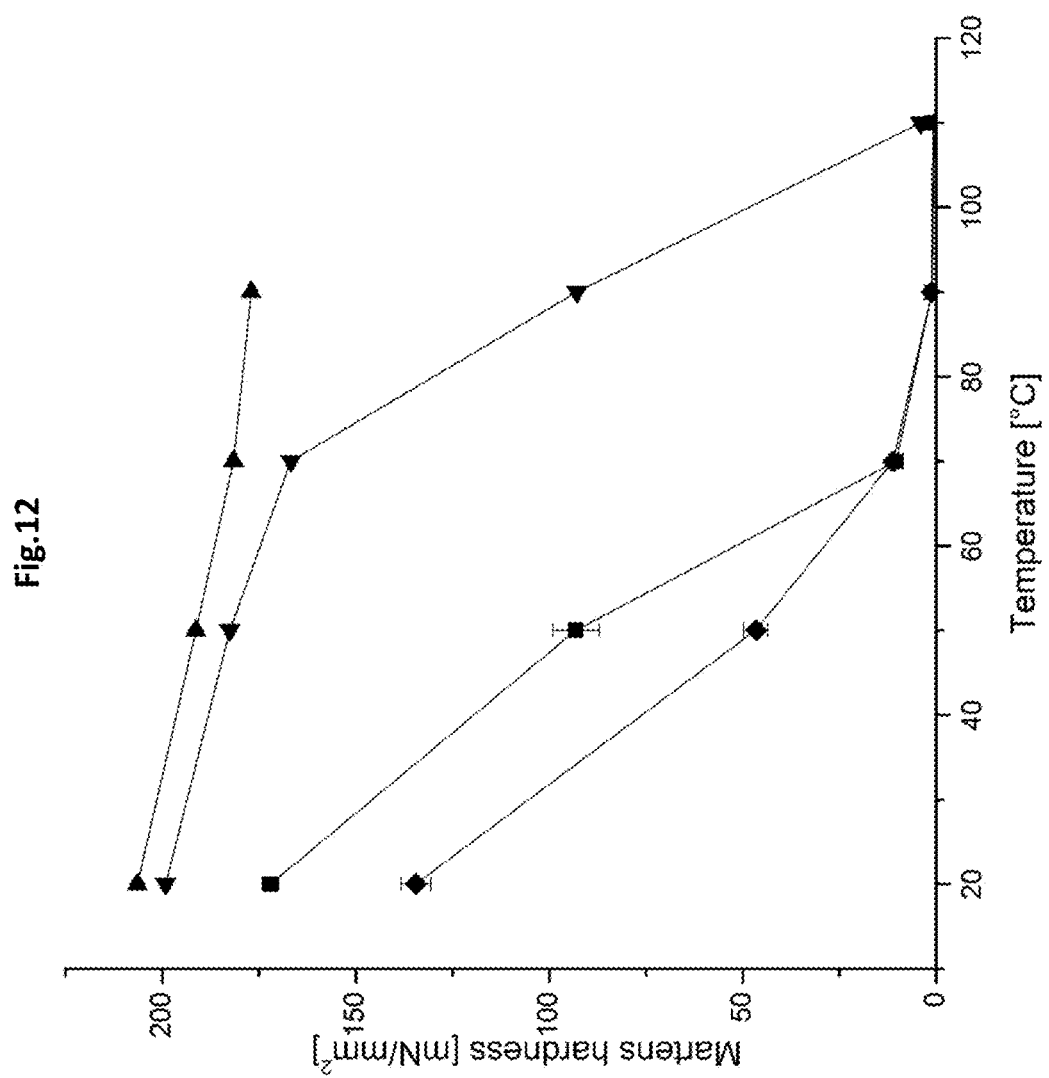
FIG. 12 shows the measured Martens hardness at various temperatures of (◄) the polyrotaxane according to Example 5a annealed for 16 h at 120° C. and (■, ♦ for Examples 5b and 5f, respectively) crosslinked polyrotaxanes annealed for 16 h at 120° C. and (▶) for PMMA for comparison.
Figure 15:
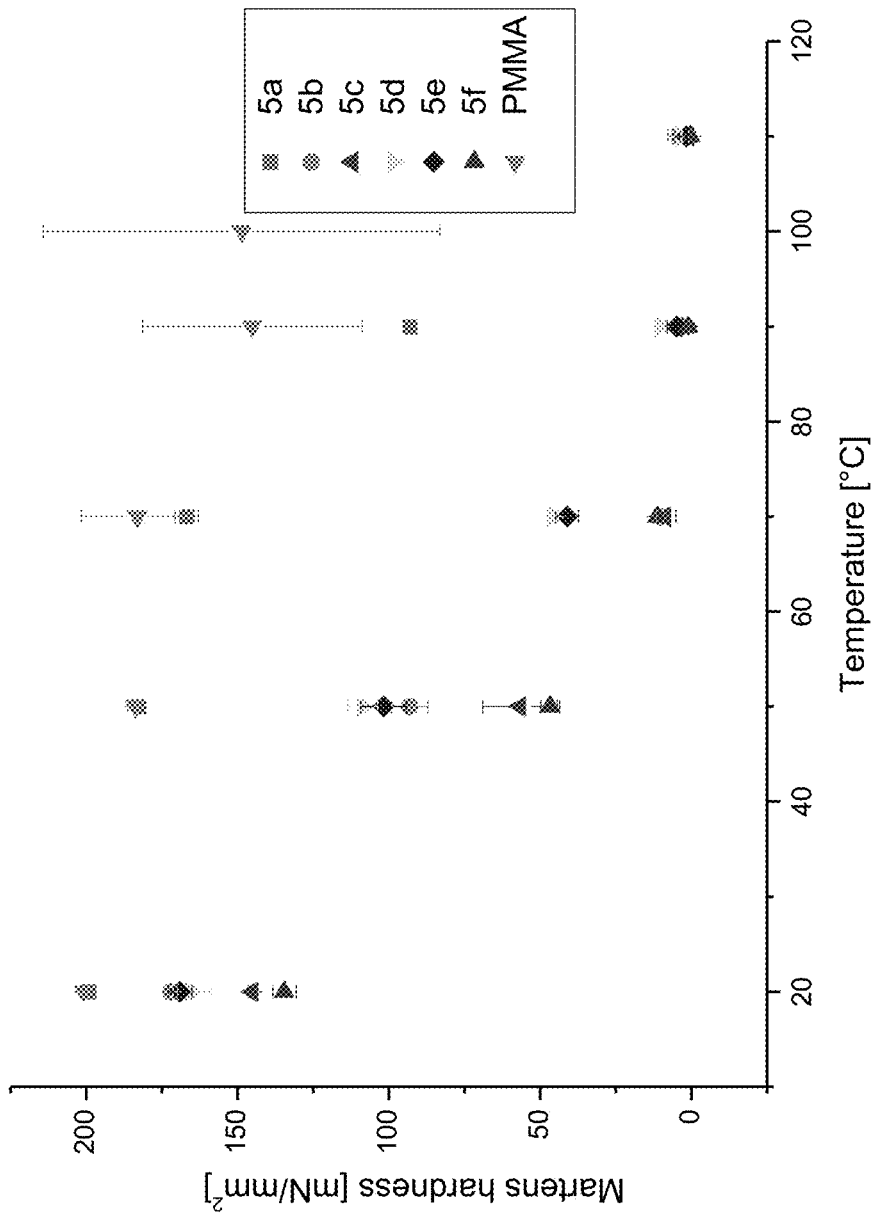
FIG. 15 shows the Martens hardness at different temperatures. Samples 5a-5f and PMMA were tested for reasons of comparison.

Table 8, FIG. 12 and FIG. 15 show the Martens hardness HM at different temperatures of samples 5a-5f and PMMA (for comparison).

TABLE 8

Martens hardness (HM) [N/mm$^2$]

| Sample | 25° C. | 50° C. | 70° C. | 90° C. | 110° C. |
|---|---|---|---|---|---|
| 5a | 199 | 183 | 167 | 93 | 4 |
| 5b | 172 | 93 | 10 | 1 | 1 |
| 5c | 145 | 57 | 9 | 5 | 1 |
| 5d | 165 | 109 | 46 | 10 | 3 |
| 5e | 169 | 102 | 41 | 5 | 2 |
| 5f | 134 | 47 | 11 | 1 | 0.4 |
| PMMA | 201 | 184 | 183 | 186 | 149 (at 100° C.) |

Table 9 shows the Haze (light scattering intensity) measurement H of a thin film (thickness 70-120 μm) on the glass plates (25×25 mm) and annealed at 120° C. for 18 hours. Afterwards the samples had been scratched with a brass brush at 25° C. and put in an oven for 1 h, 2 h, and 4 h at 90° C. Instrument: Hazemeter haze-gard plus (Byk-Gardner). Freshly scratched samples show a significant increase of Haze. After a curing time of 2 h at 90° C., this increase of Haze was withdrawn by 73 to 82%, after 4 h at 90° C. even by 57 to 98% proofing the self-healing process.

TABLE 9

| Sample | before scratch | freshly scratched | 1 h (90° C.) H | 2 h (90° C.) H | 2 h (90° C.) % Reduction | 4 h (90° C.) H | 4 h (90° C.) % Reduction |
|---|---|---|---|---|---|---|---|
| 5a | 3.55 | 8.45 | 4.93 | 4.43 | 82% | 3.91 | 93% |
| 5b | 0.6 | 4.78 | 2.9 | 2.69 | 50% | 2.4 | 57% |
| 5f | 1.68 | 9.16 | 3.71 | 2.53 | 73% | 1.83 | 98% |

At room temperature, Martens hardness of the materials (Example 5b-5f) increases with increasing amount of hardener (except for example 5b, were the lack of hardener leads to kind of orientation of the material). With increasing temperature the materials soften. Therefore a higher degree of mobility is achieved, and self-healing is enabled. For reasons of comparison, PMMA, and a scratch resistant coating were also tested. At room temperature, the Martens hardness of PMMA is slightly increased compared to the sample 5a, whereas the scratch resistant coating is significantly harder. The hardness of the scratch resistant coating remains approximately constant during heating up to 110° C. The hardness of PMMA slightly decreases upon heating up to 100° C. At 110° C. (above glass transition) no measurement was possible as the deformation of the sample was too high.

FIG. 15 shows the Martens hardness for the Examples 5a-5f and PMMA as a function of temperature.

The universal hardness of plastic part shows the same trend as the Martens hardness. With increasing temperature, the elastic deformation decreases and the plastic deformation energy increases significantly, whereas it remains nearly constant for the PMMA.

Nanoindentation testing device FISCHERSCOPE® HM2000 was used to determine the microhardness of the coating at different temperatures. The Martens hardness and the universal hardness of plastic part could be measured and calculated. The samples were measured with the maximum force of 20 mN.

The measured Martens Hardness (150-200 N/mm2) of the polyrotaxane prepared according to Example 1a, annealed for 16 h at 120° C., meets the expectations for a polymer based coating. At 23° C., the Martens hardness reflects the surface hardness (elastic response) in dependence on the amount and type of cross-linking agent. For the polyrotaxane samples containing an isocyanate crosslinking agent (5b-5f), almost no influence of the composition on the Martens hardness can be detected. The values indicate that the coatings are cured and show a hardness comparable to organic paints. The polyrotaxane containing no cross-linker (5a) shows slightly increased Martens hardness compared to the former compositions indicating that a slightly higher molecular order might have been formed. Two reference samples were chosen. The thermoplastic polymethylmethacrylate (PMMA), being not cross-linked, on an Al-plate having similar thickness compared to the polyrotaxanes. The polyrotaxane annealed for 16 h at 120° C. showed similar Martens hardness than PMMA. When increasing the temperature, the samples 5a-5f are becoming more and more soft, and a sharper decrease in Martens hardness is observed when the temperature exceeds the glass transition temperature significantly. This behavior is expected for thermoplastic materials and can also be observed for PMMA above 100° C. At 110° C. PMMA could not be measured because of very soft behavior. The scratch resistant coating on the other hand only showed a slight decrease in Martens hardness up to 110° C., as expected.

The interpretation of the universal hardness of plastic part (HUpl) can be formulated as being the resistance of a coating against plastic deformation. At 23° C., the polyrotaxane samples 5b-5f show moderate HUpl values in the range of 220 MPa-270 MPa. The sample 5a shows slightly higher value but still lower than PMMA with 322 MPa. The scratch resistant coating shows the highest resistance against plastic deformation with 540 MPa. It is interesting to note that the HUpl values for the scratch resistant coating even increase with increasing temperature indicating that this type of material behaves almost elastic. The PMMA shows only slightly decreasing HUpl values within the investigated temperature range indicating the presence of PMMA with quite high molecular weight having entanglements that behave as temporary physical network points. Above the glass transition temperature, the HUpl of the samples 5b-5f significantly decrease indicating (thermo)plastic behavior which enables self-healing to occur. Because of higher internal order, the sample 5a shows (thermo)plastic behavior at slightly higher temperature compared to the other polyrotaxane samples.

Figure 18:
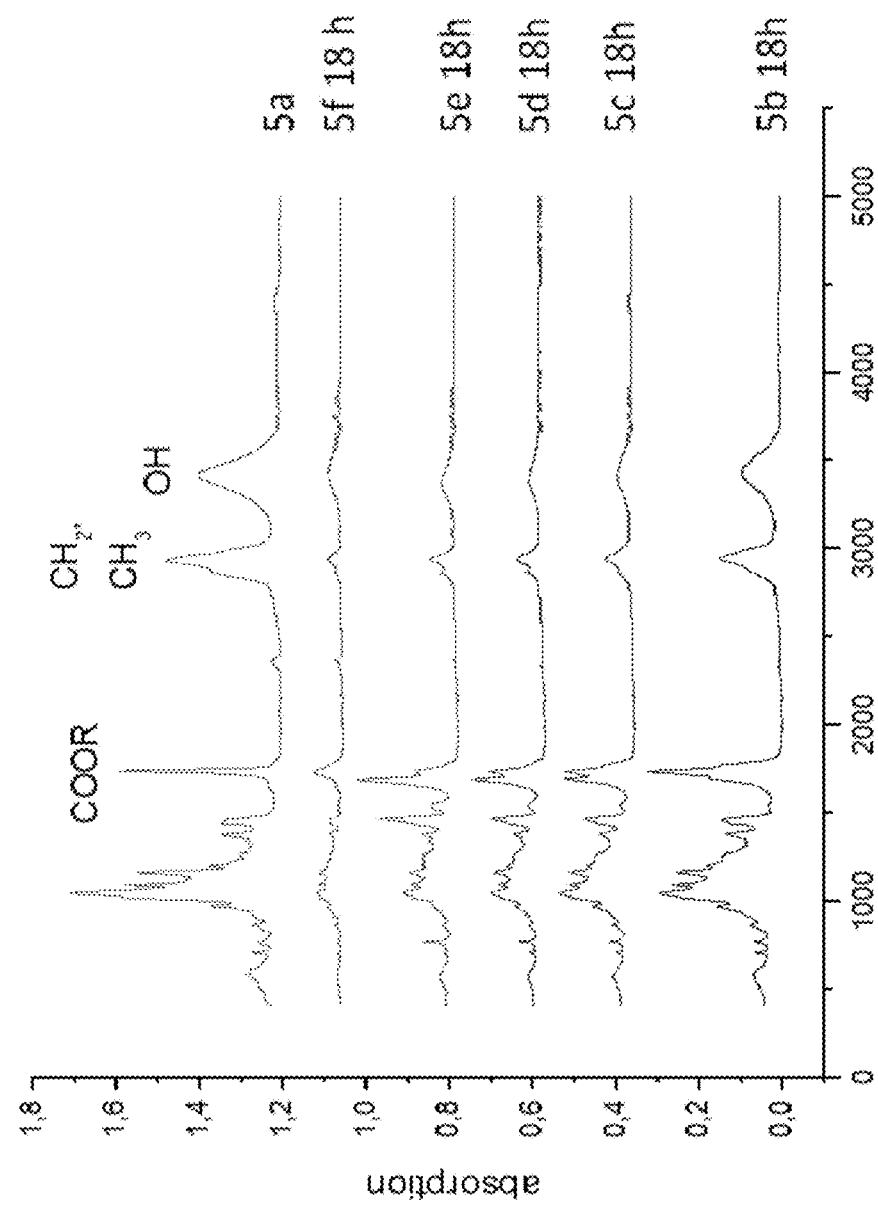
FIG. 18 shows IR Spectra of sample 5a-5f.

FIG. 18 shows IR Spectra of sample 5a-5f. The intensity of the signal of the OH group at 3450 $cm^{-1}$ allows to determine the degree of crosslinking by transesterification with Desmodur BL3370. The lower the signal intensity, the higher the degree of crosslinking.

Example 11: Polyrotaxane Prepared Via Free Radical Polymerization in the Presence of an Irreversible Chain Transfer Agent: poly(isoprene-co-vinyl acetate-co-hydroxyethyl methacrylate)-β-cyclodextrin Polyrotaxane 36.50 mg (0.11 mmol) 2,2'-azobis[2-(2-imidazolin-2-yl)propane] dihydrochloride (radical initiator VA-044), 20.4 g (17.97 mmol) β-cyclodextrin and 0.240 mL (1.97 mmol) of 2-hydroxyethyl methacrylate (first monomer having a stopper group) were dissolved in 100 mL aqueous 8 M urea solution. The system was bubbled through with nitrogen gas for 1 hour under stirring. After addition of 1.80 mL (1.22 g, 17.97 mmol) freshly distilled isoprene (third monomer, hydrophobic), 1.70 mL (0.39 g, 18.36 mmol) vinyl acetate (second monomer, partly hydrophilic) and 0.022 mL (0.035 g, 0.23 mmol) carbon tetrachloride ($CCl_4$, irreversible chain transfer agent) the nitrogen flow was stopped and the system was stirred to form a homogeneous solution due to β-cyclodextrin/isoprene complex formation. The reaction was placed in a 37° C. oil bath to start the reaction and was stirred for three days. After the reaction, the product was heated up to 90° C., filtered off, suspended in 100 mL water and filtered once more. The remaining solid was freeze-dried.

The product (2.04 g) was obtained after precipitation of its DMSO solution into water, as a white solid. Free β-cyclodextrin (0.7 wt. %) was determined by precipitation of the DMSO solution of the product into water and determination of dissolved β-cyclodextrin in the water phase.

$^1$H NMR (DMSO-d6, 400 MHz) δ/ppm=5.71 (OH-2, OH-3 of β-CD), 5.15-4.95 (methine of polyisoprene and poly(vinyl acetate)), 4.92-4.65 (H-1 of β-CD), 4.55-4.25 (OH-6 of β-CD), 4.05-3.93 ppm (methylene groups of poly-2-hydroxyethyl methacrylate), 3.86-3.51 (H-3, H-5, H-6 of β-cyclodextrin), 3.39-3.22 (H-2, H-4 of β-cyclodextrin); 2.25-1.80 (methylene groups of polymer backbone) and 1.7-1.45 (methyl groups of polyisoprene and poly-2-hydroxyethyl methacrylate);

Polarimetry (DMSO): c=6.745 mg/mL, α=0.050 deg;
Free β-cyclodextrin (water): c=0.8754 mg/mL, α=0.001 deg;

The total weight fraction of β-cyclodextrin (47.1 wt. %) of said polyrotaxane was determined from the optical rotation α=0.0550 deg of a solution (6.7 mg/mL in DMSO (DMSO=dimethylsulfoxide)) in an 1 cm cuvette at a wavelength of λ=589 nm, applying the specific rotation of β-cyclodextrin [α]=+157.4 deg mL $dm^{-1}$ $g^{-1}$. The amount of free β-cyclodextrin (0.7 wt. %) was determined by precipitating 1 mL of DMSO polyrotaxane solution into 9 mL of water/NaCl (0.1 M), thereby precipitating the polyrotaxane, i.e. the terpolymer and the β-cyclodextrin threaded thereon, and measuring the optical rotation α=0.001 deg of the filtrated solution, which contains the free β-cyclodextrin in a 10 cm cuvette. The composition of Example 11 (46.4 wt. % cyclodextrin) was calculated from the difference of the total and the free cyclodextrin contents, respectively.

Figure 21:
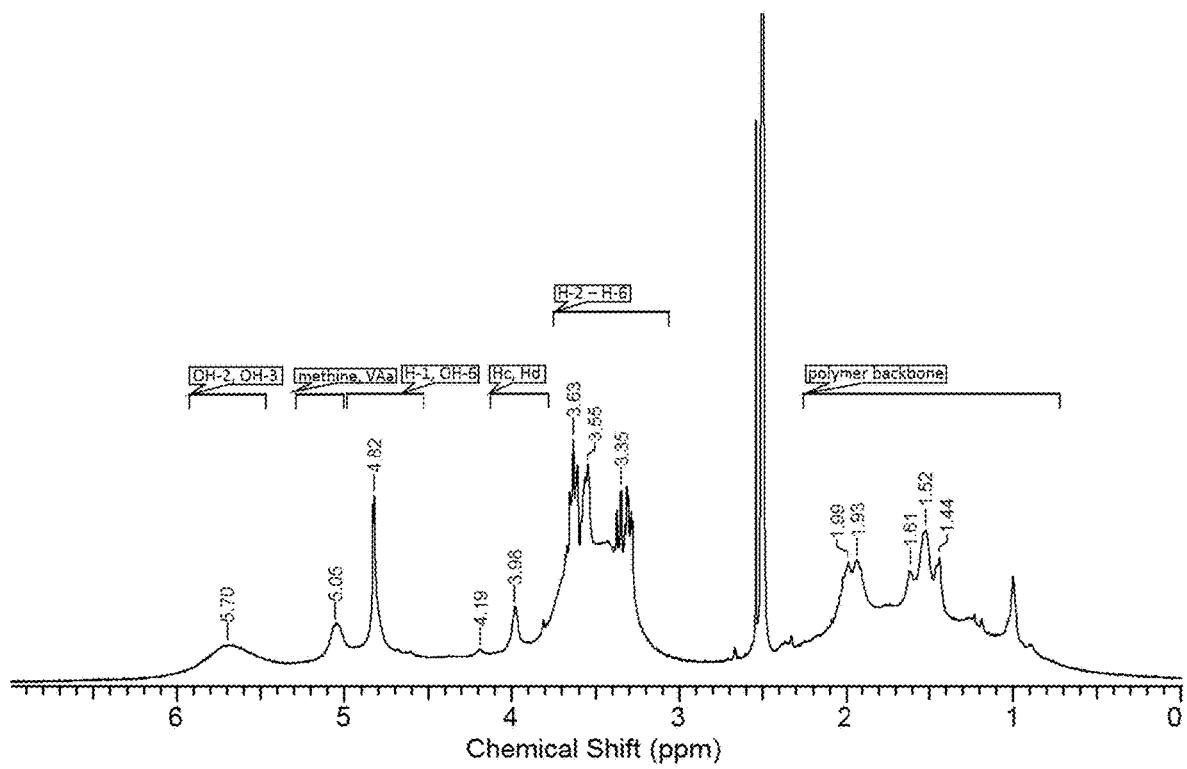
FIG. 21 shows a $^1$H NMR spectrum of the polyrotaxane in accordance with Example 11 in DMSO-d6.

FIG. 21 shows the $^1$H NMR spectrum of the polyrotaxane of Example 11.

Example 12: Polyrotaxane Prepared Via Reversible Addition Chain Transfer Polymerization at Room Temperature: poly(2,3-Dimethyl-1,3-butadiene-co-methyl acrylate-co-styrene)-randomly methylated β-cyclodextrin polyrotaxane 9 mg (0.02 mmol) $K_2S_2O_8$ (radical initiator), 32.0 mg (0.14 mmol) S,S'-Bis(α,α'-dimethyl-α''-acetic acid)-trithiocarbonate (chain transfer agent), 15.0 g (11.44 mmol) randomly methylated β-cyclodextrin (RAMEB, ring-shaped molecule) and 0.1 ml (1.06 mmol) styrene (first monomer having a stopper group) were dissolved in 15 mL deionized water. The system was bubbled through with nitrogen gas for 1 hour under stirring. After that, 2.5 mL (21.97 mmol) 2,3-dimethyl-1,3-butadiene (second monomer, hydrophobic) and 2.0 mL (22.07 mmol) methyl acrylate (third monomer, hydrophilic) were added to the solution. In order to start the reaction, 0.1 ml (0.03 mmol, c=62.0 mg/ml) aqueous Na-ascorbate-solution was syringed to the reaction mixture, and it was stirred for 72 hours. After the reaction, the mixture was heated up to 80° C. for 20 mins. The suspended product was filtered off and the procedure repeated two times. The product was dried overnight at 80° C. in vacuo to give 1.431 g yellowish/transparent oil like film.

$^1$H NMR ($CDCl_3$, 400 MHz) δ in ppm: 7.12 (phenyl, styrene), 5.02-4.69 (RAMEB), 4.07-3.18 (RAMEB, CH—CO), 25
3.40 ($OCH_3$), 2.46-1.45 (polymer backbone);
Polarimetry ($CDCl_3$): c=19.7 mg/mL, α=0.039 deg;
GPC: 6.5 wt. % free RAMEB;

The total weight fraction of randomly methylated β-cyclodextrin (sum of RAMEB threaded on the terpolymer and free RAMEB) of said polyrotaxane sample was determined from the optical rotation α=0.039 deg of a polyrotaxane solution (concentration 19.7 mg/mL in $CHCl_3$) measured by polarimetry in an 1 cm cuvette at a wavelength of Δ=589 nm, making use of the specific rotation of randomly methylated β-cyclodextrin (RAMEB) [α]=+130 deg mL $dm^{-1}$ $g^{-1}$. The composition of Example 12 (14.4 wt. % threaded RAMEB and 85.6 wt. % terpolymer) was calculated from the difference of the total RAMEB content, which was determined by polarimetry, and the free RAMEB content, which was determined by gel permeation chromatography (GPC) measurements.

For the GPC measurement, a sample of the polyrotaxane was weighed and dissolved in tetrahydrofuran. The obtained polyrotaxane solution itself and after addition of various amounts of RAMEB was measured by GPC. The RAMEB peak areas of the chromatograms were compared, and the amount of free RAMEB was extrapolated.

The molar composition (X=styrene, Y=methyl acrylate, Z=2,3-dimethyl-1,3-butadiene, CD=RAMEB) of the polyrotaxane was also determined based on the NMR integral values of the areas A=2.46-1.45 ppm, B=4.07-3.18 ppm, C=6.90-7.12 ppm, and D=4.50-5.20 ppm, according to the following equations normalized to RAMEB (14 protons in region D and 74 protons in region B):

$$X = \frac{C}{5}$$
$$Y = \frac{B-74}{3}$$
$$Z = \frac{A-3X-3Y}{10}$$
$$CD = \frac{D}{14}$$

The molar composition of Example 12 was X/Y/Z/CD=1.9/35.4/40.8/1, that is 2.4 mol % styrene, 45.2 mol % methyl acrylate 52.1 mol % 2,3-dimethyl-1,3-butadiene and 1.3 mol % RAMEB. The calculated composition of the said polyrotaxane in weight percentages was: 2.5 wt. % styrene, 38.4 wt. % methyl acrylate 42.3 wt. % 2,3-dimethyl-1,3-butadiene and 16.8 wt. % RAMEB in accordance with the value obtained through polarimetry within experimental error.

Example 13: Synthesis of Polyrotaxane-Methacrylate 0.80 g poly(2,3-Dimethyl-1,3-butadiene-co-methyl acrylate-co-styrene)-RAMEB polyrotaxane (Example 12), and 59.7 μL triethylamine (43.3 mg, 0.43 mmol) were dissolved in 10 mL CHCl$_3$ in a double neck round bottom flask, equipped with a dropping funnel under N$_2$ at 0° C. 42.0 μL methacryloyl chloride (45.0 mg, 0.43 mmol) in 5 mL CHCl$_3$ was added dropwise. After stirring overnight at room temperature, 35 mL CHCl$_3$ was added, and the solution was washed five times 5 mL distilled water. After drying over magnesium sulfate the solvent and the remaining trimethylamine and methacryloyl chloride were removed by rotary evaporator, under reduced pressure at 40° C. The dry product (0.526 g, yield=58%) was obtained as a slightly yellowish solid.

$^1$H NMR (CDCl$_3$, 400 MHz) δ in ppm: 7.10 (d'-f', phenyl), 6.24 and 5.83 (methylene from methacrylate), 5.01-4.68 (1, RAMEB), 4.05-3.30 (2-6, D, RAMEB, CH—CO), 3.39 (OCH$_3$), 2.46-1.42 (a, c, a', b', A, B, and methyl from methacrylate, polymer backbone);

IR: increased 1730 cm$^{-1}$ (carbonyl stretch), decreased 3200-3600 cm$^{-1}$ (OH stretch)

Degree of substitution: 1.05 methacrylate groups per glucose unit. The intensities of the signals of the OH group at 3450 cm$^{-1}$ in the IR spectra of starting material and product allow determining the degree of substitution.

Figure 22:
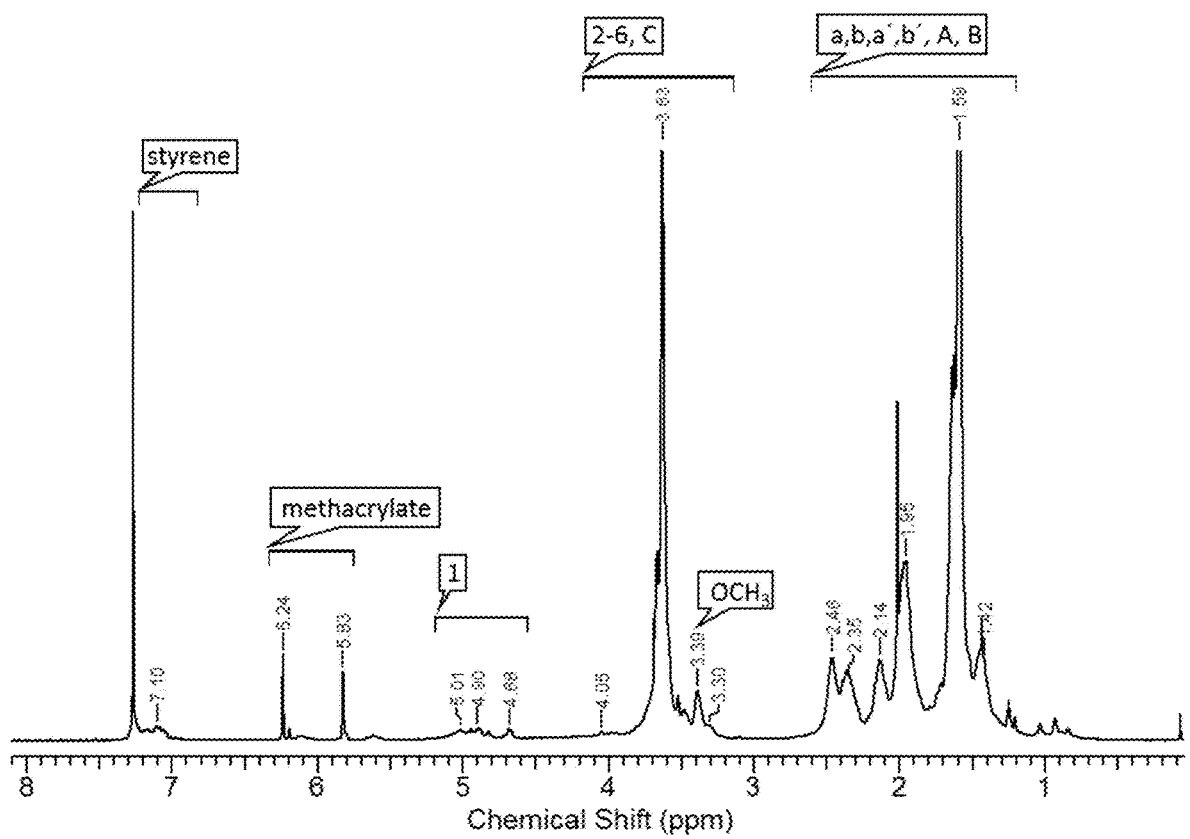
FIG. 22 shows a $^1$H NMR spectrum of the polyrotaxane in accordance with Example 12 in CDCl$_3$.
Figure 23:
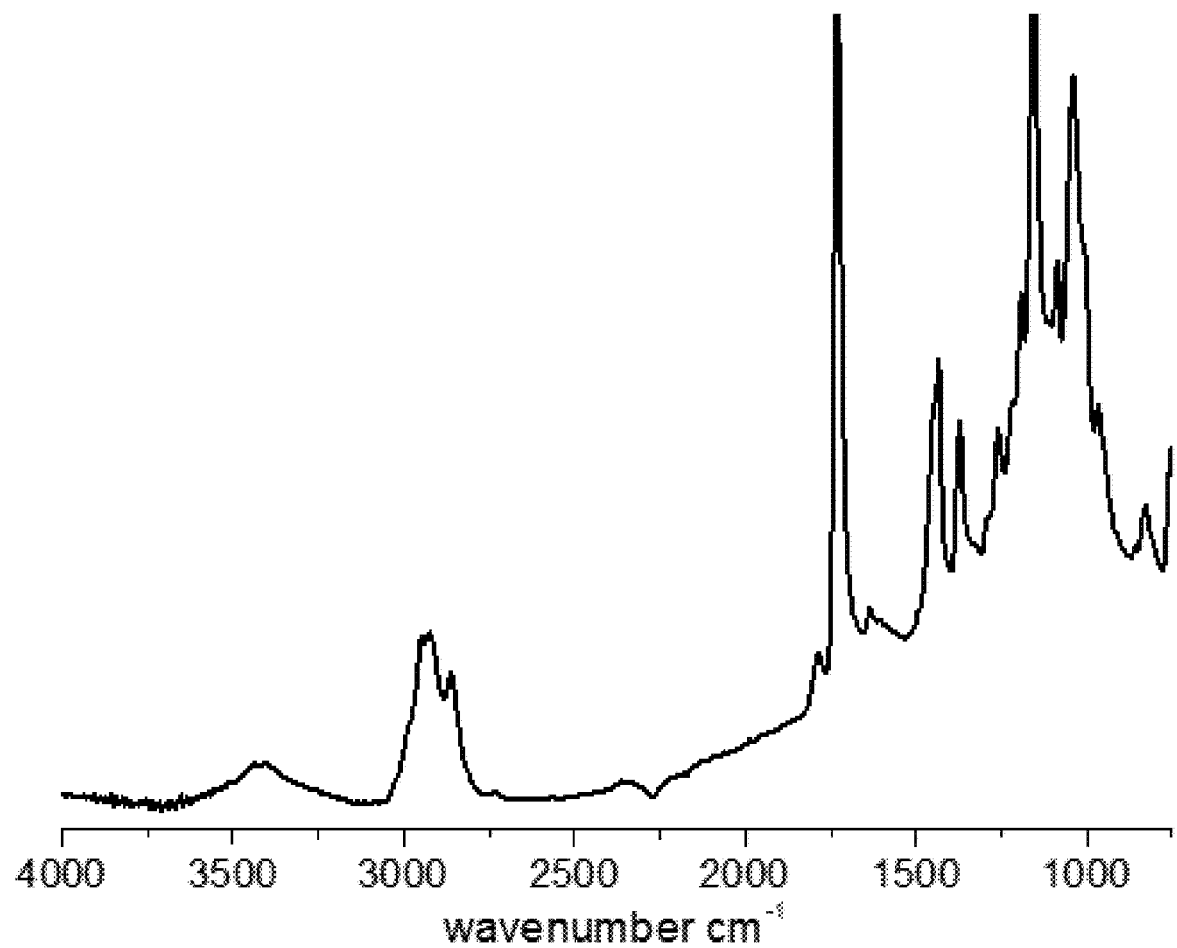
FIG. 23 shows the IR spectrum of the polyrotaxane in accordance with Example 12.
Figure 24:
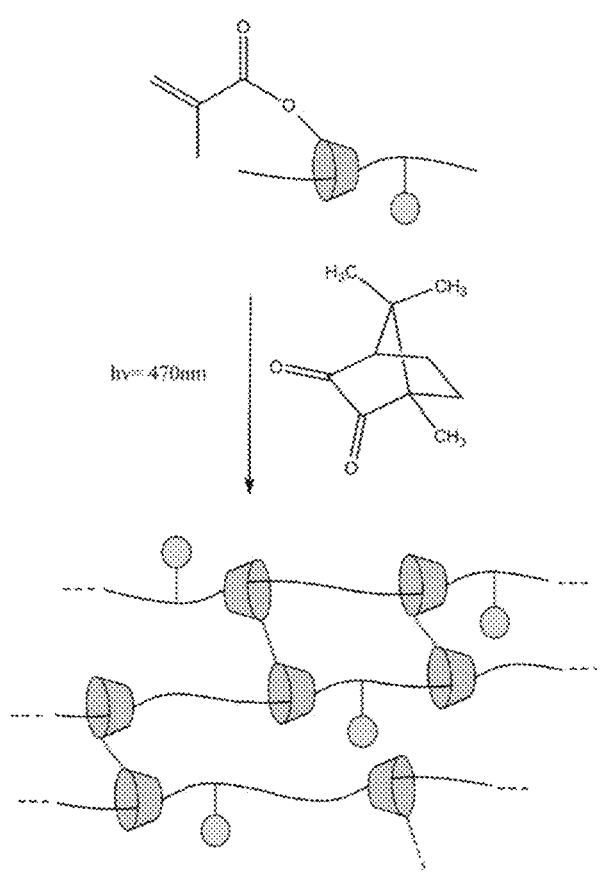
FIG. 24 shows a schematic representation of the cross-linking of Example 12 to form a slide-ring gel in accordance with Example 13.

FIG. 22 shows the $^1$H NMR spectrum of Example 13. FIG. 23 shows the FT-IR spectrum with the characteristic OH vibration of RAMEB between 3200 and 3600 cm$^{-1}$ and of the vibrations of the carbonyl groups of poly(methyl acrylate) and RAMEB-methacrylate at 1730 cm$^{-1}$.

Example 14: Photochemical Cross-Linking of polyrotaxane-methacrylate 0.10 g polyrotaxane-methacrylate (Example 13) and 4.5 mg camphorquinone photoinitiator (0.027 μmol) were mixed in 1 mL of chloroform. A transparent film was casted from CHCl$_3$ onto a glass surface and treated with UV light (360 nm). After two days of irradiation, the film was immersed in THF, and the non-reacted polyrotaxanes were dissolved and removed. The soluble fraction was 6%.

The swelling degree (SD) of the gels in THF and water were determined gravimetrically using the following equation:

$$SD(\%) = \frac{m_{swollen} - m_{dry}}{m_{dry}} * 100$$

Where $m_{swollen}$ and $m_{dry}$ are the masses of swollen and dry networks, respectively. The results are shown in Table 10

TABLE 10

The measured masses and the calculated equilibrium swelling degrees (DS) of polyrotaxane gels according to Example 14.

|  | Mass (g) | SD (%) |
|---|---|---|
| Dry network | 0.0299 | — |
| THF | 0.1792 | 499.3 |
| water | 0.0410 | 37.1 |

The polyrotaxane sample according to Example 14 on a glass plate was scratched with a brass brush and heated up to 80° C. in order to test self-healing. The scratches, applied on Example 14, healed within 20 minutes at this temperature.

What is claimed is:

1. A polyrotaxane comprising a ring-shaped molecule and a copolymer threading said ring-shaped molecule, wherein said copolymer comprises at least (a) structural units derived from a first polymerizable monomer having a stopper group, at least (b) structural units derived from a second polymerizable hydrophobic monomer and at least (c) structural units derived from a third polymerizable hydrophilic monomer, wherein said structural units derived from the first monomer having a stopper group are incorporated into the chain of said copolymer at least partially between the ends thereof, wherein said stopper groups prevent the ring-shaped compound from disassembling from the copolymer, and wherein the amount of said structural units derived from the first monomer having a stopper group is 0.1 mol % to 20 mol % based on 100 mol % of the total amount of structural units of the copolymer.

2. The polyrotaxane of claim 1, wherein said copolymer is a random copolymer, wherein said structural units derived from said first polymerizable monomer having a stopper group are incorporated randomly along the chain of said copolymer at least partially between the ends thereof.

3. The polyrotaxane of claim 1, wherein said ring-shaped molecule is selected from the group consisting of a cyclodextrin, a cyclodextrin derivative, and any combination thereof.

4. The polyrotaxane of claim 1, wherein said first monomer having a stopper group has a molecular weight of from 70 g/mol to 1000 g/mol.

5. The polyrotaxane of claim 1, wherein said first monomer having a stopper group is selected from the group consisting of myrcene, an aromatic vinyl monomer, N-isopropyl (meth)acrylamide, N-vinylcaprolactam, N-vinylcaprolactone, N-vinylimidazole, N-vinylpyrrolidone, a poly (ethylene glycol) (meth)acrylate, an α,ω-bis(meth)acrylate, hydroxyethylmethacrylate, N,N-dimethyl-2-amino-ethylmethacrylate, tetrahydrofurfuryl methacrylate, furfuryl methacrylate, 4-acryloylmorpholine, N-[tris(hydroxymethyl)methyl]acrylamide, styrene, N-isopropylacrylamide, and any combination thereof.

6. The polyrotaxane of claim 1, wherein said second hydrophobic monomer has a solubility in water at 20° C. of less than 20 g/L.

7. The polyrotaxane of claim 1, wherein said second hydrophobic monomer is selected from the group of vinyl monomers having a molecular weight less than 120 g/mol, consisting of a 1,3-diene, N-alkyl-acrylamide, an alkylene, and any combination thereof, or wherein said second hydrophobic monomer is selected from the group consisting of 1,3-butadiene, 2,3-dimethyl-1,3-butadiene, isoprene, chloroprene and any combination thereof.

8. The polyrotaxane of claim 1, wherein said third hydrophilic monomer has a solubility in water at 20° C. of 45 g/L or more.

9. The polyrotaxane of claim 1, wherein said third hydrophilic monomer has a molecular weight less than 120 g/mol, or wherein said third polymerizable hydrophilic is selected from the group consisting of methylacrylate, acrylamide, methacrylamide, acrylic acid, methacrylic acid, acrylonitrile, their derivatives, and any combination thereof.

10. A cross-linked polyrotaxane, wherein a polyrotaxane of claim 1 is chemically or physically cross-linked.

11. The cross-linked polyrotaxane of claim 10, wherein polyrotaxanes are cross-linked intermolecularly via ring-shaped molecules and a cross-linking agent, or wherein the polyrotaxanes are cross-linked intermolecularly via ring-shaped molecules modified with a group having a cross-linkable moiety.

12. The cross-linked polyrotaxane of claim 10, wherein said cross-linked polyrotaxane is a gel or a slide-ring gel.

13. A hardened material obtained by heating a polyrotaxane according to claim 1 in the absence of any cross-linking agent at temperatures between 80° C. and 150° C.

* * * * *